(12) United States Patent
Inatani et al.

(10) Patent No.: US 7,881,163 B2
(45) Date of Patent: Feb. 1, 2011

(54) RECORDING MEDIUM CHANGER AND REPRODUCING APPARATUS

(75) Inventors: Akihisa Inatani, Kanagawa (JP);
Masahiro Maikuma, Kanagawa (JP);
Yoshihiro Kajiyama, Tokyo (JP);
Harumitu Nayuki, Chiba (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 11/867,384

(22) Filed: Oct. 4, 2007

(65) Prior Publication Data

US 2008/0148302 A1    Jun. 19, 2008

(30) Foreign Application Priority Data

Oct. 12, 2006   (JP)   ............................. 2006-279173

(51) Int. Cl.
*G11B 17/22* (2006.01)
(52) U.S. Cl. .................................................. 369/30.55
(58) Field of Classification Search ........................ None
See application file for complete search history.

(56) References Cited

U.S. PATENT DOCUMENTS

| | | | | |
|---|---|---|---|---|
| 4,754,445 A | * | 6/1988 | Young et al. ............. | 369/30.86 |
| 5,541,897 A | * | 7/1996 | Baca et al. ............... | 369/30.92 |
| 5,729,524 A | * | 3/1998 | Pines et al. .............. | 369/30.64 |
| 5,734,629 A | * | 3/1998 | Lee et al. ................. | 369/30.34 |
| 5,934,865 A | * | 8/1999 | Meadows ................ | 414/796.9 |
| 6,321,649 B1 | * | 11/2001 | Vangen et al. ................ | 101/35 |
| 6,490,232 B2 | * | 12/2002 | Sato ......................... | 369/30.34 |
| 6,760,052 B2 | * | 7/2004 | Cummins et al. ........... | 347/171 |
| 7,127,725 B2 | * | 10/2006 | Lee ............................ | 720/600 |
| 2003/0002400 A1 | * | 1/2003 | Klein ....................... | 369/30.55 |
| 2005/0024996 A1 | * | 2/2005 | Schumacher ............. | 369/30.33 |

FOREIGN PATENT DOCUMENTS

| | | |
|---|---|---|
| JP | 61-48163 | 3/1986 |
| JP | 61-111057 | 7/1986 |

* cited by examiner

*Primary Examiner*—Mark Blouin
(74) *Attorney, Agent, or Firm*—Oblon, Spivak, McClelland, Maier & Neustadt, L.L.P.

(57) ABSTRACT

A recording medium changer includes a plurality of storage trays that are arranged in alignment in a predetermined direction and each store a recording medium, and a conveying mechanism that is movable in an alignment direction of the plurality of storage trays and conveys a recording medium. The plurality of storage trays are rotatable about an axis extending in the alignment direction of the storage trays. At the time of rotation of each of the storage trays, the conveying mechanism is held in a movement preparing position retracted in the alignment direction from the storage tray that is being rotated. Each of the storage trays has a movement cutout for forming at least a part of a movement space through which the conveying mechanism is moved.

10 Claims, 70 Drawing Sheets

FIG. 46

| STORAGE POSITION | PRESENCE/ ABSENCE OF DISK | DISK KIND | DISK TITLE | USE DATE AND TIME 1 | USE DATE AND TIME 2 | USE DATE AND TIME 3 | USE AND T... |
|---|---|---|---|---|---|---|---|
| 1 | ○ | CD-RW | A | 3/20/2006/15:00 | 3/15/2006/16:02 | 3/14/2006/15:12 | |
| 2 | × | | | | | | |
| 3 | ○ | CD-R | C | 10/10/2005/13:15 | | | |
| 4 | ○ | DVD-RW | B | 5/15/2006/9:12 | 1/10/2005/22:15 | | |
| ... | | | | | | | |
| 299 | × | | | | | | |
| 300 | × | | | | | | |

RECORDING MEDIUM CHANGER AND REPRODUCING APPARATUS

CROSS REFERENCES TO RELATED APPLICATIONS

The present invention contains subject matter related to Japanese Patent Application JP 2006-279173 filed in the Japanese Patent Office on Oct. 12, 2006, the entire contents of which are incorporated herein by reference.

BACKGROUND OF THE INVENTION

1. Field of the Invention

The present invention relates to the technical field of a recording medium changer and a reproducing apparatus.

More specifically, the present invention relates to the technical field of forming a movement cutout, which serves as a movement space for a conveying mechanism, in each of a plurality of storage trays to achieve miniaturization.

2. Description of the Related Art

Various kinds of recording medium exist, including a tape-shaped recording medium such as a tape cassette and a disk-shaped recording medium such as an optical disk, a magneto-optical disk, or a magnetic disk.

An example of a device that handles such as a recording medium is a recording medium changer having a plurality of storage trays vertically arranged in a stacked fashion (see, for example, Japanese Unexamined Patent Application Publication No. 2005-100591).

Some recording medium changers include a plurality of rotatable disk-shaped storage trays. In such a recording medium changer, a recording medium stored in each storage tray is conveyed to another storage tray or a drive device by a conveying mechanism.

SUMMARY OF THE INVENTION

In the recording medium changer of the related art mentioned above, the disk-shaped storage trays are rotated.

Accordingly, a movement space for the conveying mechanism is formed at a position that avoids interference with the rotation locus of the storage trays, that is, at a position on the outer side with respect to the outer circumference of the storage trays, leading to an increase in the size of the recording medium changer.

It is thus desirable to achieve a reduction in the size of a recording medium changer.

According to an embodiment of the present invention, there is provided a recording medium changer including a plurality of storage trays that are arranged in alignment in a predetermined direction and each store a recording medium, and a conveying mechanism that is movable in an alignment direction of the plurality of storage trays and conveys a recording medium. The plurality of storage trays are rotatable about an axis extending in the alignment direction of the storage trays. At the time of rotation of each of the storage trays, the conveying mechanism is held in a movement preparing position retracted in the alignment direction from the storage tray that is being rotated. Each of the storage trays has a movement cutout for forming at least a part of a movement space through which the conveying mechanism is moved.

Therefore, in the recording medium changer according to the above embodiment, the movement space for the conveying mechanism is formed within the rotation locus of the storage trays.

A recording medium changer according to an embodiment of the present invention includes a plurality of storage trays that are arranged in alignment in a predetermined direction and each store a recording medium, and a conveying mechanism that is movable in an alignment direction of the plurality of storage trays and conveys a recording medium. The plurality of storage trays are rotatable about an axis extending in the alignment direction of the storage trays. At the time of rotation of each of the storage trays, the conveying mechanism is held in a movement preparing position retracted in the alignment direction from the storage tray that is being rotated. Each of the storage trays has a movement cutout for forming at least a part of a movement space through which the conveying mechanism is moved.

Therefore, the movement space for the conveying mechanism is formed within the rotation locus of the storage trays, thereby making it possible to achieve a reduction in the size of the recording medium changer while securing the movement space for the conveying mechanism.

According to an embodiment of the present invention, the recording medium changer further includes a drive device that performs recording or reproduction of an information signal with respect to a recording medium, the drive device being arranged within a projected area of a rotation locus of the storage trays in the alignment direction of the storage trays. Therefore, it is possible to avoid an increase in the size of the recording medium changer even when a drive device is arranged in the recording medium changer.

According to an embodiment of the present invention, the recording medium changer further includes locking means for locking each of the storage trays in a conveyance position that allows movement of the conveying mechanism through the movement space. Therefore, there is no fear of the storage trays being rotated due to vibration or the like, thereby making it possible to ensure smooth movement of the conveying mechanism.

Also, according to an embodiment of the present invention, there is provided a reproducing apparatus comprising: a recording medium changer part including a plurality of storage trays that are arranged in alignment in a predetermined direction and each store a recording medium, and a conveying mechanism that is movable in an alignment direction of the plurality of storage trays and conveys a recording medium; and a drive device part configured to perform reproduction of an information signal stored in the recording medium, wherein the plurality of storage trays are rotatable about an axis extending in the alignment direction of the storage trays, at the time of rotation of each of the storage trays, the conveying mechanism is held in a movement preparing position retracted in the alignment direction from the storage tray that is being rotated, and each of the storage trays has a movement cutout for forming at least a part of a movement space through which the conveying mechanism is moved.

BRIEF DESCRIPTION OF THE DRAWINGS

FIG. 31 is an enlarged perspective view showing a rotation gear and the like;

FIG. 46 is a diagram showing information related to each disk-shaped recording medium stored in a memory;

DESCRIPTION OF THE PREFERRED EMBODIMENTS

Hereinbelow, the best mode for carrying out the present invention will be described with reference to the attached drawings. In the best mode described below, the present invention is applied to a disk changer.

In the following description, for the convenience of description, the front, rear, up, down, left, and right directions are taken as directions as viewed from the user. Therefore, the user side is taken as the front, and the recording medium changer side as viewed from the user is taken as the rear.

Figure 1:
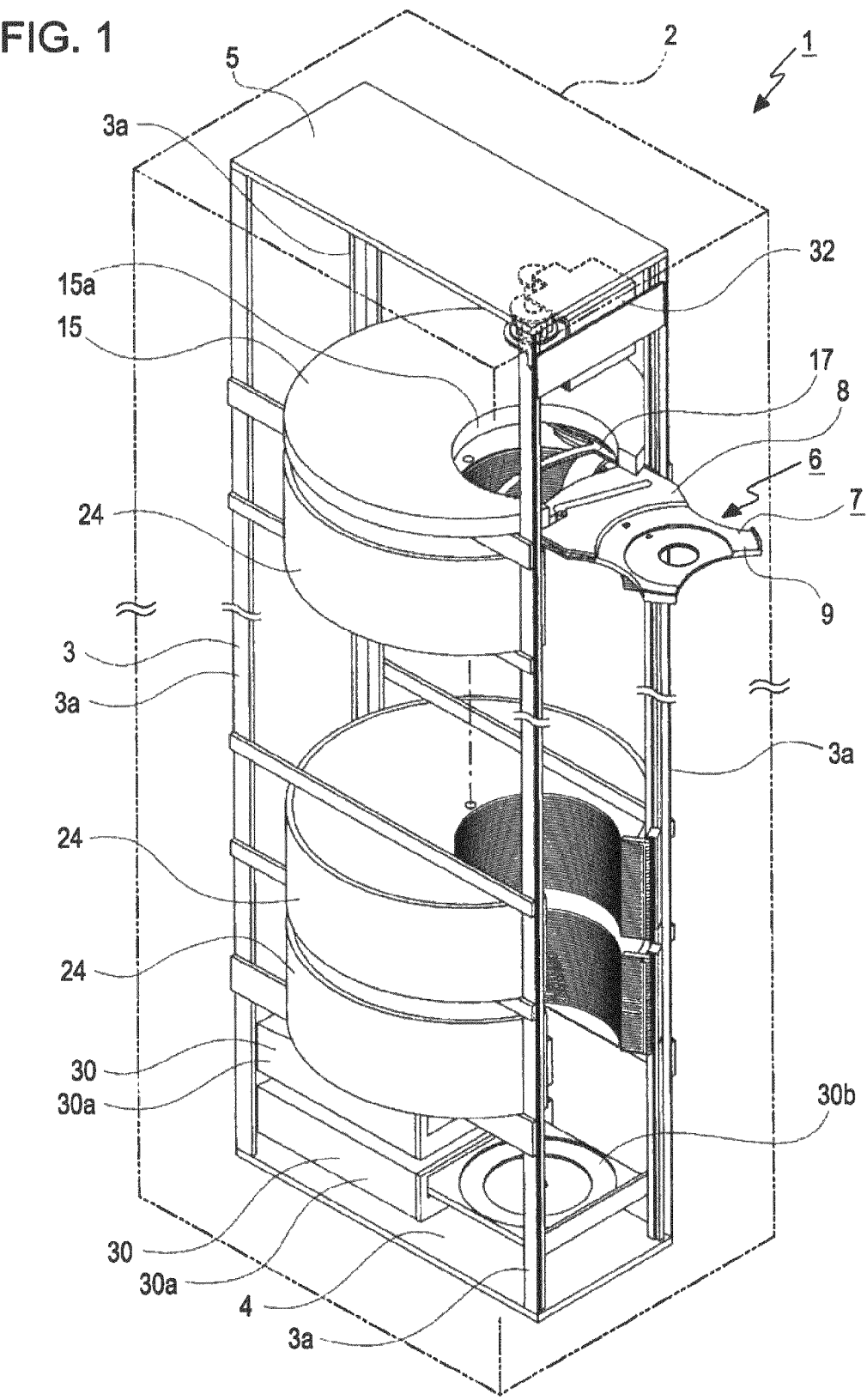
FIG. 1 is a schematic perspective view of a disk changer, illustrating the best mode of the present invention together with FIGS. 2 to 70.

As shown in FIG. 1, a recording medium changer (disk changer) 1 has required components arranged within a vertically oriented outer housing 2. A frame structure 3 formed by joining a plurality of frames together is arranged within the outer housing 2. The frame structure 3 is arranged on a bottom plate 4, and a top plate 5 is attached to the upper end of the frame structure 3.

A delivery block 6 is provided at a position near the upper end of the frame structure 3. The delivery block 6 is a block for delivering a recording medium (disk-shaped recording medium) 200 in and out of the recording medium changer 1. The delivery block 6 has a delivery tray 7.

Figure 2:
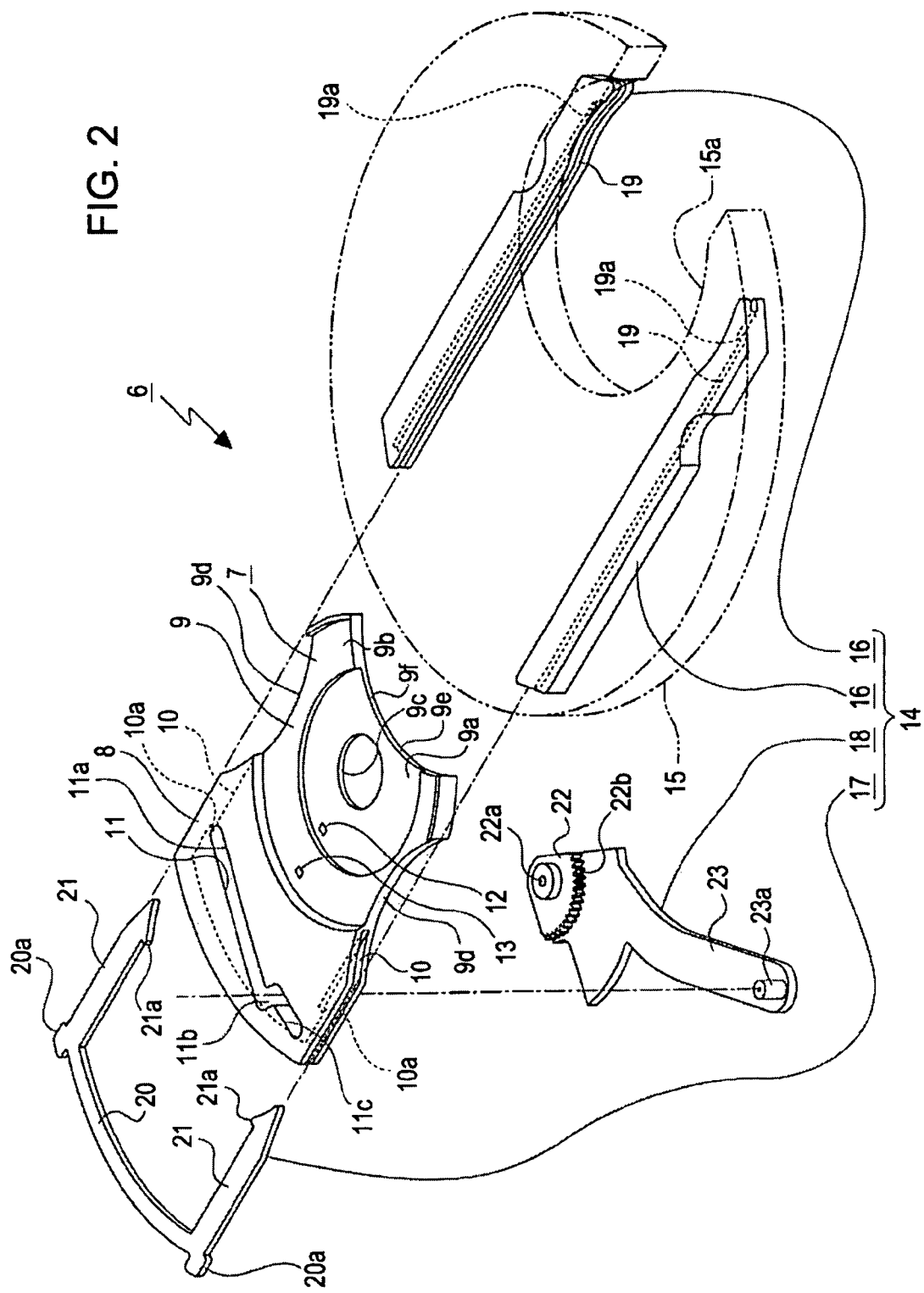
FIG. 2 is an exploded perspective view of a delivery block.
Figure 3:
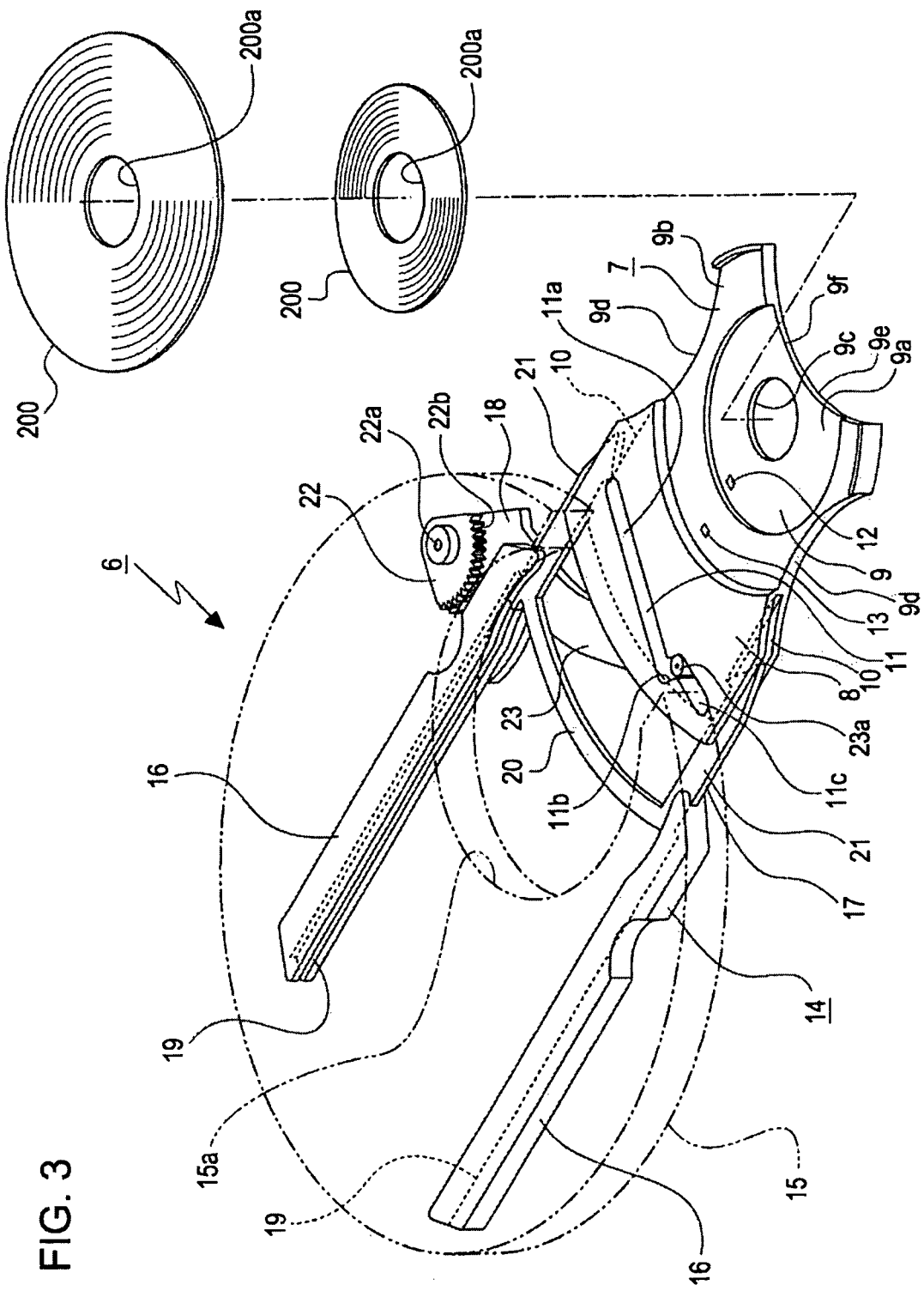
FIG. 3 is a perspective view of the delivery block.

The delivery tray 7 includes a support plate portion 8 located in the rear side, and a recording medium loading portion 9 located in the front side (see FIGS. 2 and 3).

A support groove 10 is formed in the outer circumferential surface of the support plate portion 8, and stopper steps 10a, 10a directed forward are formed in the support groove 10 on the left and right so as to be spaced apart from each other.

A cam hole 11 is formed in the support plate portion 10. The cam groove 11 includes a first linear cam portion 11a, a stop cam portion 11b continuous to the first linear cam portion 11a, and a second linear cam portion 11c continuous to the stop cam portion 11b. The first linear cam portion 11a is inclined so that its left end portion is located slightly rearward with respect to the right end portion. The stop cam portion 11b is continuous to the left end of the first linear cam portion 11a, and formed in a short, gently arcuate shape. The stop cam portion 11b is formed so as to be substantially orthogonal to the first linear portion 11a. The second linear cam portion 11c is continuous to the front end of the stop cam portion 11b, and formed so as to extend to the left and right.

The recording medium loading portion 9 is formed as a shallow recess, and has a small-diameter loading portion 9a located on the center side and a large-diameter loading portion 9b located on the outer side of the small-diameter loading portion 9a. A disk-shaped recording medium 200 with a diameter of about 8 cm, for example, is loaded onto the small-diameter loading portion 9a, and the disk-shaped recording medium 200 with a diameter of about 12 cm, for example, is loaded onto the large-diameter loading portion 9b. The small-diameter loading portion 9b is formed slightly deeper than the large-diameter loading portion 9b. Sensors 12, 13 for detecting the presence/absence of a loaded disk-shaped recording medium 200 are provided in the small-diameter loading portion 9a and the large-diameter loading portion 9b, respectively.

A through-hole 9c is formed at the central portion of the recording medium loading portion 9. Gripping cutouts 9d, 9d, 9d are respectively formed on the left and right sides of the recording medium loading portion 9. The recording medium loading portion 9 has a relief cutout 9e formed at its front side. The relief cutout 9e is formed in a position extending across the large-diameter loading portion 9b and the small-diameter loading portion 9a. A front edge 9f of the recording medium loading portion 9 is formed in an arcuate shape that is convex rearward due to the relief cutout 9e.

By forming the gripping cutouts 9d, 9d in the delivery tray 7 as mentioned above, a part of the disk-shaped recording medium 200 loaded on the large-diameter loading portion 9b is projected sideways from the recording medium loading portion 9, thereby allowing easy unloading of the disk-shaped recording medium 200 from the large-diameter loading portion 9b.

It should be noted that by forming the relief cutout 9e in the delivery tray 7 as mentioned above, a part of the disk-shaped recording medium 200 loaded on the small-diameter loading portion 9a and the large-diameter loading portion 9b is projected forward from the recording medium loading portion 9, thereby allowing easy unloading of the disk-shaped recording medium 200 from the small-diameter loading portion 9a and the large-diameter loading portion 9b.

While the above-mentioned example is directed to the case where the gripping cutouts 9d, 9d are formed in the large-diameter loading portion 9b, it is also possible to form the gripping cutouts 9d, 9d in a position extending across the large-diameter loading portion 9b and the small-diameter loading portion 9a to thereby facilitate unloading of the disk-shaped recording medium 200 from the small-diameter loading portion 9a and the large-diameter loading portion 9b.

Figure 4:
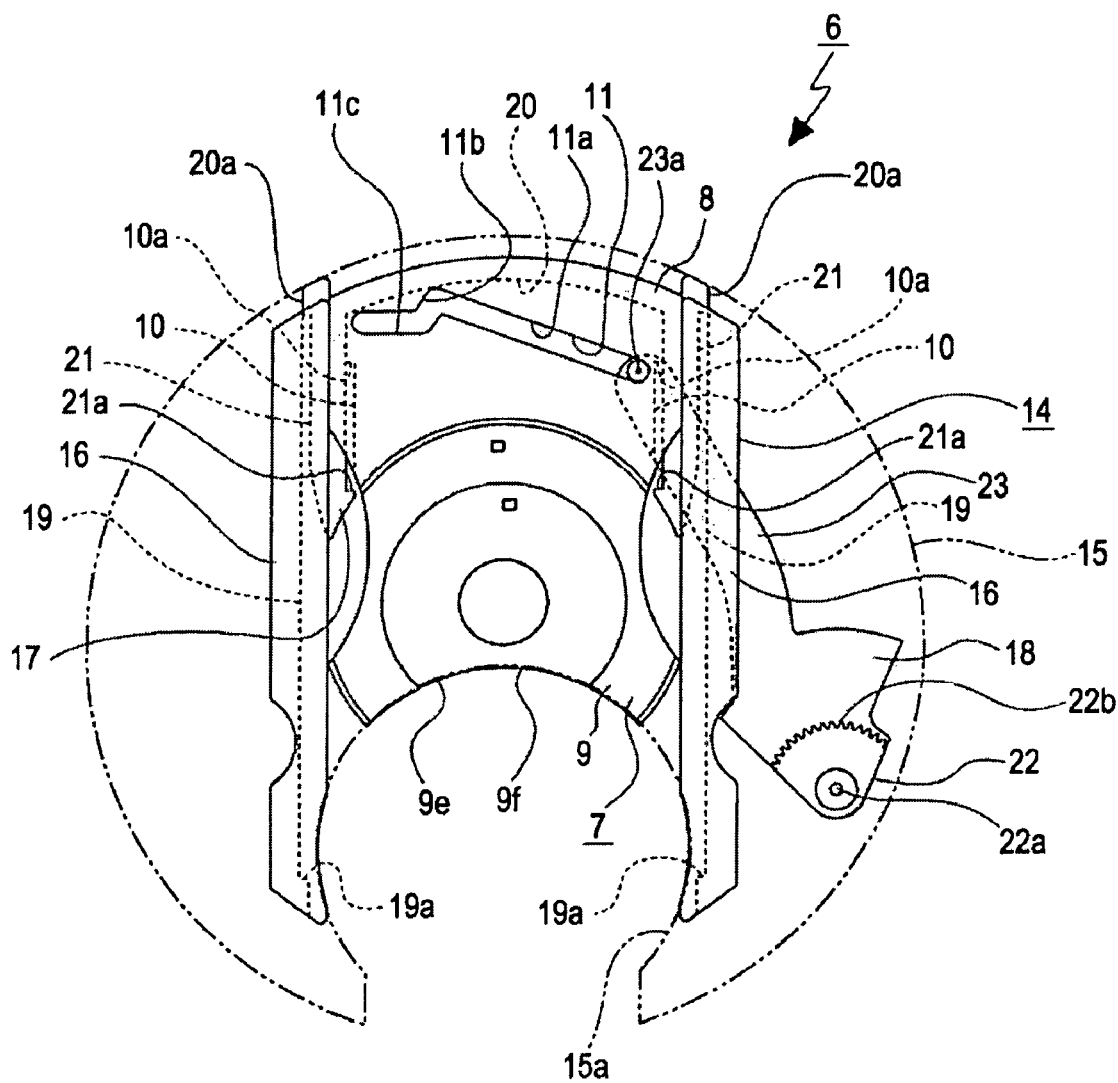
FIG. 4 is a plan view showing a state with the delivery tray in a retracted position, illustrating the operation of a moving mechanism together with FIGS. 5 to 9.

The delivery tray 7 is moved in the front-rear direction by a moving mechanism 14 (see FIGS. 2 to 4). The moving mechanism 14 is formed by components arranged on a support base 15, and includes guide rails 16, 16, an intermediate movable member 17, and an arm lever 18.

A forwardly open cutout portion 15a is formed in the support base 15. The cutout portion 15a is formed in a circular shape except at its front end portion.

The guide rails 16, 16 are formed in the lower surface of the support base 15 on the left and right so as to be spaced apart from each other. The guide rails 16, 16 are formed so as to be elongated from front to rear, and have guide grooves 19, 19 respectively formed in their mutually opposed surfaces. Rearwardly directed movement-regulating steps 19a, 19a are respectively formed in the guide grooves 19, 19.

The intermediate movable member 17 is formed in a substantially C-shaped configuration that is forwardly open. The intermediate movable member 17 is integrally formed by a base portion 20 that extends substantially to the left and right, and side portions 21, 21 that are projected forward from the left and right end portions of the base portion 20. Outwardly projected regulation pieces 20a, 20a are respectively provided at the left and right end portions of the base portion 20. Inwardly projected stopper pieces 21a, 21a are respectively projected at the front end portions of the side portions 21, 21. The side portions 21, 21 of the intermediate movable member 17 are respectively slidably supported in the guide grooves 19, 19 of the guide rails 16, 16.

The arm lever 18 is pivotably supported on the support base 15, and is integrally formed by an actuation portion 22 and an arm portion 23 that is projected from the actuation portion 22.

The actuation portion 22 has a pivot point 22a, and has a rack gear 22b extending in an arcuate shape centered on the pivot point 22a. An upwardly projected cam pin 23a is provided at the distal end portion of the arm portion 23. The cam pin 23a is slidably engaged with the cam hole 11 of the delivery tray 7.

A reduction gear (not shown) is meshed with the rack gear 22b of the actuation portion 22. The reduction gear is rotated by a motor (not shown). The motor and the reduction gear are arranged on the support base 15.

The delivery tray 7 is moved by the moving mechanism 14 between three positions, that is, a retracted position above a storage tray described later, a delivery position where delivery of the disk-shaped recording medium 200 is performed between the delivery tray 7 and a conveying mechanism described later, and an eject position where loading and unloading of the disk-shaped recording medium 200 is performed (see FIGS. 4 to 9).

The retracted position represents the movable end of the delivery tray 7 on the rear side, where the front edge 9f of the recording medium loading portion 9 is vertically aligned with the opening edge of the cutout portion 15a of the support base 15 (see FIG. 4). In the retracted position, the cam pin 23a of the arm lever 18 is engaged with the right end portion in the linear cam portion 11a of the cam hole 11 of the delivery tray 7.

As mentioned above, the relief cutout 9e is formed in the delivery tray 7, and the front edge 9f of the recording medium loading portion 9 is formed in an arcuate shape in conformity to the opening edge of the cutout portion 15a of the support base 15. It is thus possible to easily prevent the delivery tray 7 in the retracted position from projecting toward the cutout portion 15a.

Figure 5:
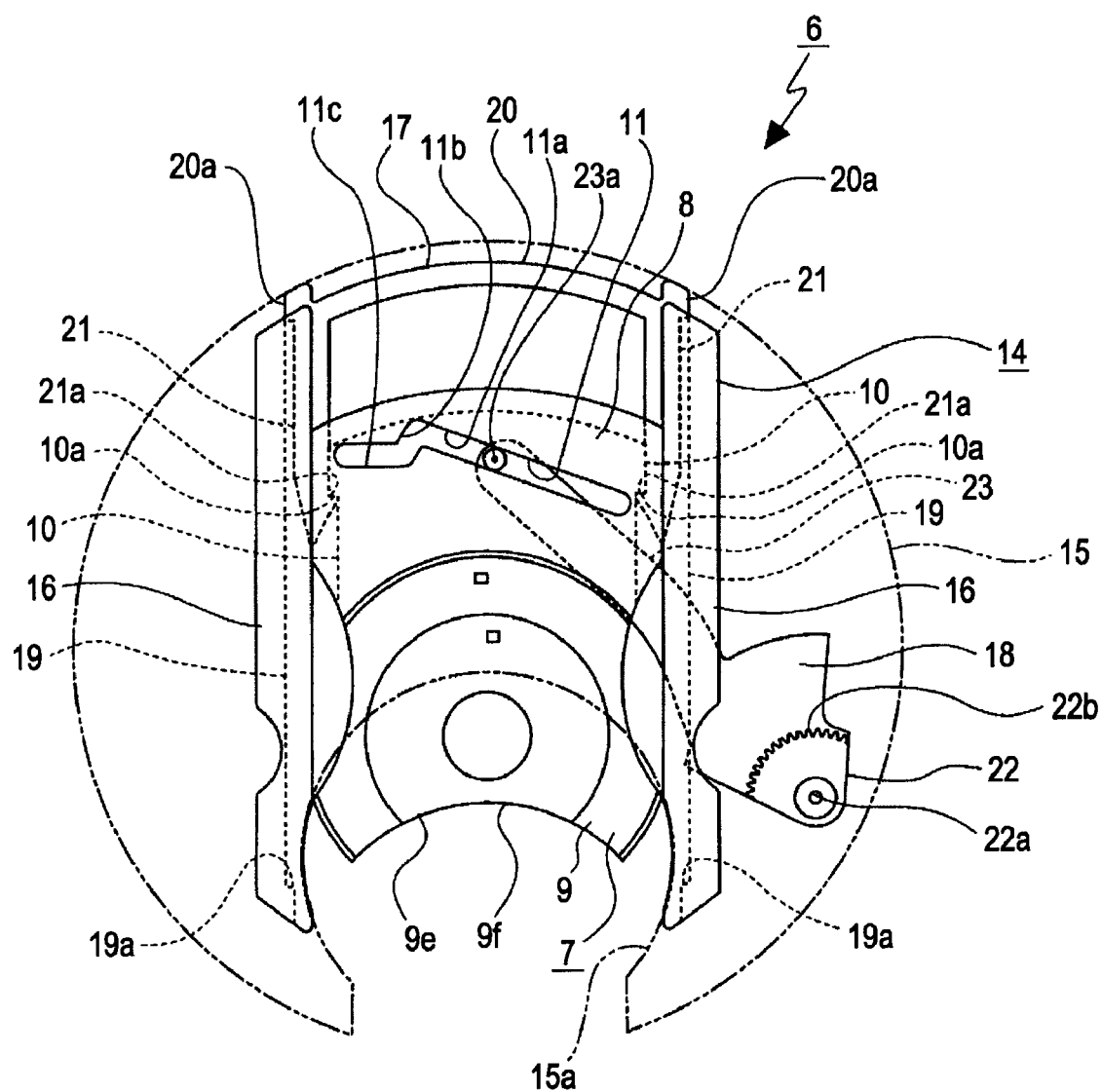
FIG. 5 is a plan view, continuing from FIG. 4, showing a state with the delivery tray moved forward.

When the motor is rotated in one direction in the state with the delivery tray 7 located in the retracted position, the rack gear 22b is driven by the reduction gear, causing the arm lever 18 to pivot (see FIG. 5). Due to the pivotal movement of the arm lever 18, the cam pin 23a is moved in the first linear cam portion 11a of the cam hole 11 toward the stop cam portion 11b, so the delivery tray 7 is moved forward with respect to the intermediate movable member 17.

As the delivery tray 7 is moved forward with respect to the intermediate movable member 17, the stopper steps 10a, 10a of the support groove 10 come into contact with the respective regulation pieces 20a, 20a of the intermediate movable member 17.

Figure 6:
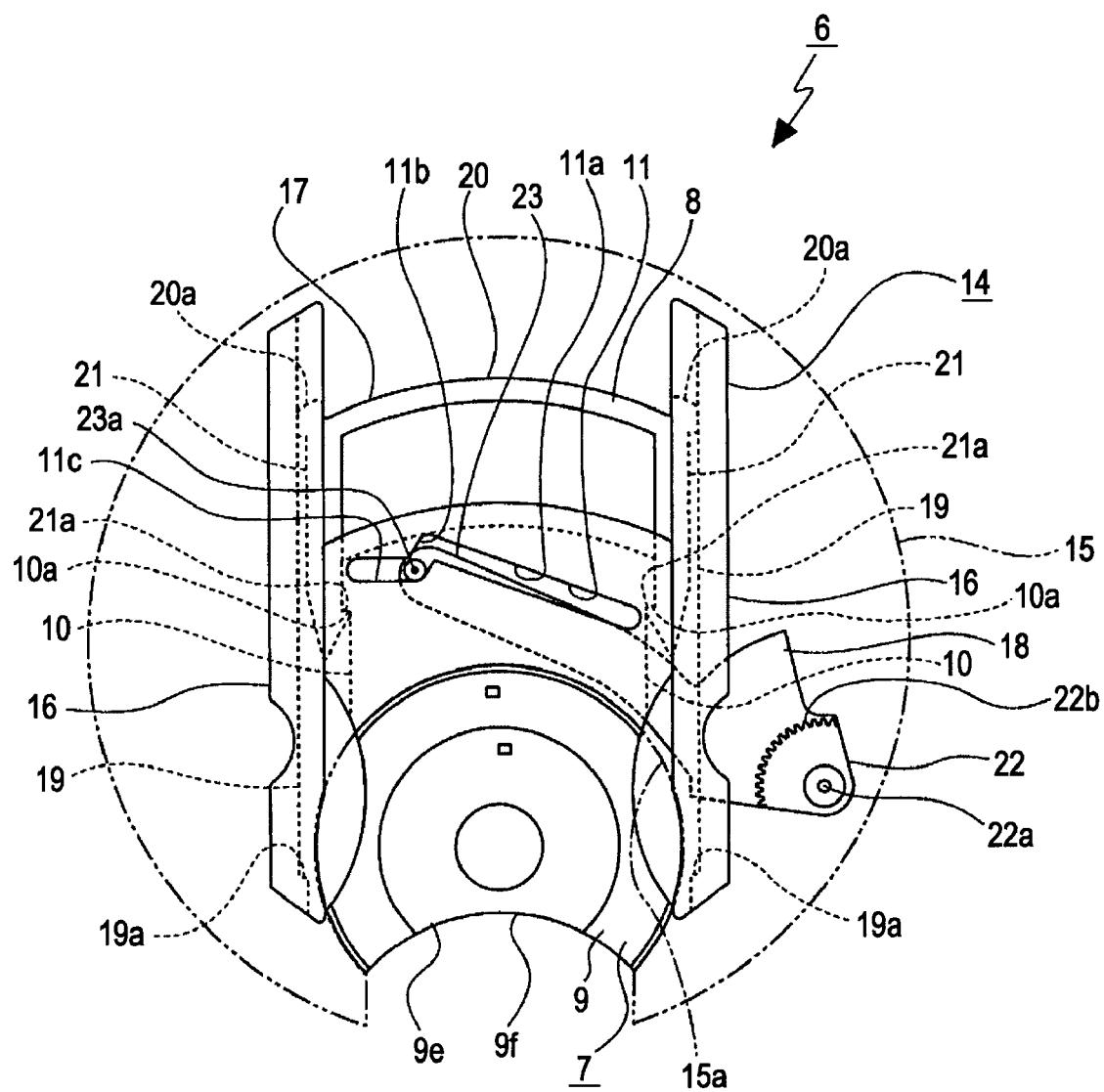
FIG. 6 is a plan view, continuing from FIG. 5, showing a state with the delivery tray moved forward and reaching a delivery position.

Since the stopper steps 10a, 10a of the delivery tray 7 come into contact with the regulation pieces 20a, 20a of the intermediate movable member 17, when the motor is continued to rotate, the delivery tray 7 and the intermediate movable member 17 are integrally moved forward (see FIG. 6).

When the cam pin 23a is moved to the stop cam portion 11b of the cam hole 11 due to pivotal movement of the arm lever 18, the forward movement of the delivery tray 7 and intermediate movable member 17 is stopped, and the delivery tray 7 reaches the delivery position (see FIG. 6). In the delivery position, the recording medium loading portion 9 of the delivery tray 7 is located in a position vertically corresponding to the cutout portion 15a of the support base 15.

When the motor is further rotated in the same direction, the arm lever 18 is pivoted, the cam pin 23a is moved from the stop cam portion 11b of the cam hole 11 toward the second linear cam portion 11c, and the delivery tray 7 and the intermediate movable member 17 are integrally moved forward again.

Figure 7:
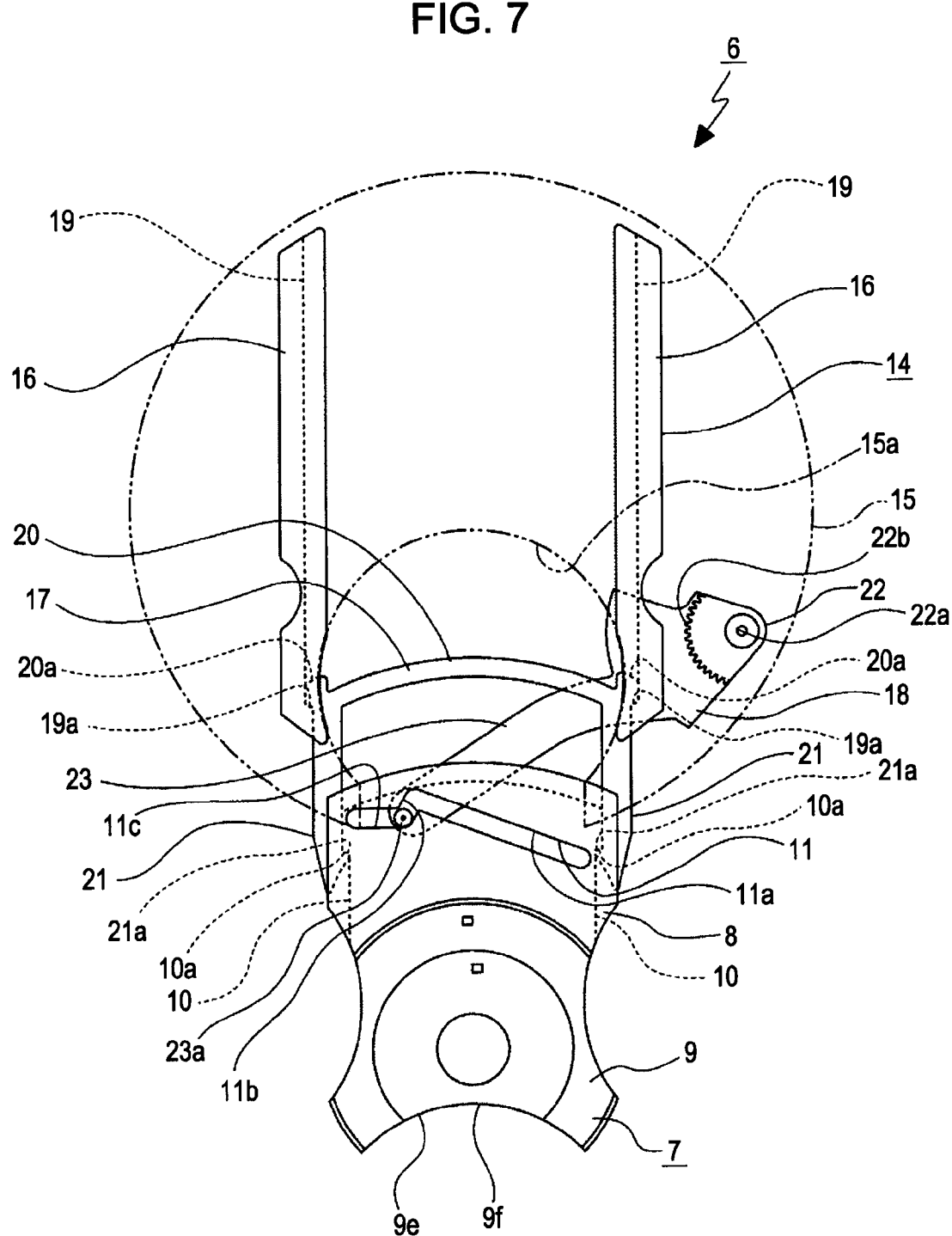
FIG. 7 is a plan view, continuing from FIG. 6, showing a state with the delivery tray moved forward and reaching an eject position.

When the delivery tray 7 and the intermediate movable member 17 are moved forward, the regulation pieces 20a, 20a of the intermediate movable member 17 respectively come into contact with the movement-regulating steps 19a, 19a of the guide rails 16, 16 so that the forward movement of the intermediate movable member 17 is regulated, and the delivery tray 7 is projected forward from the outer housing 2 to reach the eject position (see FIG. 7).

When the delivery tray 7 is moved from the delivery position to the eject position, the cam pin 23a is temporarily moved from the stop cam portion 11b to the left end portion of the second linear cam portion 11c, and then moved to the stop cam portion 11b again. In the eject position, the user can perform loading or unloading of the disk-shaped recording medium 200 to/from the recording medium loading section 9 of the delivery tray 7.

Figure 8:
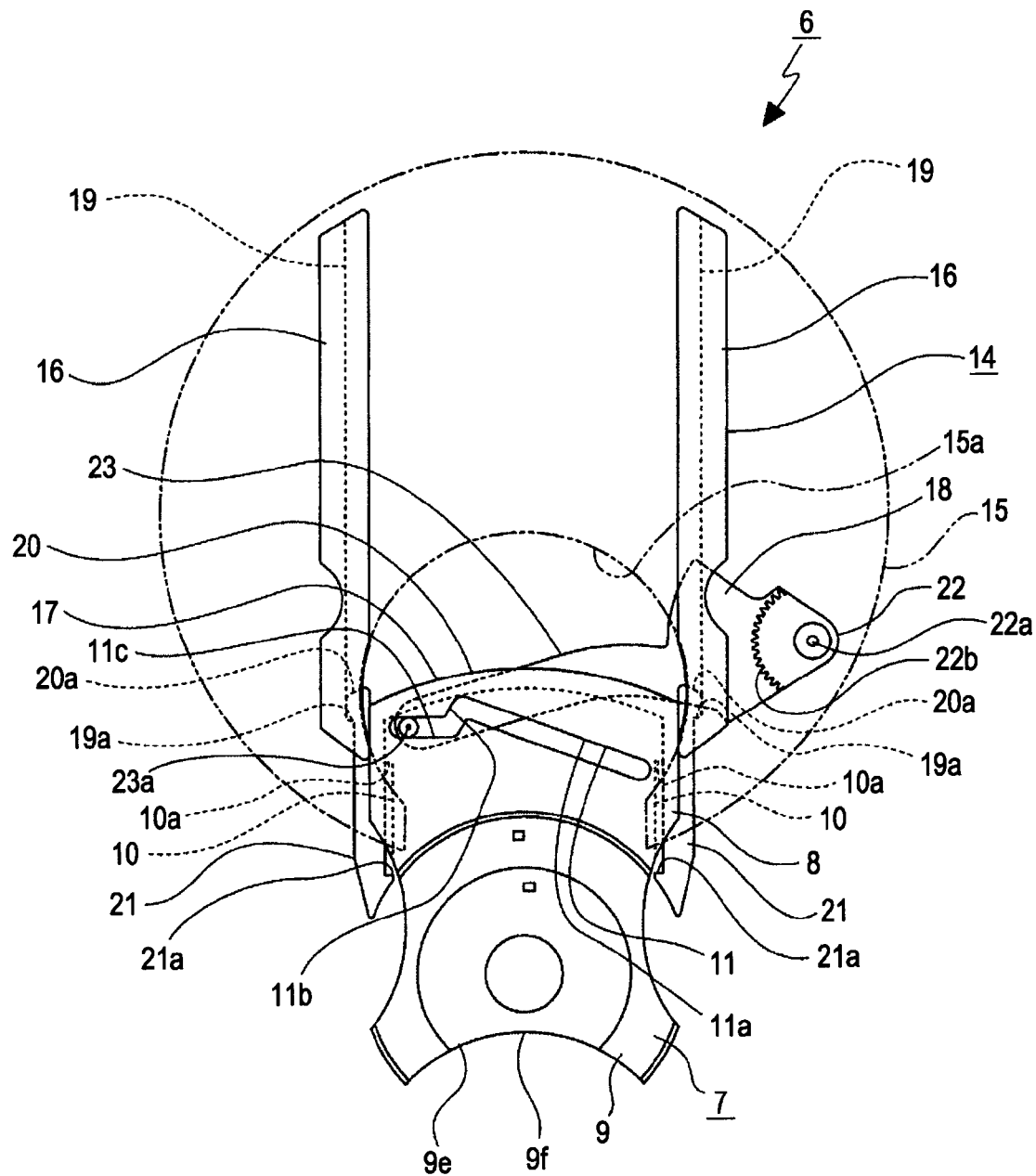
FIG. 8 is a plan view showing a state with the delivery tray moved rearward from the eject position.
Figure 9:
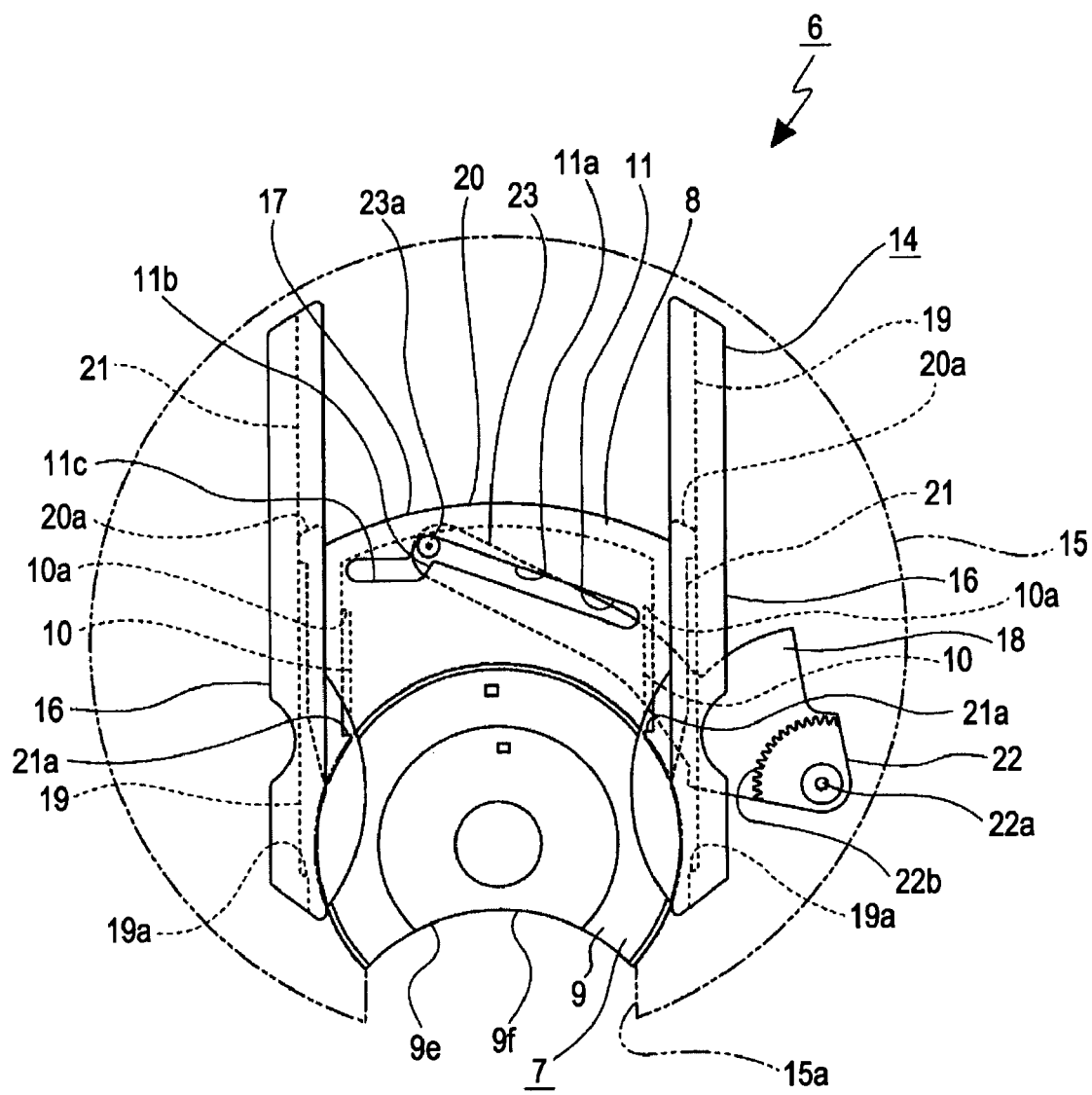
FIG. 9 is a plan view, continuing from FIG. 8, showing a state with the delivery tray moved rearward and reaching the delivery position.

When the motor is rotated in the reverse direction in the eject position, the delivery tray 7 is moved rearward with respect to the intermediate movable member 17 due to pivotal movement of the arm lever 18, and the rear end portion of the delivery tray 7 comes into contact with the base portion 20 of the intermediate movable member 17 (see FIG. 8). The motor is continued to rotate, the delivery tray 7 and the intermediate movable member 17 are integrally moved rearward, and when the cam pin 23a has been moved to the stop cam portion 11b, the movement of the delivery tray 7 and intermediate movable member 17 is stopped and the delivery tray 7 reaches the delivery position (see FIG. 9).

When the motor is further rotated in the reverse direction, the delivery tray 7 and the intermediate movable member 17 are integrally moved rearward due to pivotal movement of the arm lever 18. Then, when the cam pin 23a has been moved to the right end portion of the first linear cam portion 11a, the movement of the delivery tray 7 and intermediate movable member 17 is stopped, so the delivery tray 7 reaches the retracted position (see FIG. 4).

Tray housings 24, 24, . . . are arranged in a vertically aligned manner at a position directly below the delivery block 6 (see FIG. 1).

Figure 10:
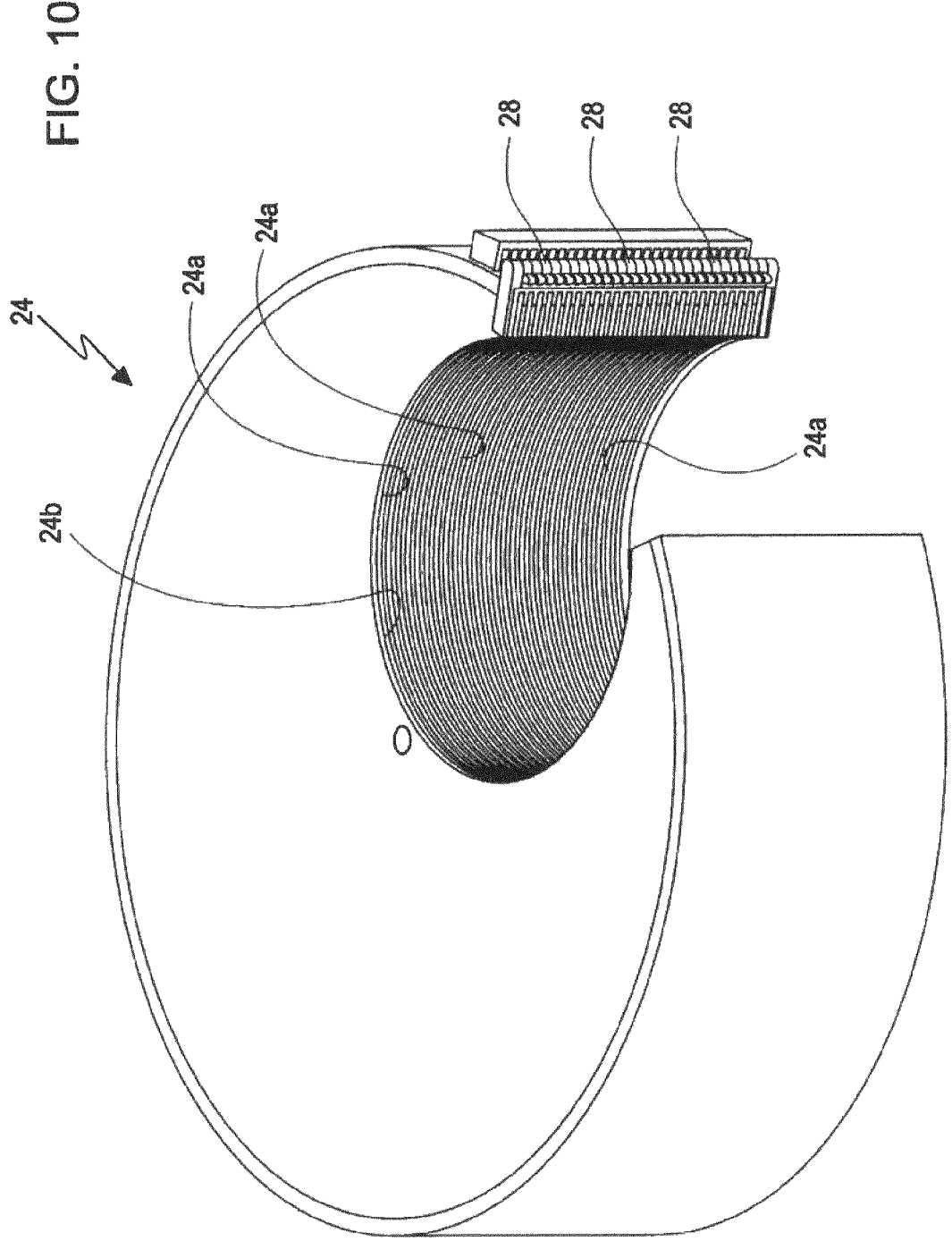
FIG. 10 is a perspective view of a tray housing.

The tray housing 24 is formed in the same shape as the support base 15 in plan view. As shown in FIG. 10, inside the tray housing 24, storage spaces 24a, 24a, . . . for respectively storing storage trays 25, 25, . . . are formed so as to be spaced apart at equal vertical intervals. The tray housing 24 has a cutout 24b formed in the same size and shape as the support base 15.

Figure 11:
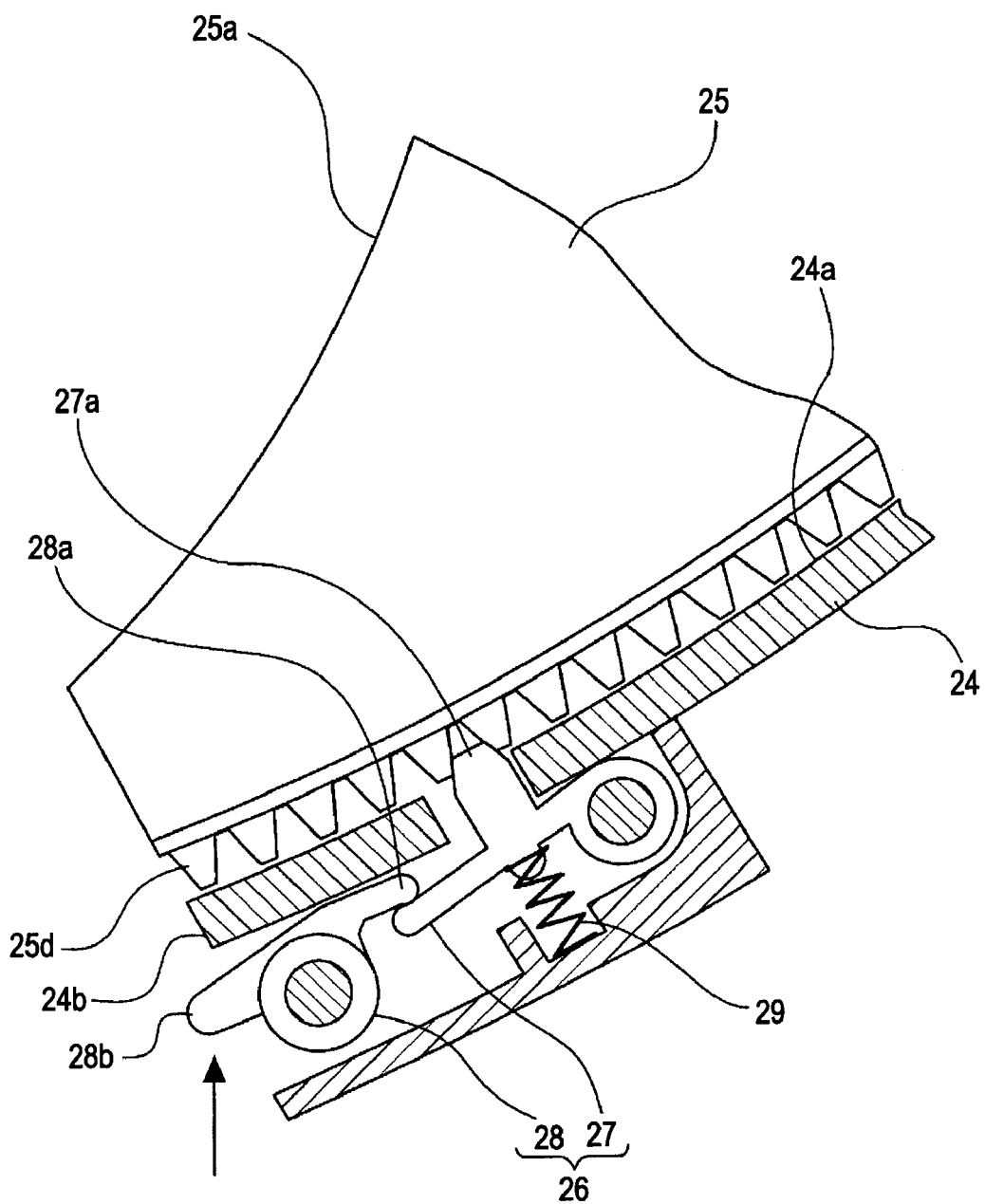
FIG. 11 is an enlarged plan view showing a state with a storage tray locked by locking means.

In the opening edge portion of the cutout 24b of the tray housing 24, locking means 26, 26, . . . is supported at the front end thereof for each storage space 24a, 24a, . . . (see FIG. 11).

Figure 12:
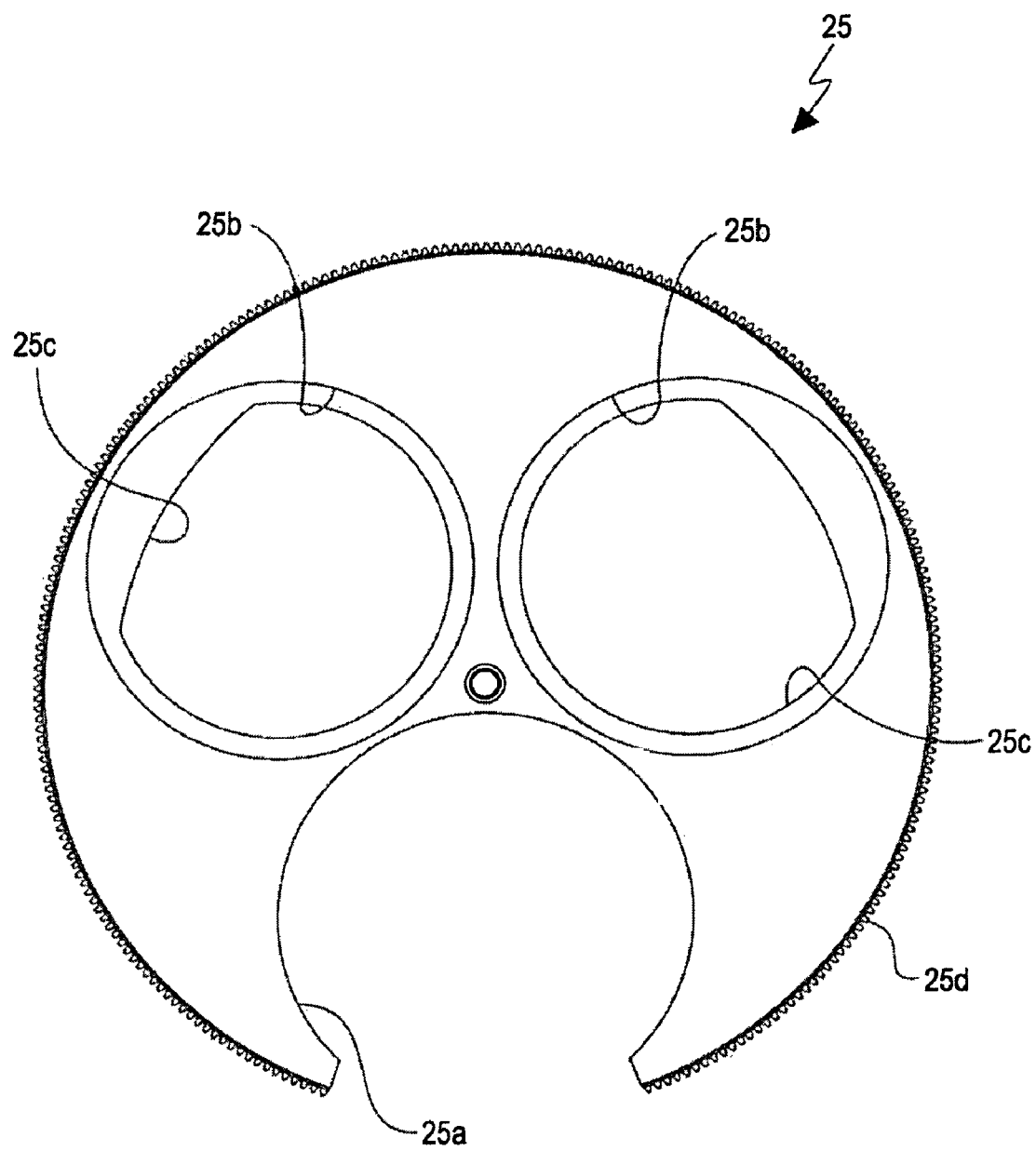
FIG. 12 is a plan view of the storage tray.

The storage tray 25 is formed in the same shape as the support base 15 as seen in plan view, and has a movement cutout 25a (see FIG. 12). The storage tray 25 has, for example, two storage recesses 25b, 25b formed so as to be circumferentially spaced apart from each other. The disk-shaped recording media 200, 200 are individually stored in the storage recesses 25b, 25b. Shaft-portion insertion holes 25c, 25c that vertically extend through the storage recesses 25b, 25b are respectively formed in the portion of the storage recesses 25b, 25b excluding their outer circumferential portion. A rotation rack portion 25d is provided in the outer circumferential surface of the storage tray 25.

The locking means 26 includes a lock member 27 and a pivotal lever 28 that are supported so as to be pivotable. A lock projection 27a is provided in the lock member 27. One end portion 28a of the pivotal lever 28 is brought into engagement with the lock member 27 from the rear side, and the other end portion 28b is projected from the tray housing 24. The lock member 27 is urged in one pivotal direction, that is, in a direction for bringing the lock projection 27a into engagement with the rotation rack portion 25d of the storage tray 25, by means of a spring 29 arranged in the storage space 24a.

The storage trays 25, 25, . . . are locked by the locking means 26 in a conveyance position where a conveying mechanism described later can move through the movement cutouts 25a, 25a, . . . , that is, in a position where the entirety of the storage trays 25, 25, . . . is stored in the storage spaces 24a, 24a, . . . of the tray housing 24.

At a position directly below the tray housings 24, 24, . . . , drive devices 30, 30 are arranged on the bottom plate 4 in a vertically overlapped state (see FIG. 1). The drive device 30 has a main body portion 30a and a tray 30b supported so as to be freely inserted into and removed from the main body portion 30a. In the state with the tray 30b drawn out from the main body portion 30a, the tray 30b is located directly below the cutouts 24b, 24b, . . . of the tray housings 24, 24, . . . .

The front end portion of the frame structure 3 is formed as supporting columns 3a, 3a provided on the left and right so as to be spaced apart from each other (see FIG. 1). Vertically extending conveyance racks 31, 31 are respectively provided at positions near the supporting columns 3a, 3a.

A moving block 32 is supported on the supporting columns 3a, 3a so as to be vertically movable (see FIG. 1). A conveying mechanism 33 is provided in the moving block 32 (see FIG. 13). The moving block 32 is moved through the movement cutouts 25a, 25a, . . . of the storage trays 25, 25, . . . , the cutouts 24b, 24b, . . . of the tray housings 24, 24, . . . , and the cutout 15a formed in the support base 15 of the moving mechanism 14. Therefore, the movement cutouts 25a, 25a, . . . , the cutouts 24b, 24b, . . . , and the cutout 15a each serve as a movement space through which the movable block 32 is moved.

As mentioned above, in the recording medium changer 1, the movement cutouts 25a, 25a, . . . each serving as a movement space for the moving block 32 are formed in the rotatable storage trays 25, 25, . . . . Accordingly, a movement space is formed within the rotation locus of the storage trays 25, 25, . . . , thereby making it possible to achieve miniaturization while securing a movement space for the moving block 32.

Further, as mentioned above, in the recording medium changer 1, the drive devices 30, 30 are arranged within the projected area of the storage trays 25, 25, . . . with respect to the alignment direction (vertical direction) of the storage trays 25, 25, . . . . Accordingly, it is possible to avoid an increase in the size of the recording medium changer 1 even when the drive devices 30 are arranged.

Figure 13:
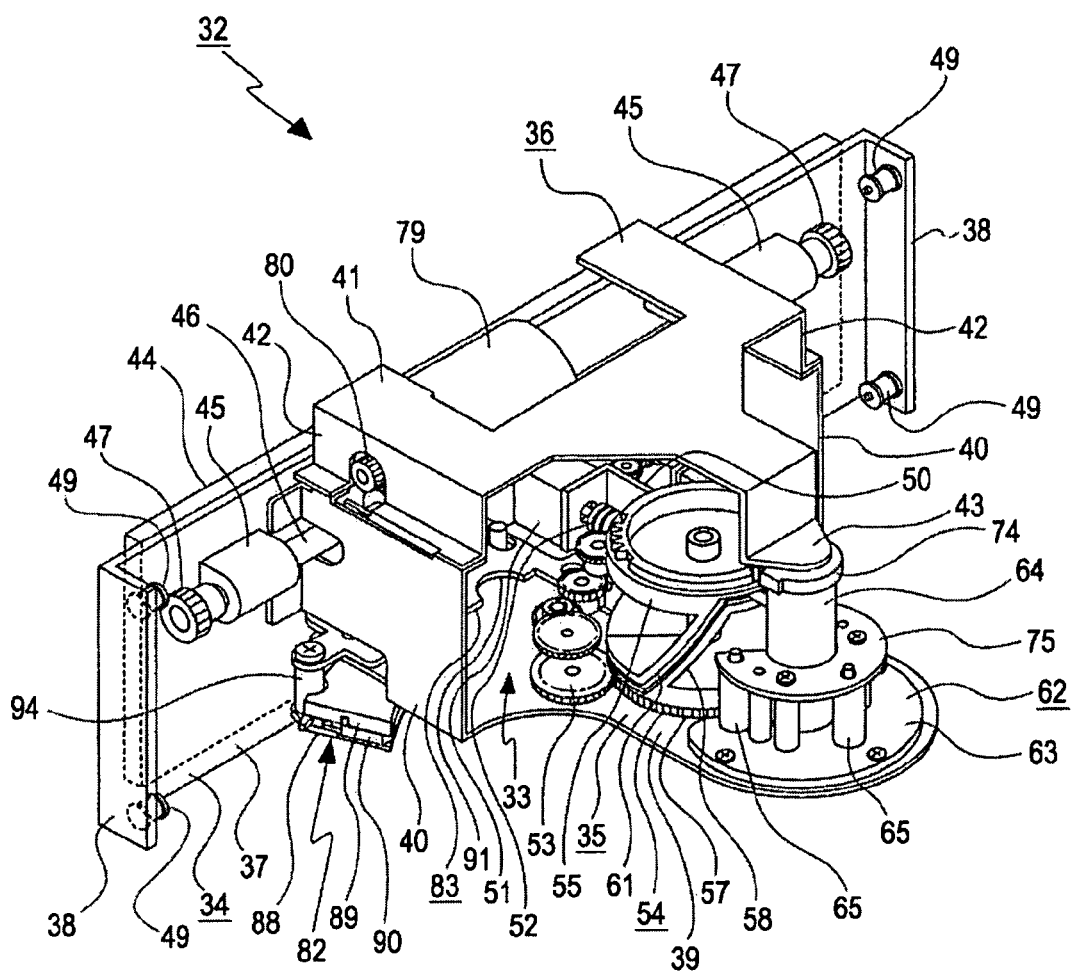
FIG. 13 is a perspective view of the moving block.
Figure 14:
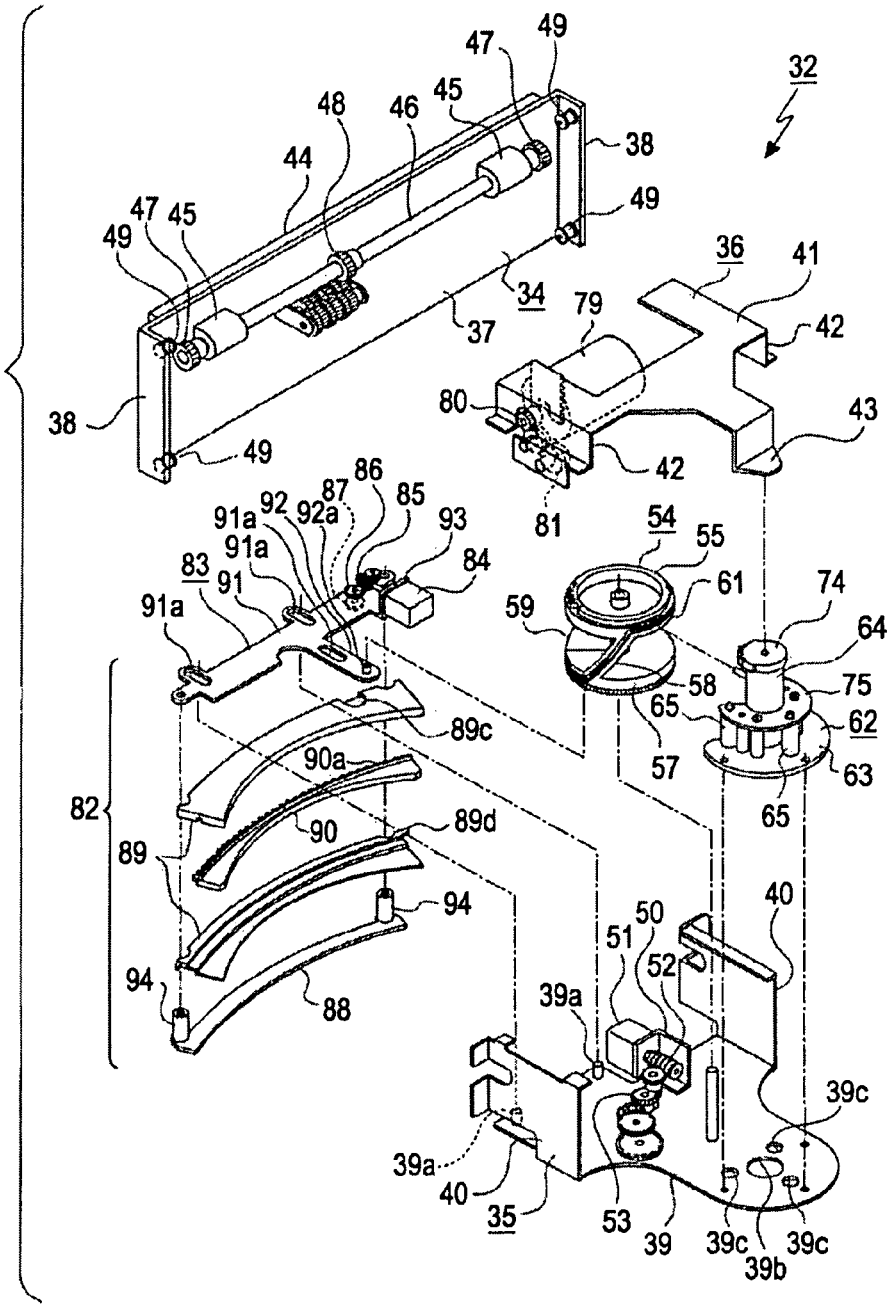
FIG. 14 is an exploded perspective view of the moving block.

The conveying mechanism 33 has its required components supported by a first bracket 34, a second bracket 35, and a third bracket 36 (see FIGS. 13 and 14).

The first bracket 34 has a horizontally elongated front plate portion 37, and side plate portions 38, 38 respectively projected rearward from the left and right side edges of the front plate portion 37.

The second bracket 35 has a bottom portion 39 that is elongated in the front-rear direction, and side portions 40, 40 respectively projected upward from the left and right side edges of the bottom portion 39. The front end portions of the side portions 40, 40 are attached to the front plate portion 37 of the first bracket 34.

The third bracket 36 has an upper wall portion 41, side wall portions 42, 42 respectively projected downward from the left and right side edges of the upper wall portion 41, and a pressing wall portion 43 that is projected rearward from the rear edge of the upper wall portion 41. The lower end portions of the side wall portions 42, 42 are respectively attached to the upper end portions of the side portions 40, 40 of the second bracket 35.

A driving substrate 44 is attached to the front surface of the front plate portion 37 of the first bracket 34. The driving substrate 44 is a substrate for performing drive and control of the moving block 32.

Bearings 45, 45 are attached to the rear surface of the front plate portion 37 so as to be spaced apart from each other on the left and right. A rotary shaft 46 is supported on the bearings 45, 45. The rotary shaft 46 has rack gears 47, 47 respectively attached at opposite ends, and a connecting gear 48 attached at the intermediate portion. The rack gears 47, 47 are meshed with the conveyance racks 31, 31.

Feed rollers 49, 49, . . . are respectively supported on the inner surfaces of the side portions 38, 38 of the first bracket 34 so as to be vertically spaced apart from each other. The feed rollers 49, 49, . . . are rotatably engaged with the supporting columns 3a, 3a.

Guide shafts 39a, 39a are provided at the front end portion of the bottom portion 39 of the second bracket 35. The guide shafts 39a, 39a are located on the left and right so as to be spaced apart from each other, and are each projected upward.

A shaft-insertion hole 39b is formed at a position near the front end of the bottom portion 39. Pin-insertion holes 39c, 39c, 39c are formed at positions surrounding the shaft-insertion hole 39b of the bottom portion 39.

A motor attaching plate 50 is attached at the front end portion of the bottom portion 39. A drive motor 51 is attached to the motor attaching plate 50. A worm gear 52 is fixed to the motor shaft of the drive motor 51.

A reduction gear group 53 is supported on the bottom portion 39. The reduction gear group 53 is meshed with the worm gear 52.

A rotating cam gear 54 is supported at substantially the central portion of the bottom portion 39.

Figure 15:
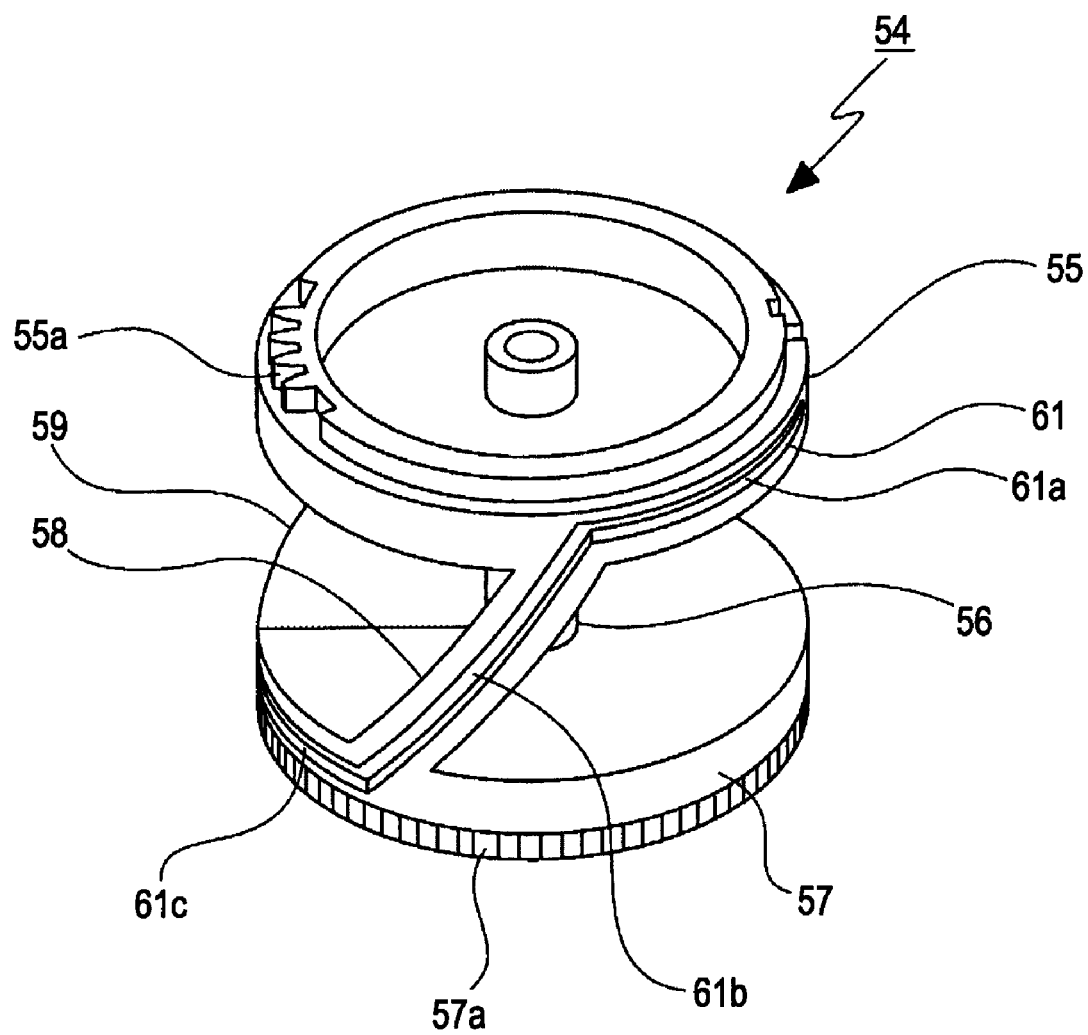
FIG. 15 is an enlarged perspective view of a rotating cam gear.
Figure 16:
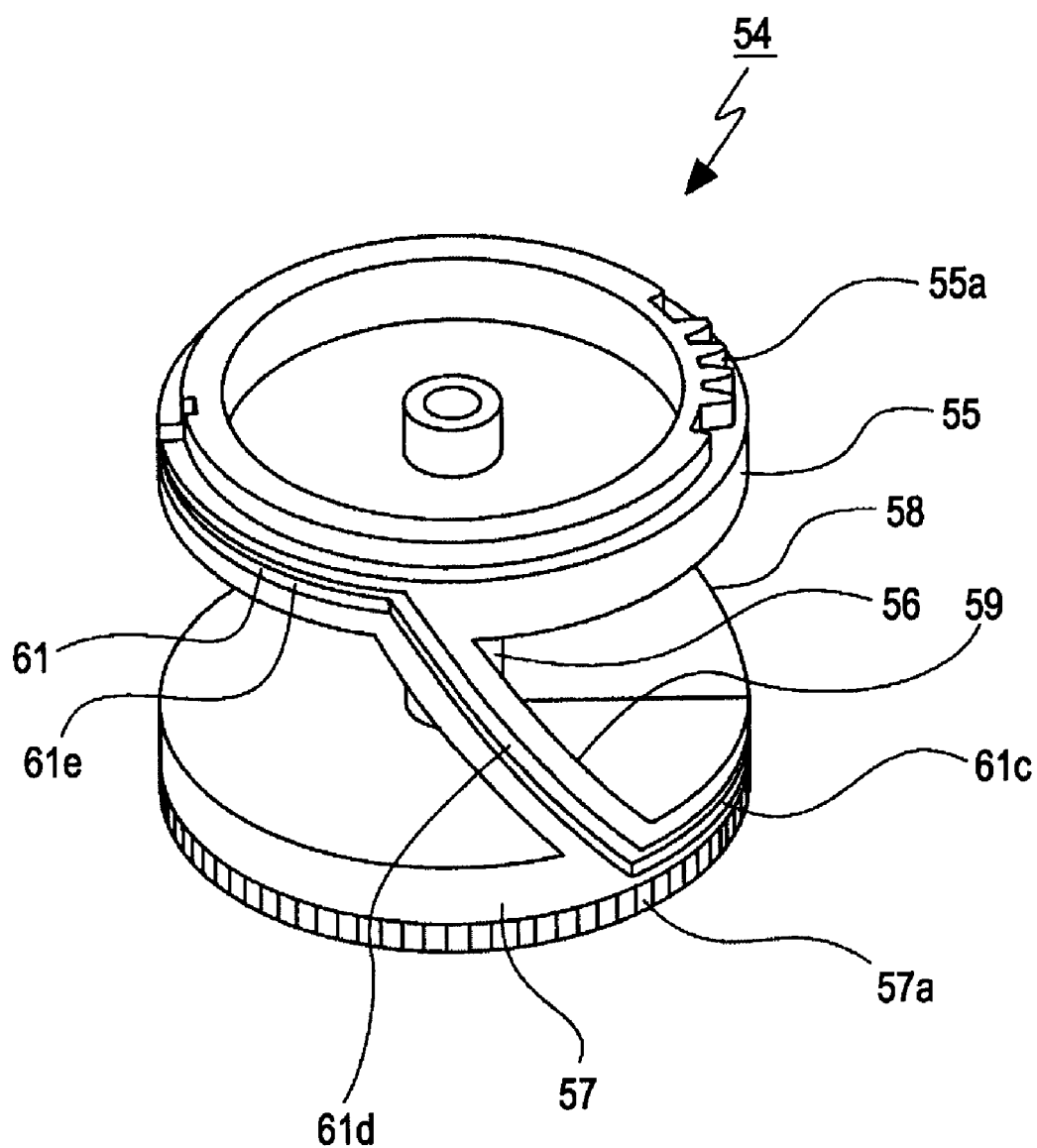
FIG. 16 is an enlarged perspective view of the rotating cam gear as seen in a direction opposite to that in FIG. 15.

As shown in FIGS. 15 and 16, the rotating cam gear 54 is integrally formed by an upper disk portion 55 located on the upper side, a lower disk portion 57 located directly below the upper disk portion 55, a center shaft portion 56 connecting between the center portion of the upper disk portion 55 and the center portion of the lower disk portion 57, and a first inclined portion 58 and a second inclined portion 59 that are provided so as to connect between the lower surface of the upper disk portion 55 and the upper surface of the lower disk portion 57.

A gear portion 55a is formed in a part of the outer circumferential surface of the upper disk portion 55.

Figure 17:
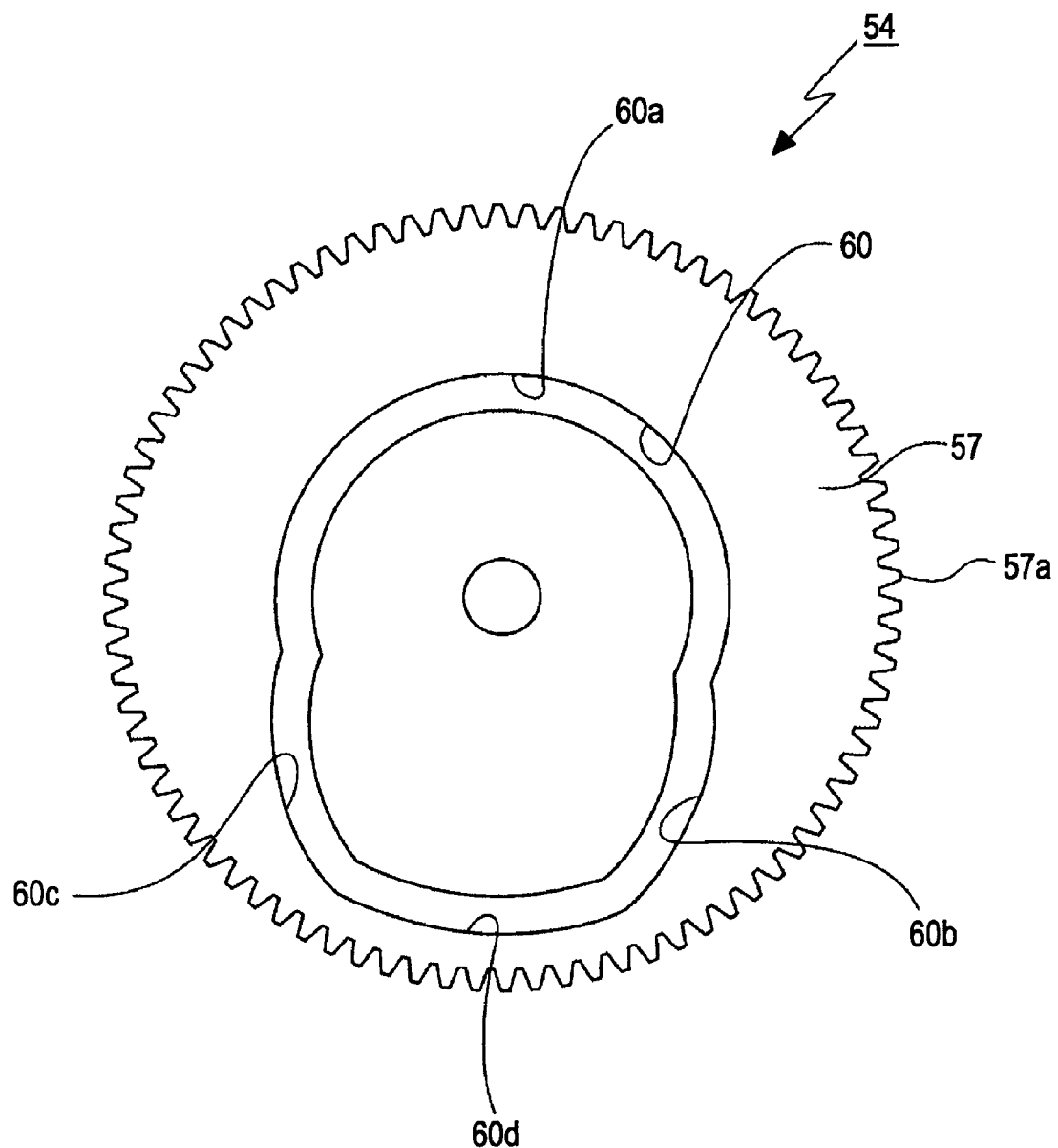
FIG. 17 is an enlarged bottom view of the rotating cam gear.

A rotation gear portion 57a is formed along the entire outer circumferential surface of the lower disk portion 57. An endless cam groove 60 is formed in the lower surface of the lower disk portion 57 (see FIG. 17). The endless cam groove 60 includes a first arcuate portion 60a formed in an arcuate shape centered on the center of the lower disk portion 57, a first action portion 60b and a second action portion 60c that are respectively continuous to the opposite ends of the first arcuate portion 60a and curved gently so as to extend in the outer circumferential direction, and a second arcuate portion 60d formed in an arcuate shape centered on the center of the lower disk portion 57 and located on the outer side with respect to the first arcuate portion 60a. The opposite ends of the second arcuate portion 60d are respectively continuous to the outer end of the first action portion 60b and the outer end of the second action portion 60c.

Figure 18:
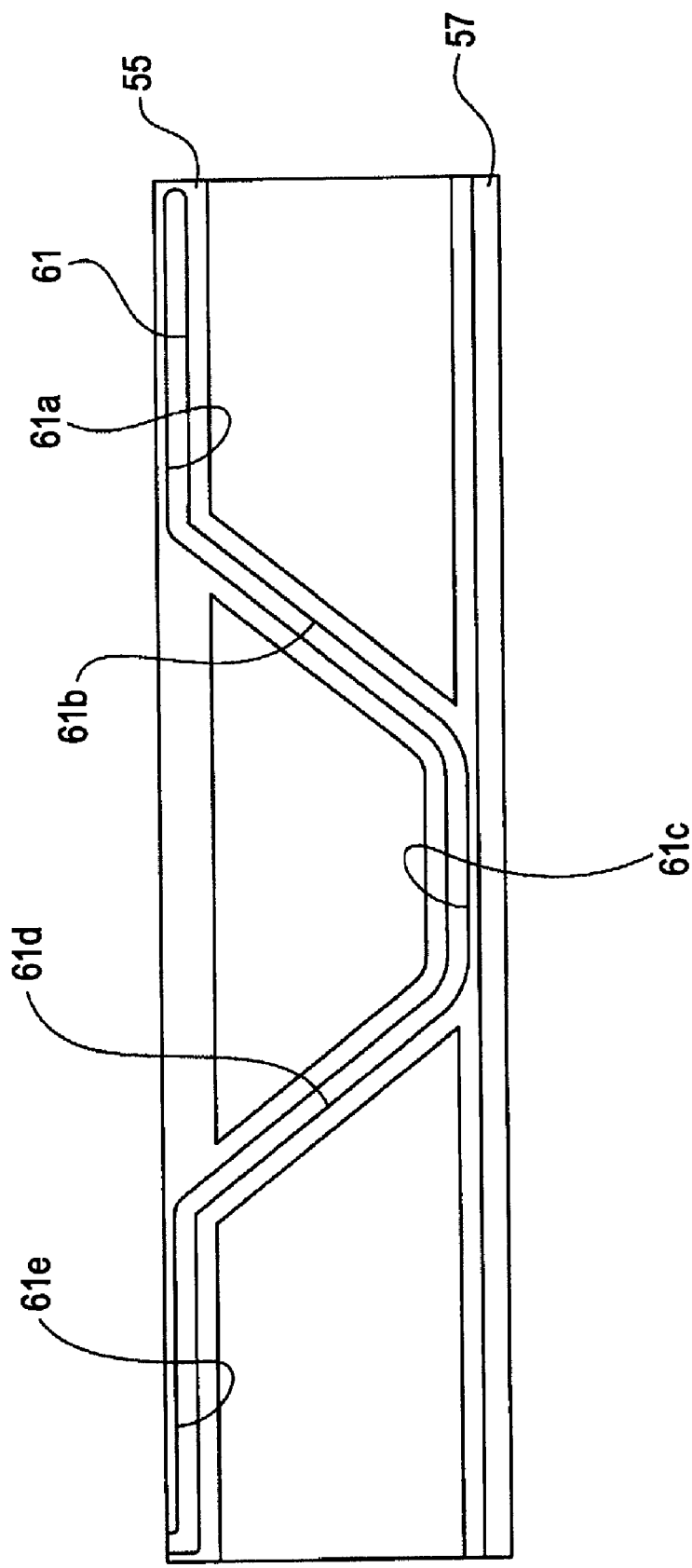
FIG. 18 is a developed view of the rotating cam gear.

A drive cam groove 61 is formed along the outer circumferential surface of the rotating cam gear 54 (see FIGS. 15, 16, and 18).

The drive cam groove 61 includes a start end portion 61a formed in the outer circumferential surface of the upper disk portion 55 and extending horizontally, a first inclined portion 61b formed in the first inclined portion 58 and extending continuous to one end of the start end portion 61a, an intermediate horizontal portion 61c formed in the outer circumferential surface of the lower disk portion 57 so as to extend horizontally and continuous to the lower end of the first inclined portion 61b, a second inclined portion 61d formed in the second inclined portion 59 and extending continuous to one end of the intermediate horizontal portion 61c, and a terminal end portion 61e formed in the outer circumferential surface of the upper disk portion 55 so as to extend horizontally and continuous to the upper end of the second inclined portion 61d.

The rotating cam gear 54 is rotatable about the center shaft portion 56. The rotation gear portion 57a of the rotating cam gear 54 is meshed with the reduction gear group 53. The rotation cam gear 54 is thus rotated by the driving force of the drive motor 51.

Figure 19:
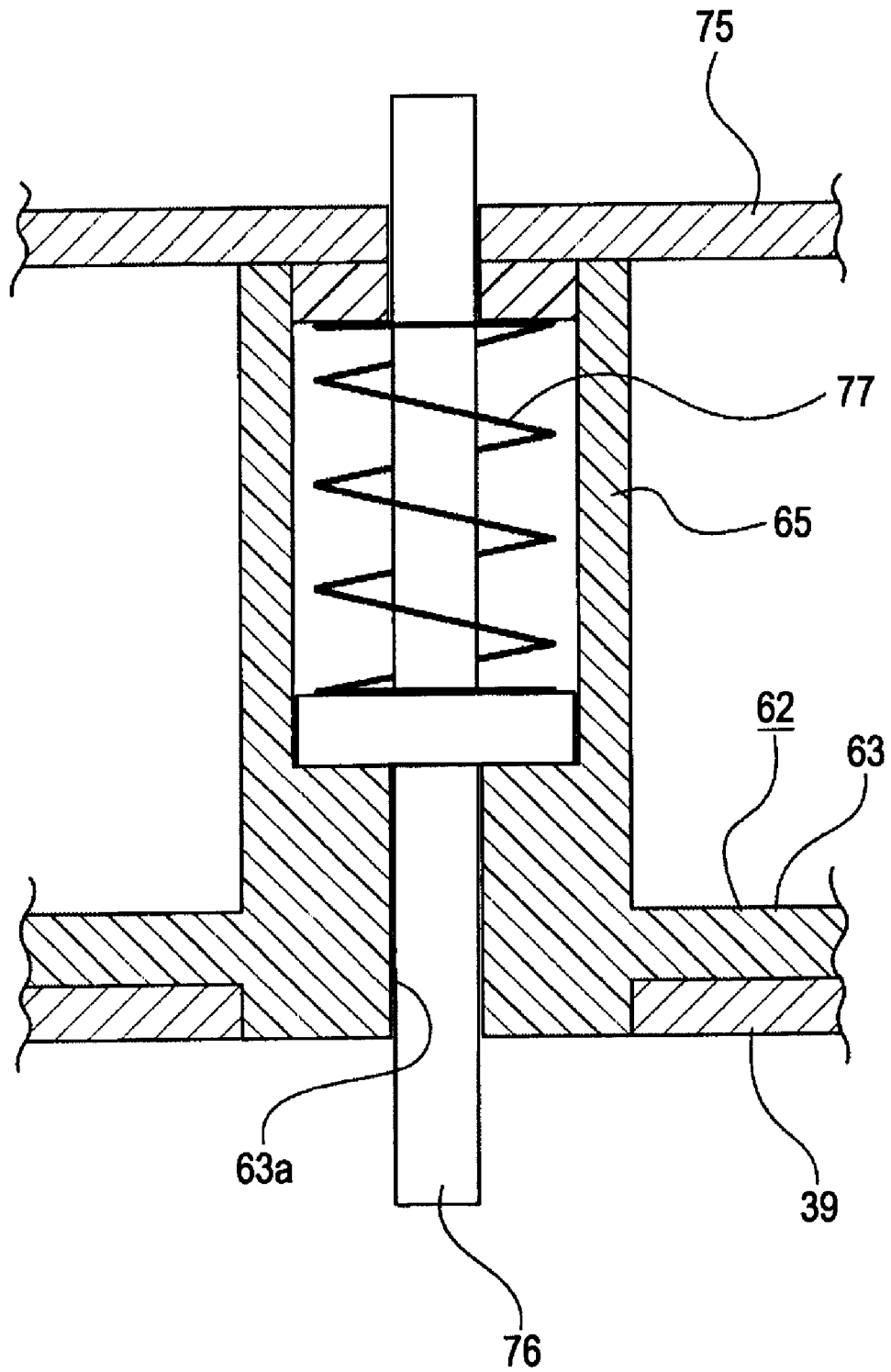
FIG. 19 is an enlarged sectional view showing the support state of a supporting member.

A supporting member 62 is attached at a position on the rear side of the rotating cam gear 54 in the bottom portion 39 of the second bracket 35 (see FIGS. 13 and 14). The supporting member 62 has a base plate portion 63 fixed to the bottom portion 39, a supporting tube portion 64 projected upward from the base plate portion 63, and sensor supporting tubes 65, 65, 65 projected upward from the base plate portion 63 and located around the supporting tube portion 64. In the base plate portion 63, projection holes 63a, 63a, 63a are respectively formed at positions directly below the sensor supporting tubes 65, 65, 65 (see FIG. 19).

In the state with the supporting member 62 attached to the second bracket 35, the supporting tube portion 64 is located directly above the shaft-insertion hole 39b, and the sensor supporting tubes 65, 65, 65 are respectively located directly above the pin-insertion holes 39c, 39c, 39c.

Figure 20:
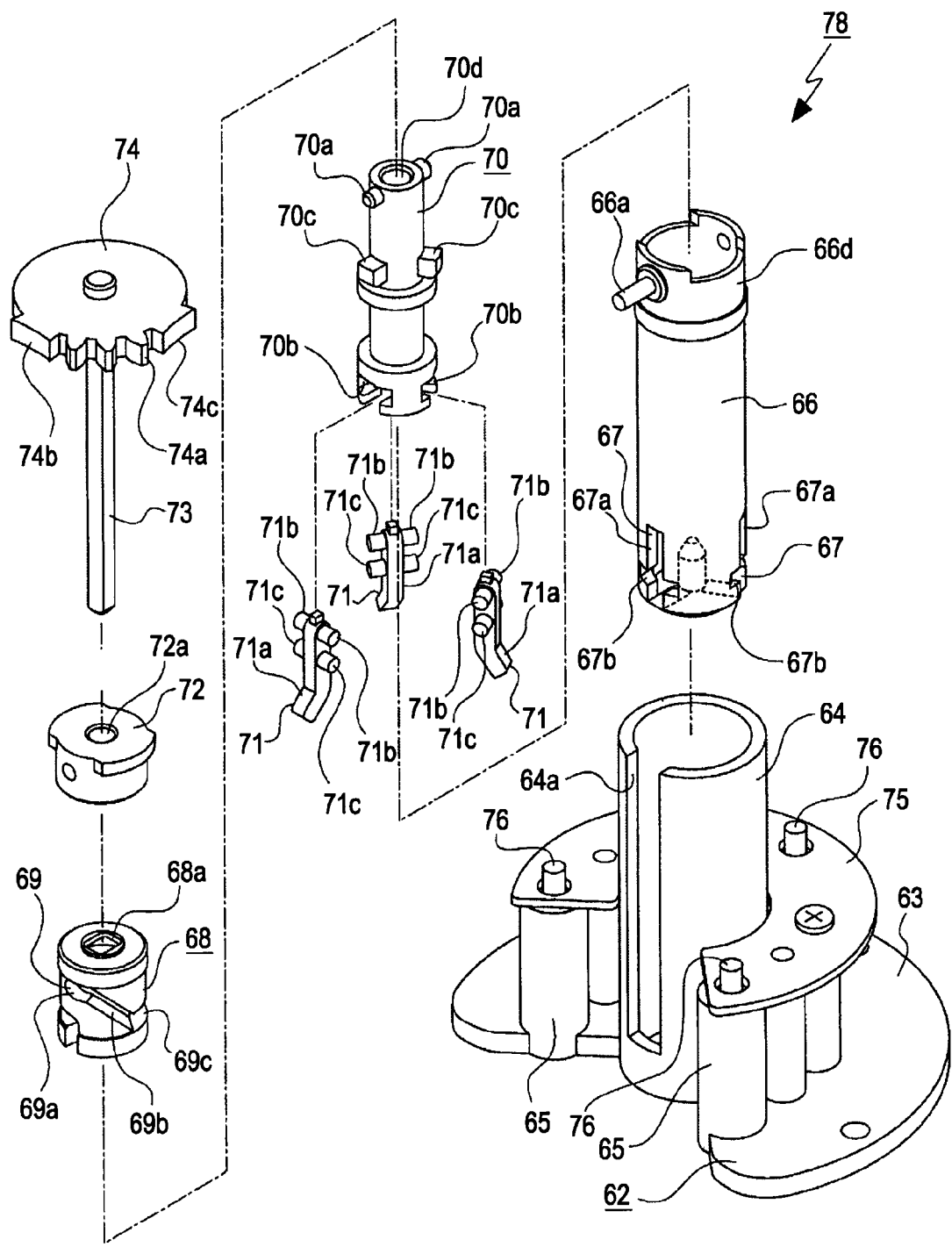
FIG. 20 is an enlarged exploded perspective view of a disk holding mechanism.
Figure 21:
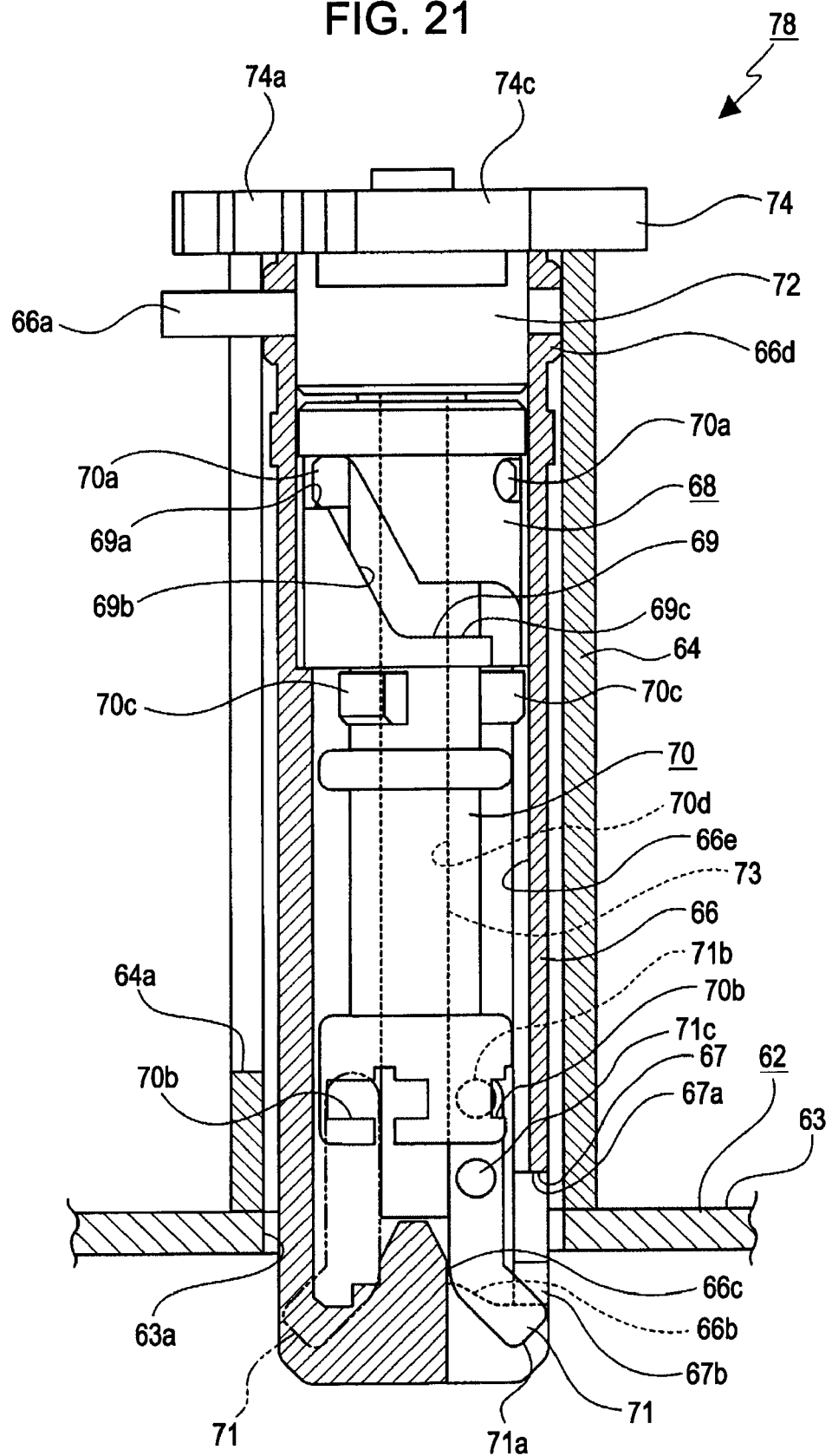
FIG. 21 is an enlarged sectional view of the disk holding mechanism.

An insertion shaft portion 66 having a closed bottom and formed in a substantially cylindrical shape is supported on the supporting tube portion 64 so as to be vertically movable (see FIGS. 20 and 21). A forwardly projected cam pin 66a is provided at an upper end portion of the insertion shaft portion 66.

The supporting tube portion 64 is formed in a cylindrical shape, and has a vertically extending slit 64a at a position opposed to the rotating cam gear 54. The cam pin 66a of the insertion shaft portion 66 is projected through the slit 64a to the outside of the supporting tube portion 64.

Eject holes 67, 67, 67 are formed at the lower end portion of the insertion shaft portion 66 so as to be spaced apart at equal circumferential intervals. The eject hole 67 is formed in the shape of a cross by a vertically elongated vertical portion 67a and a horizontally elongated horizontal portion 67b. The lower surface of the eject hole 67 forming the horizontal portion 67b is formed as a guide surface 66b inclined so as to be displaced downward as it extends from the inner side to the outer side of the insertion shaft portion 66. In the insertion shaft portion 66, a regulating surface 66c facing the outer circumferential surface side of the insertion shaft portion 66 is formed on the back side of the vertical portion 67a.

The substantially upper one-third portion of the insertion shaft portion 66 is formed as a support portion 66d whose inner diameter is larger than that in the portion below. Guide grooves 66e, 66e, 66e are formed in the portion of the insertion shaft portion 66 below the supporting portion 66b. The guide grooves 66e, 66e, 66e are formed in the inner surface of the insertion shaft portion 66 at equal circumferential intervals so as to extend vertically.

The insertion shaft portion 66 is inserted inside the supporting tube portion 64, and the cam pin 66a is projected to the outside of the supporting tube portion 64 from the slit 64a of the supporting tube portion 64 and slidably engaged with the drive cam groove 61 of the rotating cam gear 54 (see FIG. 14).

A drive cam 68 is supported inside the insertion shaft portion 66 so as to be rotatable around the axis of the insertion shaft portion 66 (see FIGS. 20 and 21). The drive cam 68 is formed in a substantially cylindrical shape with a closed top, and has cam guide holes 69, 69 that are spaced apart at a circumferential interval. The cam guide hole 69 has a horizontally extending upper portion 69a, an oblique portion 69b that is inclined and continuous to one end portion of the upper portion 69a, and a lower potion 69c continuous to the lower end portion of the oblique portion 69b and extending horizontally. The drive cam 68 has a detent hole 68a formed so as to vertically extend through the drive cam 68. The detent hole 68a is rectangular-shaped in horizontal cross section.

The drive cam 68 is arranged on the upper end side of the insertion shaft portion 66, and is unable to move vertically with respect to the insertion shaft portion 66.

An inner boss 70 is supported on the insertion shaft portion 66 so as to be vertically movable. The inner boss 70 is formed in a substantially cylindrical shape, and its upper end portion is inserted into the drive cam 68 from below. The drive cam 68 is thus rotatable with respect to the inner boss 70.

Cam projections 70a, 70a projected in opposite directions are provided at the upper end portion of the inner boss 70. Support recesses 70b, 70b, 70b are formed at the lower end portion of the inner boss 70 so as to be circumferentially spaced apart. The inner boss 70 has outwardly jutted sliding projections 70c, 70c, 70c provided at substantially vertically central portion. The sliding projections are located so as to be spaced apart at equal circumferential intervals. A circular through-hole 70d is formed in the inner boss 70 so as to vertically extend through the inner boss 70.

As mentioned above, the inner boss 70 has its upper end portion inserted into the drive cam 68, with the sliding projections 70c, 70c, 70c slidably engaged with the guide grooves 66e, 66e, 66e of the insertion shaft portion 66 respectively.

Disk holding arms 71, 71, 71 are rotatably supported in the support recesses 70b, 70b, 70b of the inner boss 70 respectively. The disk holding arm 71 has a substantially L-shaped arm portion 71a, support pins 71b, 71b projected from the side surface of the arm portion 71a, and guide pins 71c, 71c similarly projected from the side surface of the arm portion 71a.

The support pins 71b, 71b are provided to as to project in opposite directions from one end portion of the arm portion 71. The guide pins 71c, 71c are provided so as to respectively project in the same direction as the support pins 71b, 71b from positions near one end of the arm portion 71a.

The disk holding arms 71, 71, 71 are respectively supported in the support recesses 70b, 70b, 70b of the inner boss 70 in the state with the support pins 71b, 71b, 71b extending horizontally, and the arm portions 71a, 71a, 71a can be pivoted into and out of contact with the center shaft of the inner boss 70.

In a state with the drive cam 68, the inner boss 70, and the disk holding arms 71, 71, 71 arranged inside the insertion shaft portion 66, a cap 72 is attached to the upper surface of the insertion shaft portion 66 to enclose the insertion shaft portion 66. The cap 72 has a through-hole 72a formed so as to vertically extend through the cap 72.

In a state with the cap 72 attached to the insertion shaft portion 66, a shaft member 73 is inserted through the insertion hole 72a of the cap 72 from above. The shaft member 72 is formed so as to be vertically elongated, and is substantially oval-shaped in horizontal cross section.

A Geneva gear 74 is fixed at a position of the shaft member 73 near the upper end. The Geneva gear 74 has a gear portion 74a and concave portions 74b, 74c located on both sides adjacent the gear portion 74a. The outer circumferential edges of the concave portions 74b, 74c are formed in an arcuate shape.

The shaft member 73 with the Geneva gear 74 fixed thereto is inserted through the insertion hole 72a of the cap 72, the detent hole 68a of the drive cam 68, and the through-hole 70d of the inner boss 70 in the stated order from above. In the state with the shaft member 73 inserted through the insertion hole 72a, the detect hole 68a, and the through-hole 70d, the shaft member 73 is rotatable about its axis with respect to the cap 72 and the inner boss 70, and is not rotatable about its axis with respect to the drive cam 68. Accordingly, when the shaft member 73 is rotated in accordance with rotation of the Geneva gear 74, the drive cam 68 is rotated integrally with the shaft member 73.

In a state with the shaft member 73 inserted into the insertion shaft member 66, the Geneva gear 74 is located on the upper side of the supporting tube portion 64 of the supporting member 62.

A pressing plate 75 formed in an arcuate shape is attached to the upper surfaces of the sensor supporting tubes 65, 65, 65 (see FIGS. 13 and 14). Disk pressing members 76, 76, 76 formed in a shaft-like shape are respectively supported on the sensor supporting tubes 65, 65, 65 so as to be vertically movable (see FIG. 19). Urging springs 77, 77, 77 for respectively urging the disk pressing members 76, 76, 76 downward are arranged inside the sensor supporting tubes 65, 65, 65.

The respective lower end portions of the disk pressing members 76, 76, 76 are projected downward from the pin-insertion holes 39c, 39c, 39c of the second bracket 35 via the projection holes 63a, 63a, 63a of the base plate portion 63.

The drive motor 51, the worm gear 52, the reduction gear group 53, the rotating cam gear 54, the supporting member 62, and respective components supported on the supporting member 62 constitute a disk holding mechanism 78 for holding the disk-shaped recording medium 200 (see FIG. 13). The disk holding mechanism 78 is thus provided to the moving block 32 together with the conveying mechanism 33.

Description will now be given of operation of the disk holding mechanism 78.

Figure 22:
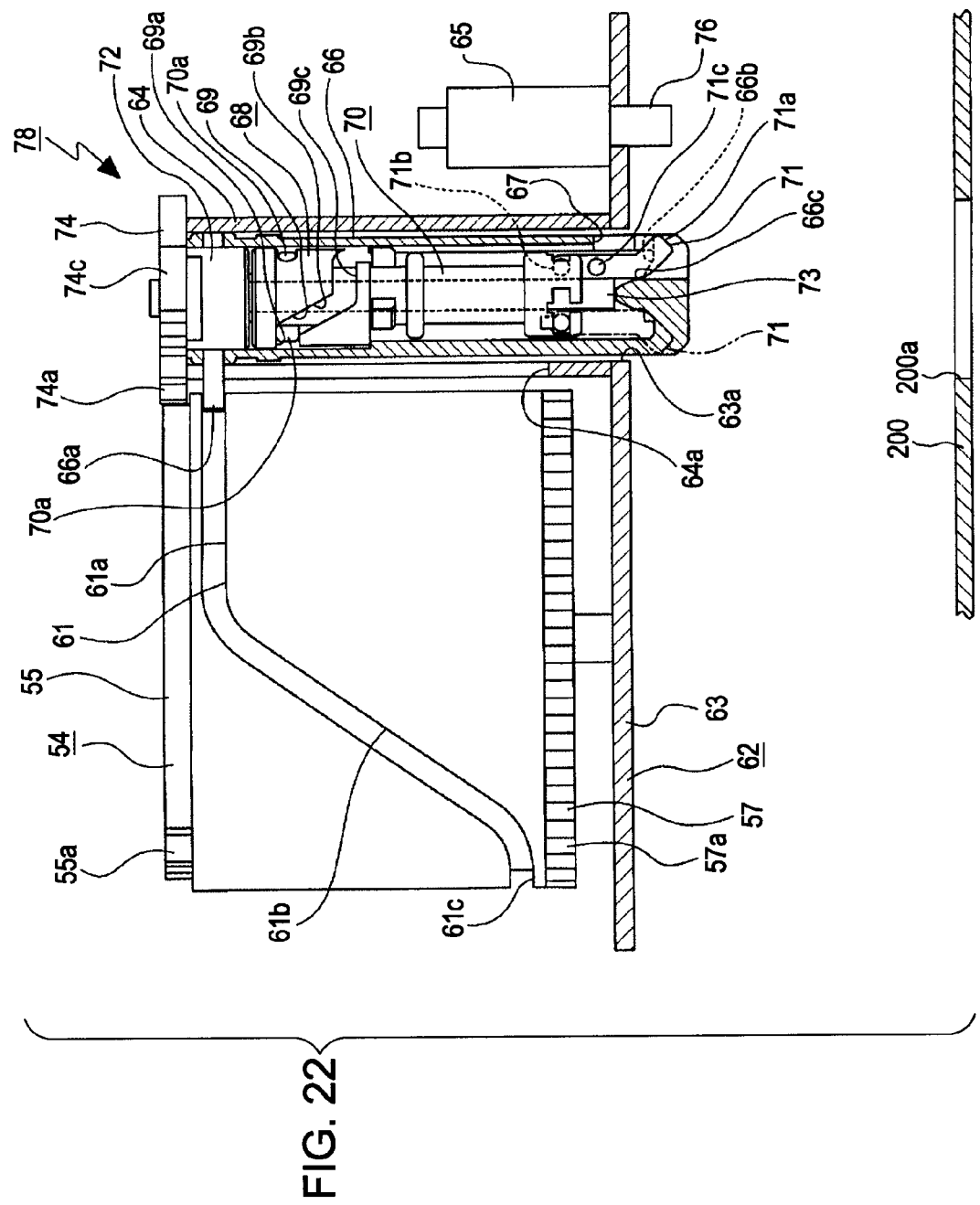
FIG. 22 is a side view, partly in section, of the disk holding mechanism and the rotating cam gear.

First, a state prior to operating the disk holding mechanism 78 will be described (see FIG. 22).

The cam pin 66a of the insertion shaft portion 66 is engaged with an end portion on the side opposite to the first inclined portion 61b of the start end portion 61a in the drive cam groove 61 of the rotating cam gear 54. The lower end portion of the insertion shaft portion 66 is projected downward from the supporting tube portion 64.

The inner boss 70 has its cam projections 70a, 70a respectively engaged with the upper portions 69a, 69a in the cam guide hole 69 of the drive cam 68.

The disk holding arms 71, 71, 71 are held in a state in which the arm portions 71a, 71a, 71a are respectively positioned along the regulating surfaces 66c, 66c, 66c of the insertion shaft portion 66 and do not project outward from the eject holes 67, 67, 67.

Figure 23:
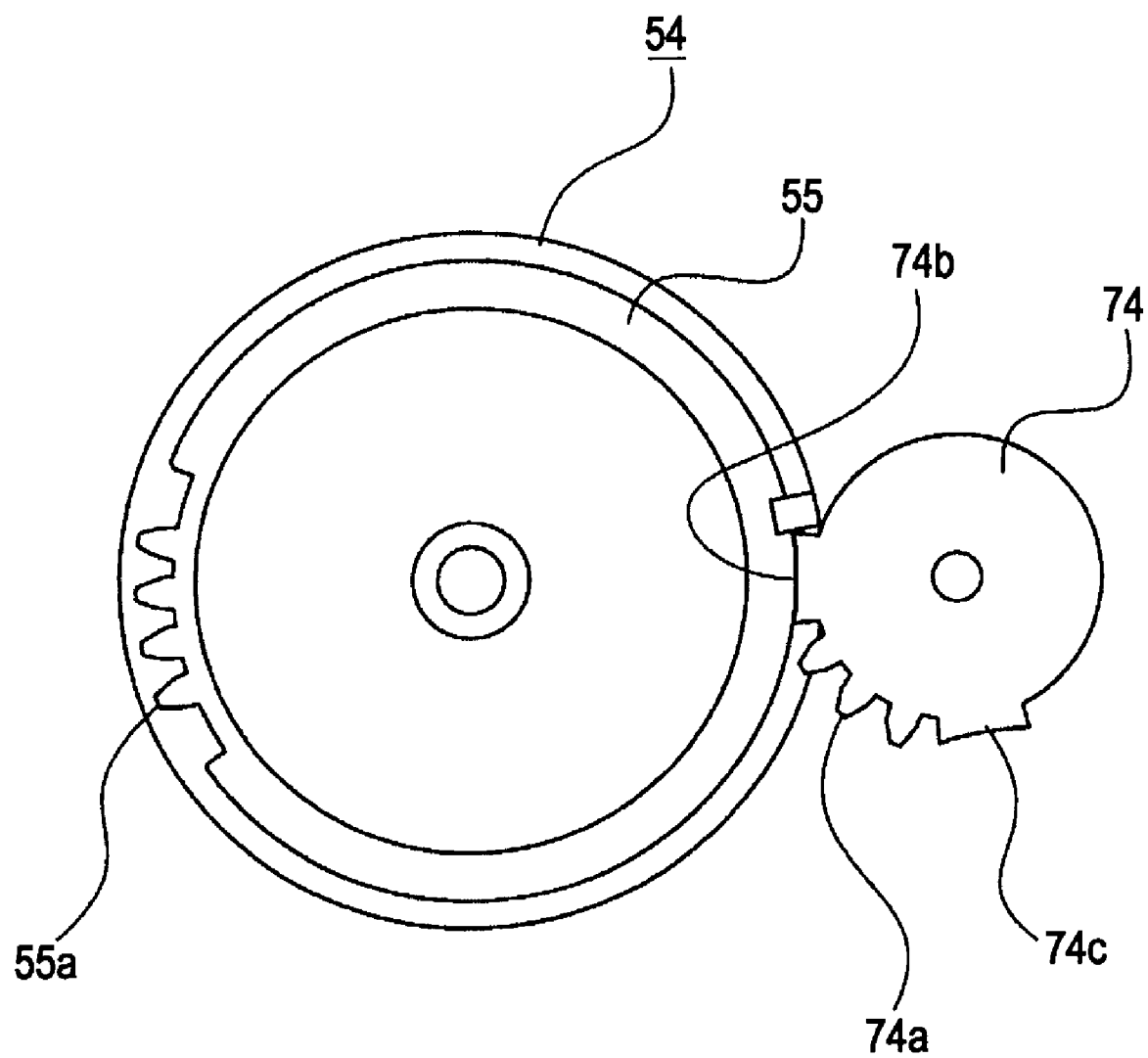
FIG. 23 is a plan view showing the relationship between a gear portion of the rotating cam gear and a Geneva gear.

In the Geneva gear 74, the concave portion 74b is positioned so as to be opposed to the upper disk portion 55 of the rotating cam gear 54 (see FIG. 23).

When the drive motor 51 is rotated, the rotating cam gear 54 is rotated in one direction. When the rotating cam gear 54 is rotated, the cam pin 66a of the insertion shaft portion 66 is relatively slid in the start end portion 61a of the drive cam groove 61. The insertion shaft portion 66 is thus not moved in the vertical direction. At this time, the Geneva gear 74 is not rotated since its concave portion 74b is positioned so as to be opposed to the upper disk plate 55 of the rotating cam gear 54.

Figure 24:
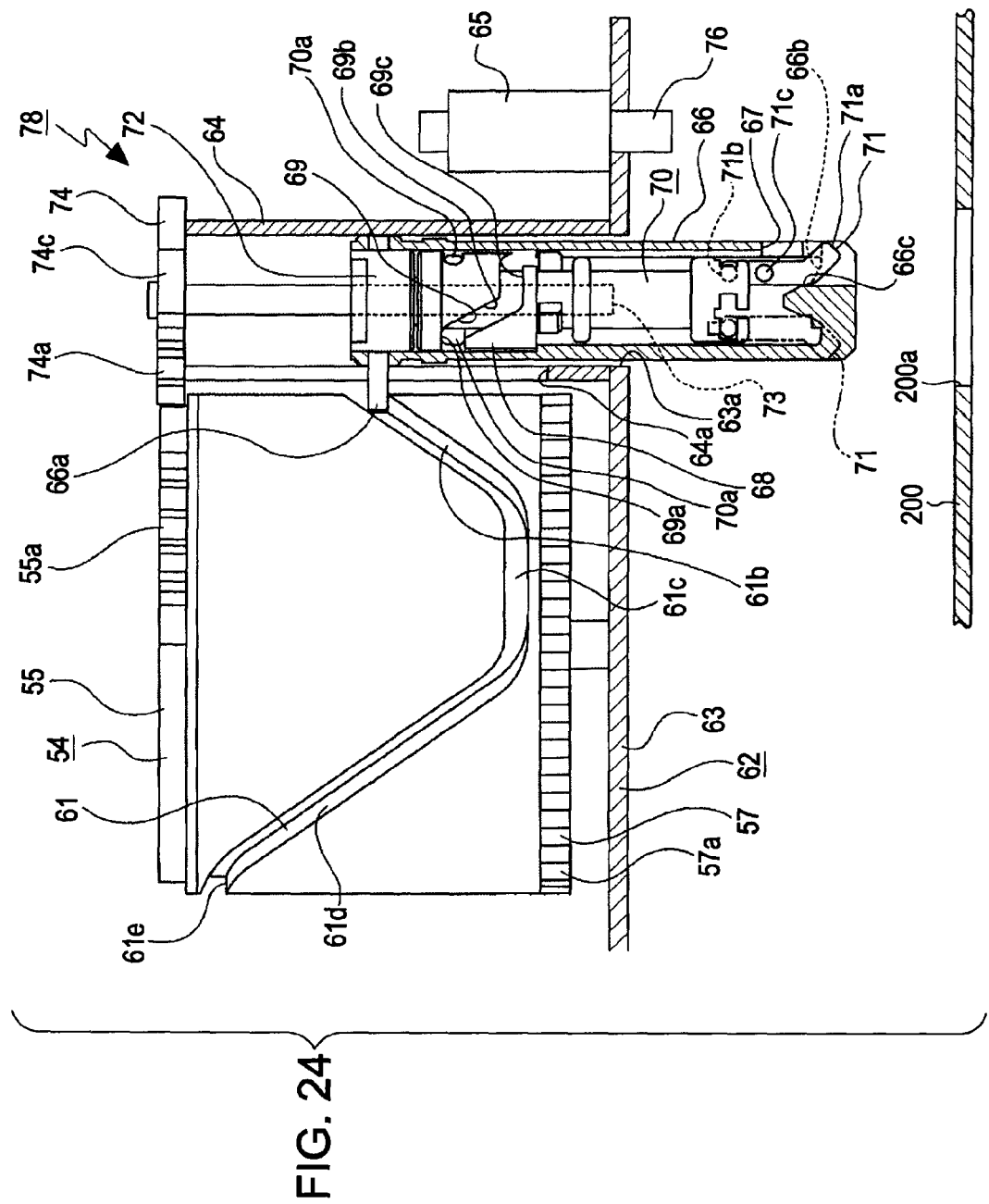
FIG. 24 is an enlarged sectional view showing a state with an insertion shaft portion being lowered, illustrating the operation of the disk holding mechanism together with FIGS. 25 to 30.

When the drive motor 51 is further rotated to rotate the rotating cam gear 54, the cam pin 66a is caused to slide in the first inclined portion 61b of the drive cam groove 61, so the insertion shaft portion 66 is lowered (see FIG. 24). At this time, the drive cam 68, the inner boss 70, and the disk holding arms 71, 71, 71 arranged inside the insertion shaft portion 66 are lowered integrally.

Figure 25:
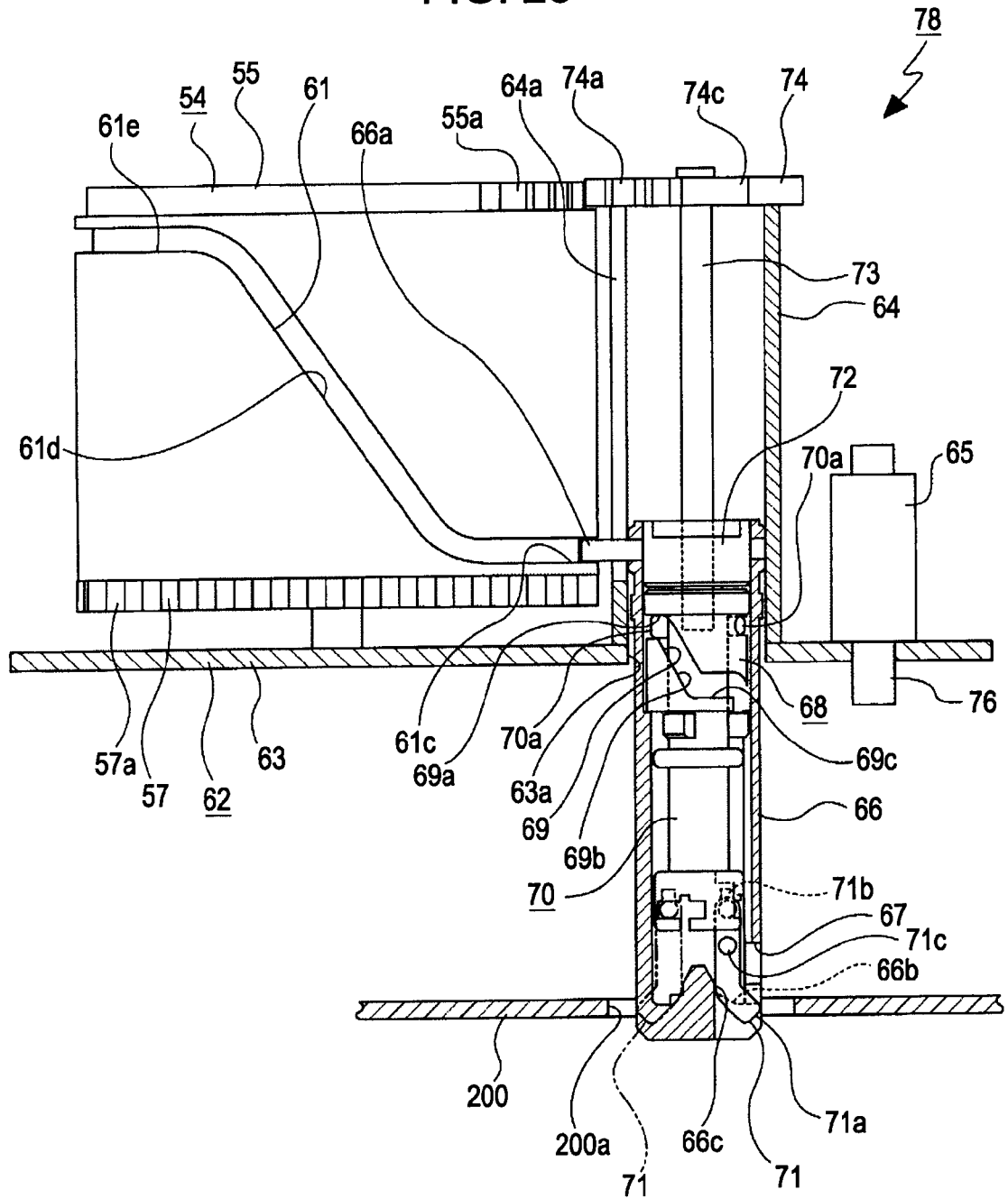
FIG. 25 is an enlarged sectional view showing a state with the insertion shaft portion lowered and inserted in a center hole of a recording medium.

When the drive motor 51 is further rotated to rotate the rotating cam gear 54, the cam pin 66a reaches the intermediate horizontal portion 61c of the drive cam groove 61, so the lowering of the insertion shaft portion 66, drive cam 68, inner boss 70, and disk holding arms 71, 71, 71 is stopped (see FIG. 25). At this time, the lower end portion of the insertion shaft portion 66 is inserted in, for example, a center hole 200a of the disk-shaped recording medium 200 stored in the storage tray 25.

Figure 26:
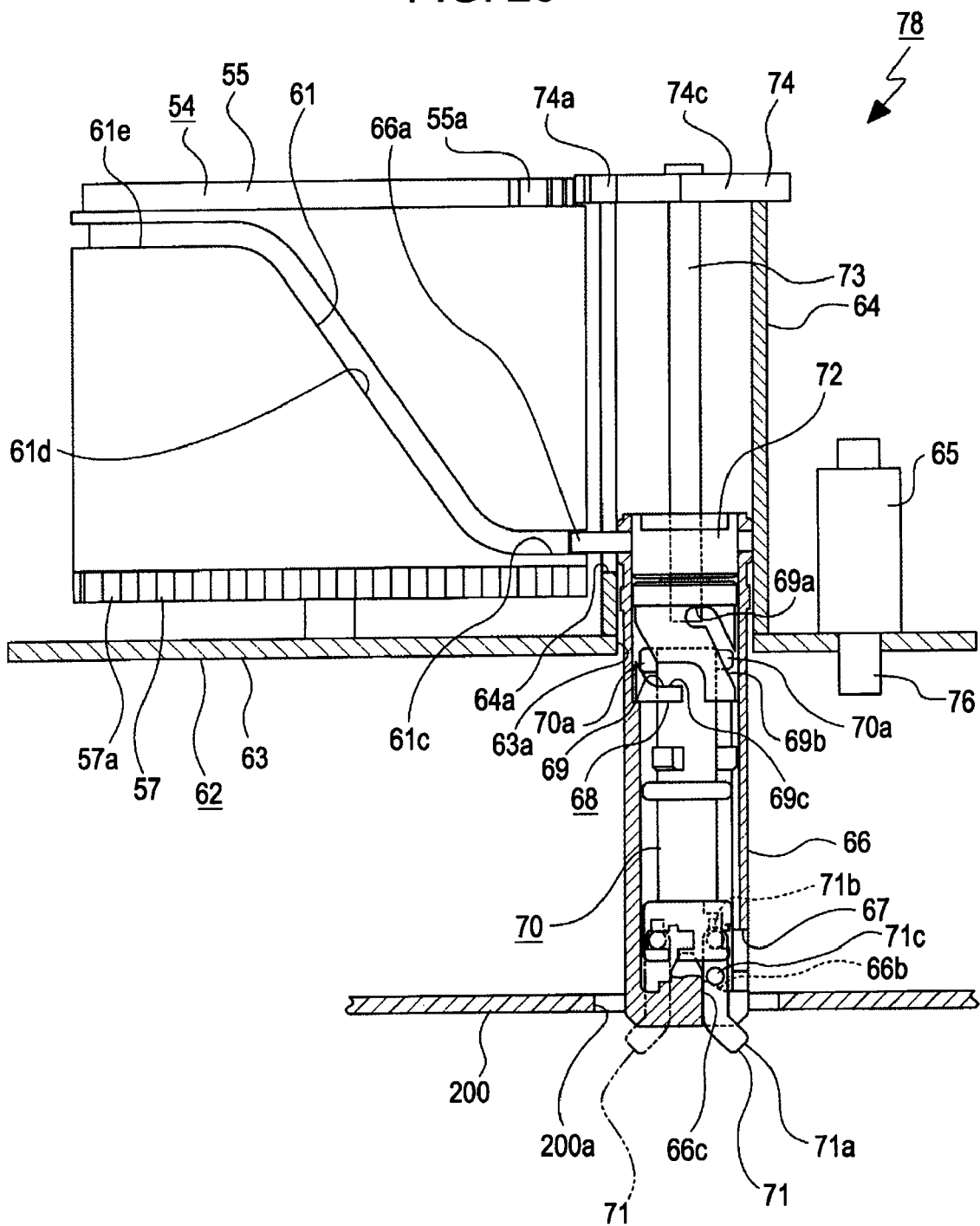
FIG. 26 is an enlarged sectional view showing a state with the insertion shaft portion projected from a disk holding arm.
Figure 27:
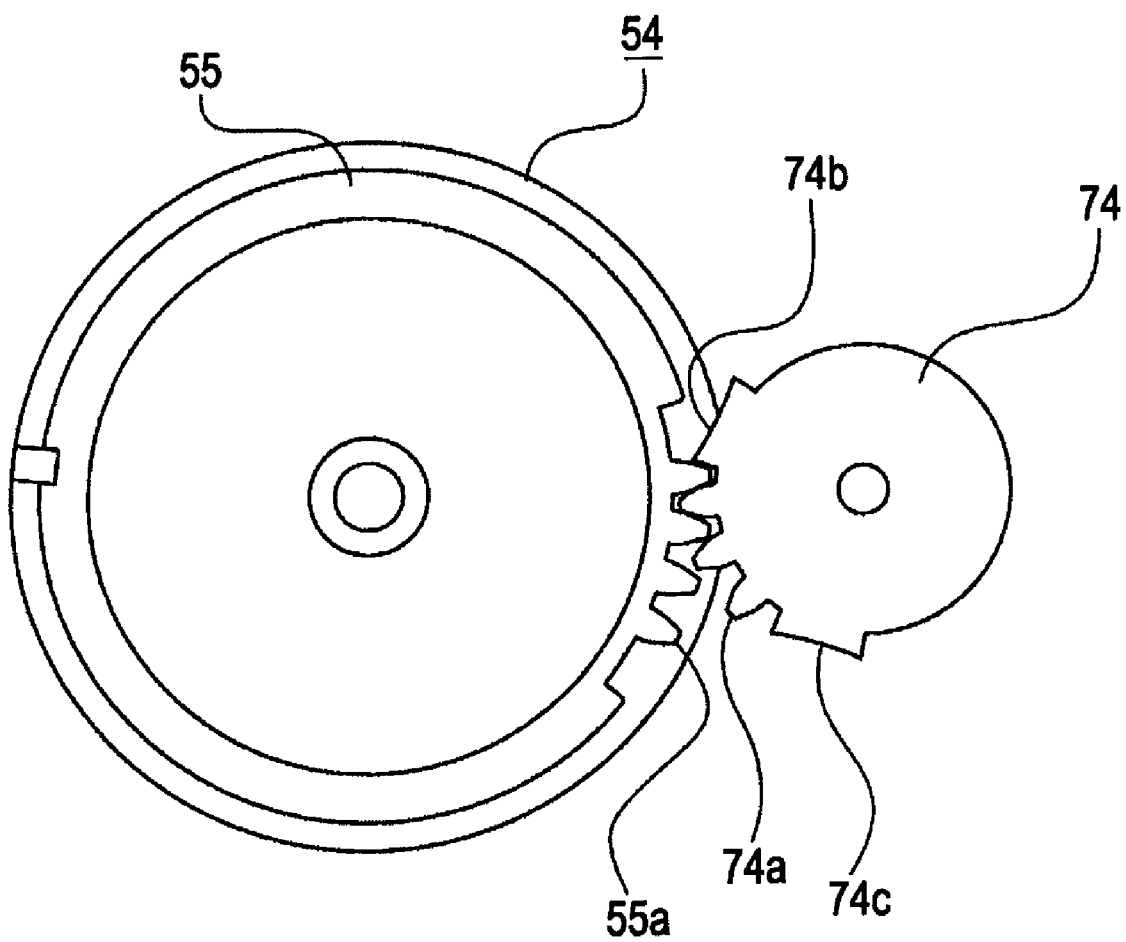
FIG. 27 is a plan view showing a state with the Geneva gear meshed with the gear portion of the rotating cam gear.

When the drive motor 51 is continued to be rotated to rotate the rotating cam gear 54, the cam pin 66a is relatively moved in the intermediate horizontal portion 61c of the drive cam groove 61 toward the second inclined portion 61d (see FIG. 26). At this time, the gear portion 55a formed in the upper disk portion 55 of the rotating cam gear 54 is brought into meshing engagement with the gear portion 74a of the Geneva gear 74 (see FIG. 27), so the Geneva gear 74, the shaft member 73, and the drive cam 68 are rotated integrally.

When the drive cam 68 is moved, the cam projections 70a, 70a of the inner boss 70 are respectively moved relatively from the upper portions 69a, 69a of the cam guide holes 69, 69 to the oblique portions 69b, 69b. The inner boss 70 is thus lowered with respect to the insertion shaft portion 66 and the drive cam 68 (see FIG. 26).

As the inner boss 70 is lowered with respect to the insertion shaft portion 66 and the drive cam 68, the guide pins 71c, 71c, 71c of the disk holding arms 71, 71, 71 are respectively guided by the guide surfaces 66b, 66b, 66b of the insertion shaft portion 66, and the arm portions 71a, 71a, 71a are respectively pivoted about the support pins 71b, 71b, . . . to project outward from the eject holes 67, 67, 67.

Figure 28:
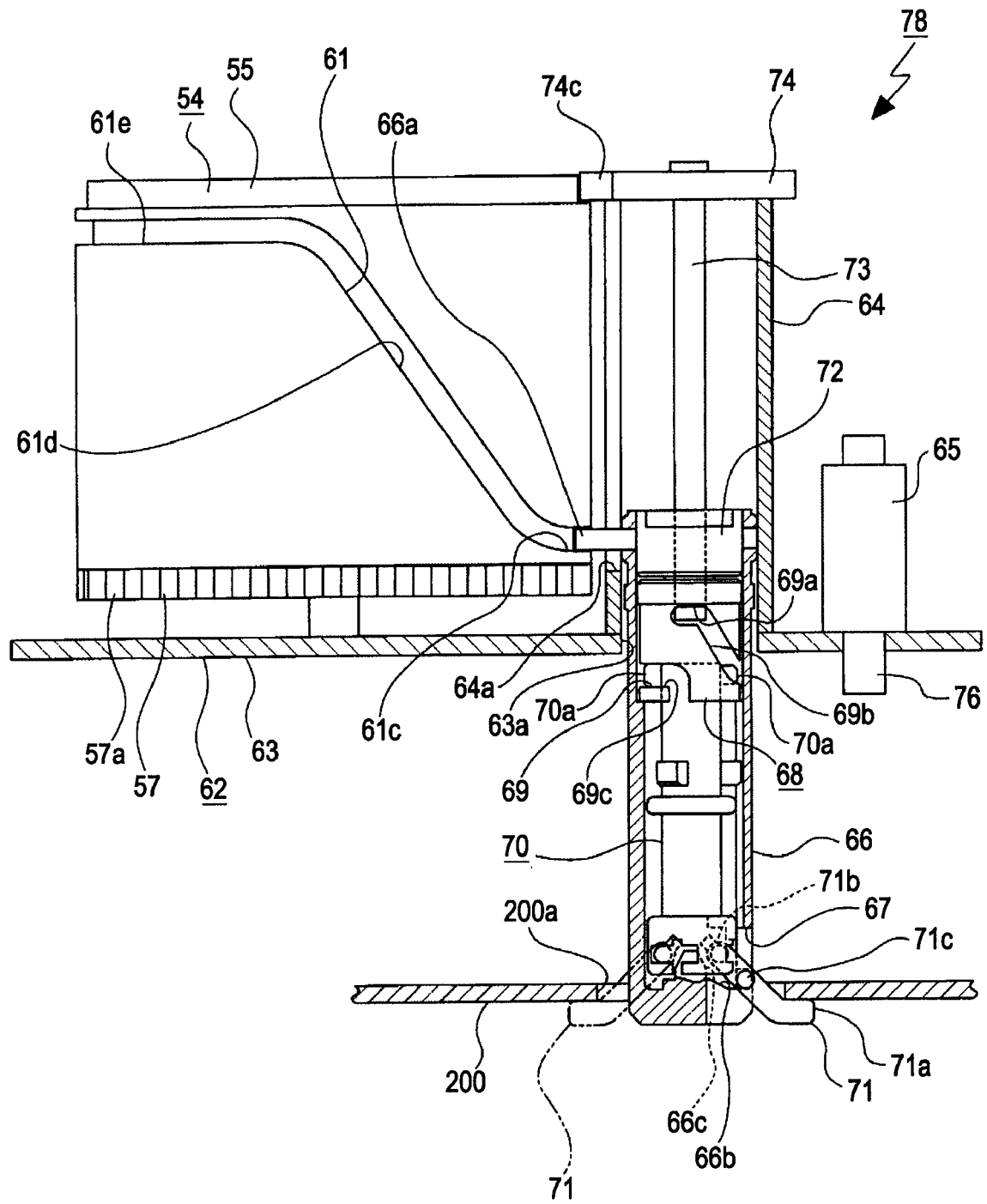
FIG. 28 is an enlarged sectional view showing a state with a recording medium held by the disk holding arm.

When the drive motor 51 is continued to be rotated to rotate the rotating cam gear 54, and the drive cam 68 is continued to be rotated, the cam projections 70a, 70a of the inner boss 70 are respectively moved relatively from the oblique portions 69b, 69b of the cam guide holes 69, 69 to the lower portion 69c (see FIG. 28). The inner boss 70 is thus further lowered with respect to the insertion shaft portion 66 and the drive cam 68, and the guide pins 71c, 71c, . . . of the disk holding arms 71, 71, 71 are continued to be guided by the guide surfaces 66b, 66b, 66b of the insertion shaft portion 66 so that the arm portions 71a, 71a, 71a are projected further outward from the eject holes 67, 67, 67. At this time, the arm portions 71a, 71a, 71a of the disk holding arms 71, 71, 71 are located directly below the inner circumferential portion of the disk-shaped recording medium 200.

When the drive motor 51 is further rotated to rotate the rotating cam gear 54, the other concave portion 74c of the Geneva gear 74 is positioned so as to be opposed to the upper disk portion 55 of the rotating cam gear 54, so the rotation of the Geneva gear 74, shaft member 73, and drive cam 68 is stopped.

Figure 29:
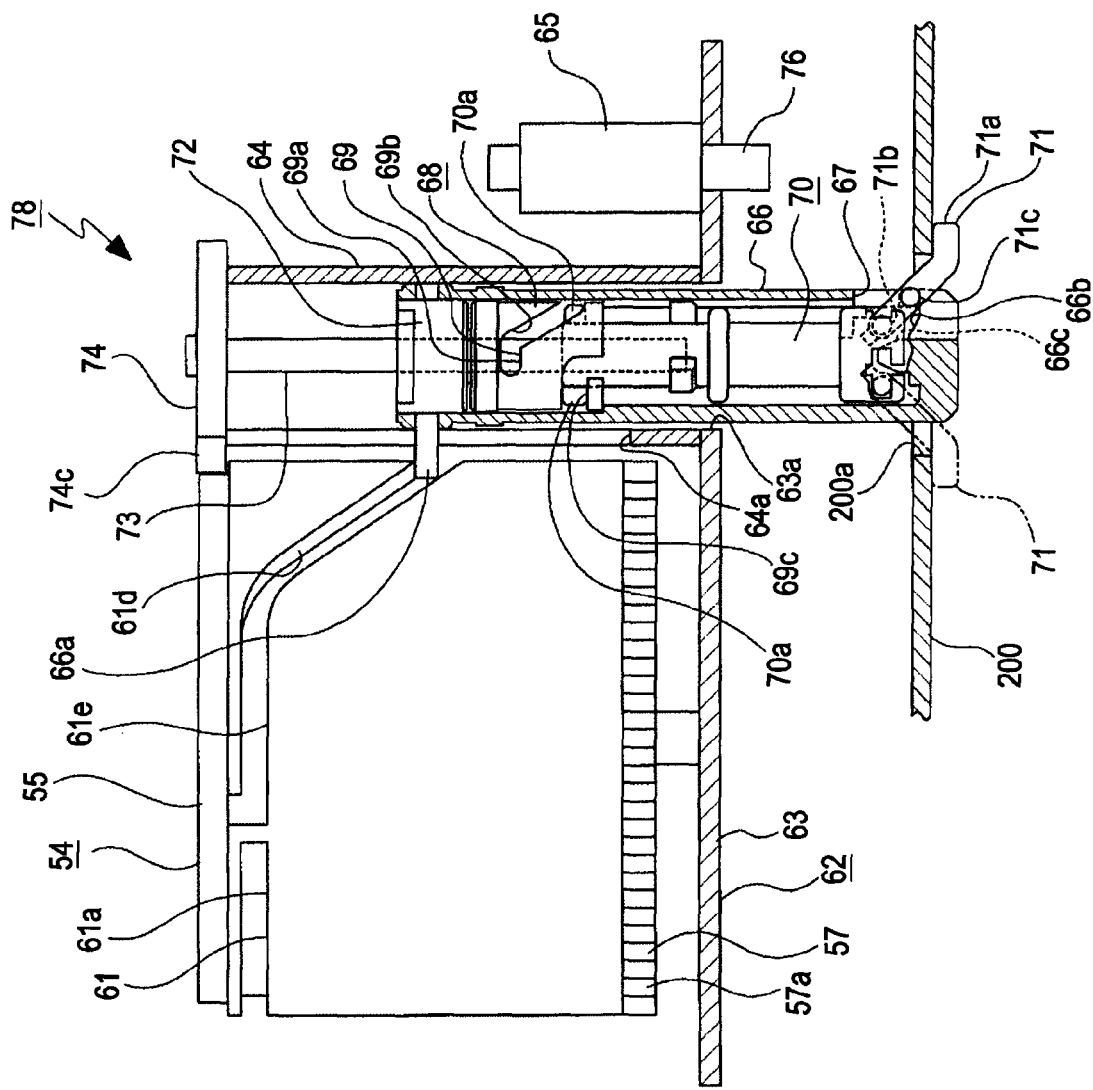
FIG. 29 is an enlarged sectional view showing a state with the insertion shaft portion raised to lift a recording medium.

When the drive motor 51 is further rotated to rotate the rotating cam gear 54, as shown in FIG. 29, the cam pin 66a is relatively moved from the intermediate horizontal portion 61c of the drive cam groove 61 to the terminal end portion 61e via the second inclined portion 61d, causing the insertion shaft portion 66, the inner boss 70, and the disk holding arms 71, 71, 71 to be raised integrally. The disk-shaped recording medium 200 is lifted by the disk holding arms 71, 71, 71 so that its upper surface is brought into contact with the lower ends of the disk pressing members 76, 76, 76.

Figure 30:
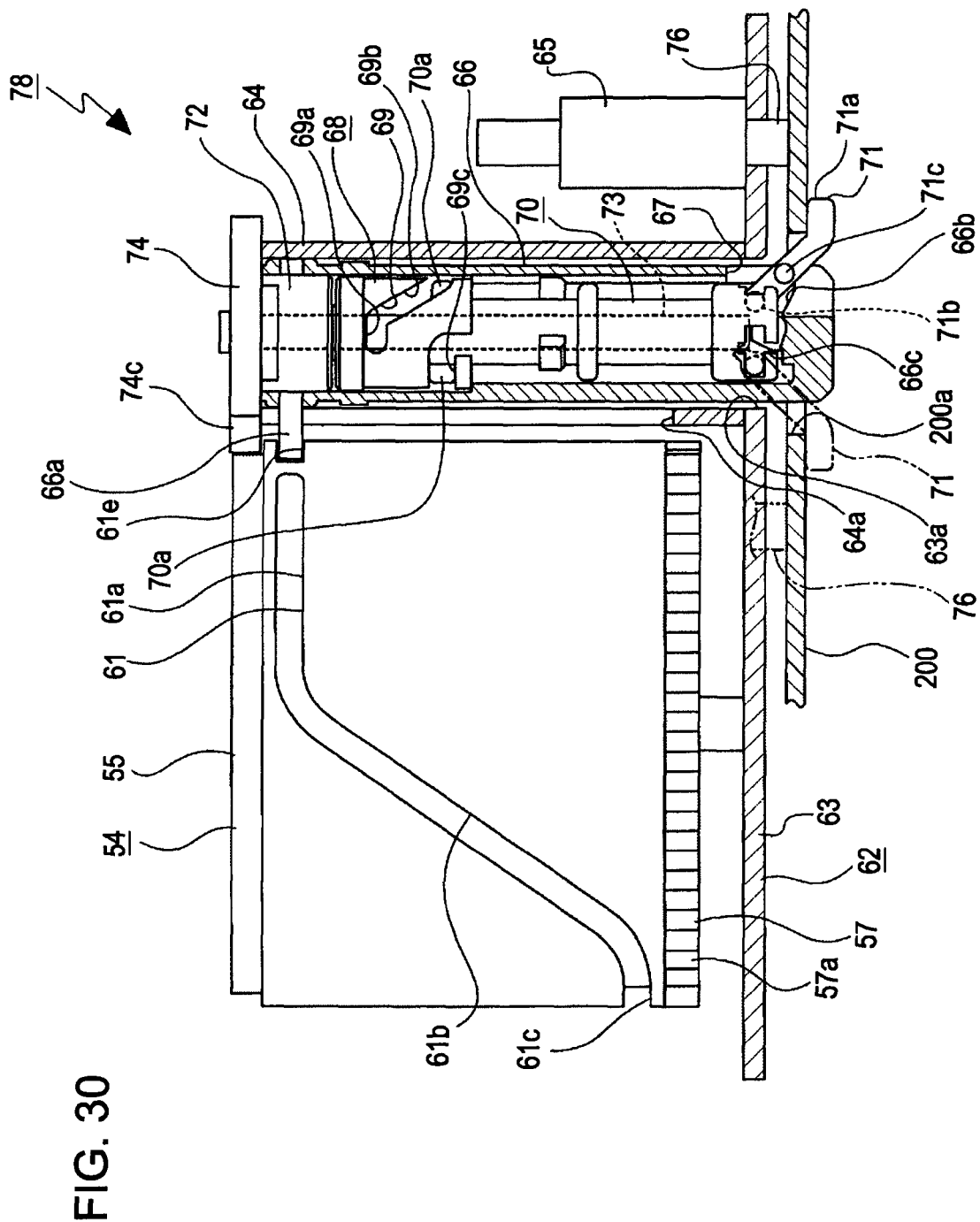
FIG. 30 is an enlarged sectional view showing a state with a recording medium nipped and held between the disk holding arm and a disk pressing member.

The disk-shaped recording medium 200 is nipped and held between the disk holding arms 71, 71, 71 and the disk pressing members 76, 76, 76. At this time, since the disk pressing members 76, 76, 76 are urged downward by the urging springs 77, 77, 77 respectively arranged inside the sensor supporting tubes 65, 65, 65, the disk-shaped recording medium 200 is pressed against the holding arms 71, 71, 71 by the disk pressing members 76, 76, 76 (see FIG. 30).

In the state with the disk-shaped recording medium 200 being nipped by the disk holding arms 71, 71, 71 and the disk pressing members 76, 76, 76, the disk pressing members 76, 76, 76 are moved slightly upward due to the disk-shaped recording medium 200 against the urging force of the urging springs 77, 77. The detection of the presence/absence of the disk-shaped recording medium 200 is performed at this time. Each of the disk pressing members 76, 76, 76 thus also functions as a disk detecting portion for detecting the presence/absence of the disk-shaped recording medium 200.

When, with the disk-shaped recording medium 200 held in the above-mentioned manner, the drive motor 51 is rotated in the opposite direction, the holding of the disk-shaped recording medium 200 is released through an operation reverse to the above-mentioned operation, and respective components return to their original state before operation.

That is, when the insertion shaft portion 66 is lowered and the disk holding arms 71, 71, 71 are pivoted and retracted into the insertion shaft portion 66, the disk-shaped recording medium 200 is placed onto the storage tray 25, and then the insertion shaft portion 66 is raised.

As mentioned above, in the recording medium changer 1, the disk-shaped recording medium 200 is held in place by being nipped in the thickness direction by the plurality of disk holding arms 71, 71, 71, which are projected from the insertion shaft portion 66 inserted in the center hole 200a of the disk-shaped recording medium 200, and the plurality of disk pressing members 76, 76, 76. Accordingly, the disk-shaped recording medium 200 can be held in place without performing positioning between the insertion shaft portion 66 and the disk pressing members 76, 76, 76, thereby making it possible to reliably hold the disk-shaped recording medium 200 in place.

Further, since the insertion shaft portion 66 is inserted in the center hole 200a of the disk-shaped recording medium 200 to hold the disk-shaped recording medium 200 in place, the disk-shaped recording medium 200 can be held in place irrespective of the size or shape of the disk-shaped recording medium 200.

It should be noted that it is also possible to configure the above-mentioned disk holding mechanism such that the disk holding arm is projected horizontally from the insertion shaft portion. In the case of this configuration, in order to ensure that the disk holding arm be located below the disk-shaped recording medium 200 with reliability, a fixed gap must be formed between the lower surface of the disk-shaped recording medium 200 and the upper end of the disk holding arm in a state with the insertion shaft portion inserted in the center hole 200a of the disk-shaped recording medium 200.

However, in the disk holding mechanism 78, the disk holding arms 71, 71, 71 are projected outward from the outer circumferential surface of the insertion shaft portion 66 by being pivoted with respect to the insertion shaft portion 66 about an axis extending in a direction orthogonal to the axis direction of the insertion shaft portion 66. Therefore, as compared with a configuration in which the disk holding arms are projected horizontally from the insertion shaft portion, it is possible to reduce the amount of vertical movement of the insertion shaft portion 66, leading to a corresponding reduction in required movement space. It is thus possible to achieve a reduction in the size of the recording medium changer 1.

Further, in the disk holding mechanism 78, a disk detecting portion that is movable in the thickness direction of the disk-shaped recording medium 200 is used as each of the disk pressing members 76, 76, 76. It is thus possible to detect the presence/absence of the disk-shaped recording medium 200 simultaneously with the holding of the disk-shaped recording medium 200, and also achieve a reduction in the number of parts.

Further, the urging springs 72, 72, 72 for urging the disk detecting portion (disk pressing members 76, 76, 76) so as to be pressed against the disk-shaped recording medium 200 are provided. Therefore, the disk-shaped recording medium 200 can be held in place while absorbing differences in thickness due to machining errors of or differences between the kinds of the disk-shaped recording media 200, 200, . . . , and also avoid damages to the disk-shaped recording medium 200.

An elevation motor 79 is attached to the inner surface of the third bracket 36 (see FIGS. 13 and 14). A worm 80 is fixed to the motor shaft of the elevation motor 79. A gear group 81 for speed reduction is meshed with the worm 80. The gear group 81 is meshed with the connecting gear 48 attached to the rotary shaft 46. Accordingly, when the elevation motor 79 is rotated, the rotary shaft 46 is rotated in a direction corresponding to the rotation direction, and the rack gears 47, 47 attached to the rotary shaft 46 are rotated with respect to the conveyance racks 31, 31, so the moving block 32 is moved vertically. At this time, the feed rollers 49, 49, . . . rotatably engaged with the supporting columns 3a, 3a are rotated for smooth movement of the moving block 32.

A tray rotating mechanism 82 is supported on the bottom portion 39 of the second bracket 35. The tray rotating mechanism 82 has a motor holding plate 83, a rotation motor 84, a worm member 85, a connecting gear group 86, a rotation gear 87, a holder holding plate 88, a rack holder 89, and a connecting rack 90.

The motor holding plate 83 includes a horizontally elongated support portion 91, a connecting portion 92 projected rearward from the central portion in the left-right direction of the support portion 91, and a holding portion 93 projected upward from one longitudinal end portion of the support portion 91. Guide holes 91a, 91a that are elongated in the front-rear direction are formed in the support portion 91 so as to be spaced apart from each other on the left and right. An upwardly projected cam engaging pin 92a is provided at the distal end portion of the connecting portion 92.

Guide shafts 39a, 39a provided to the second bracket 35 are respectively slidably inserted in the guide holes 91a, 91a, so the motor holding plate 83 is supported on the second bracket 35 so as to be movable in the front-rear direction. The cam engaging pin 92a of the motor holding plate 83 is slidably engaged with the endless cam groove 60 of the rotating cam gear 54. Accordingly, the motor holding plate 83 is moved in the front-rear direction as the position of the cam engaging pin 92a with respect to the endless cam groove 60 is changed in accordance with the rotation of the rotating cam gear 54.

The rotation motor 84 is attached to the holding portion 93 of the motor holding plate 83. The worm member 85 is fixed to the motor shaft of the rotation motor 84.

The connecting gear group 86 is a group of gears for reducing the rotational speed of the rotation motor 84, and is meshed with the worm member 85.

Figure 31:
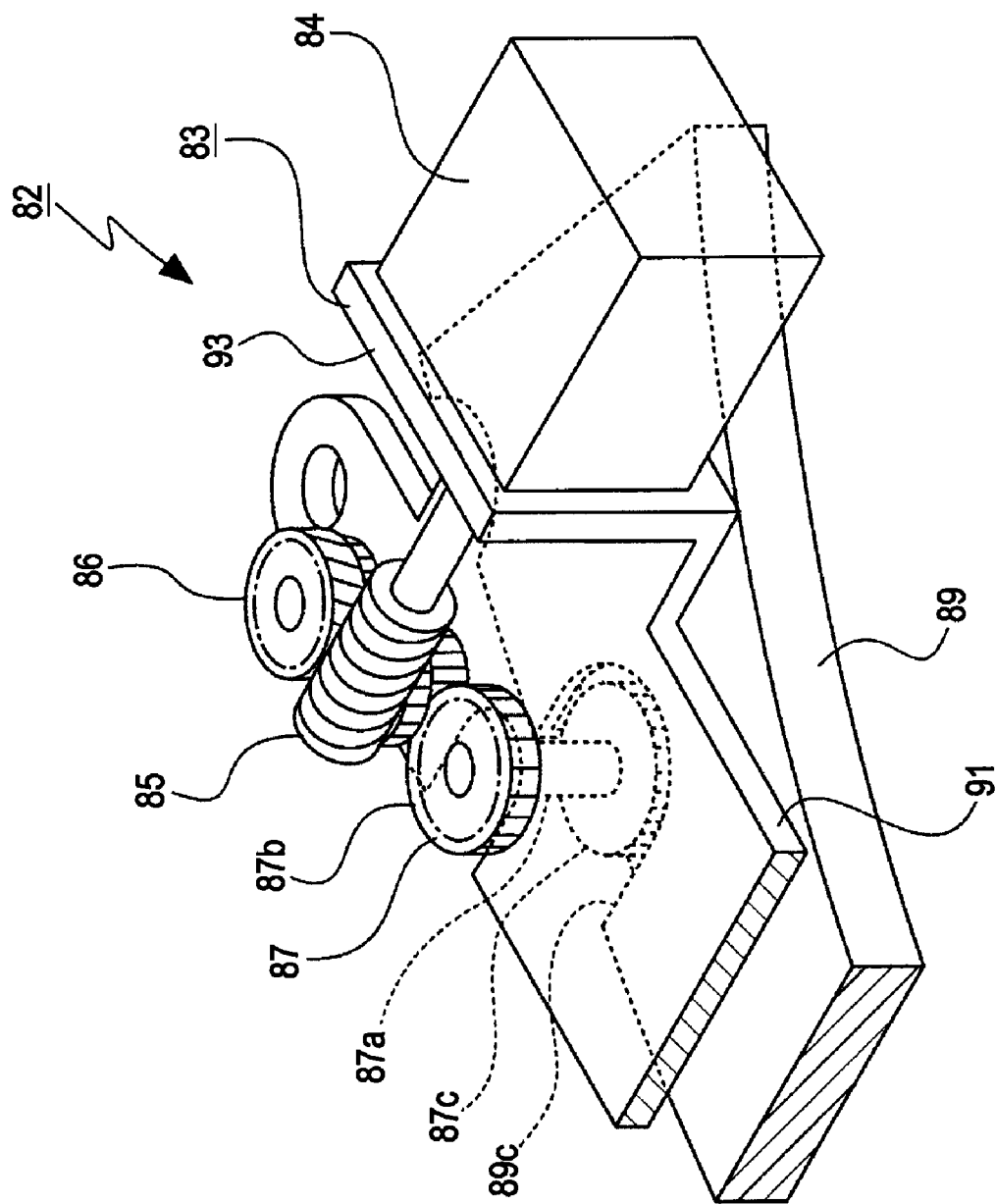

The rotation gear 87 has gear portions 87b, 87c respectively provided at the upper and lower end portions of the shaft portion 87a (see FIG. 31). The lower gear portion 87c is located below the bottom portion 39 of the second bracket 35. The upper gear portion 87b of the rotation gear 87 is meshed with the connecting gear group 86. Accordingly, when the rotation motor 84 is rotated, the resulting driving force is transmitted to the rotation gear 87 via the worm member 85 and the connecting gear group 86, so the rotation gear 87 is rotated in a direction corresponding to the rotation direction of the rotation motor 84.

The holder holding plate 88 is formed in a substantially arcuate shape, and has upwardly projected coupling shafts 94, 94 respectively attached at the left and right end portions of its upper surface. The motor holding plate 83 is attached to the upper surfaces of the coupling shafts 94, 94.

Figure 32:
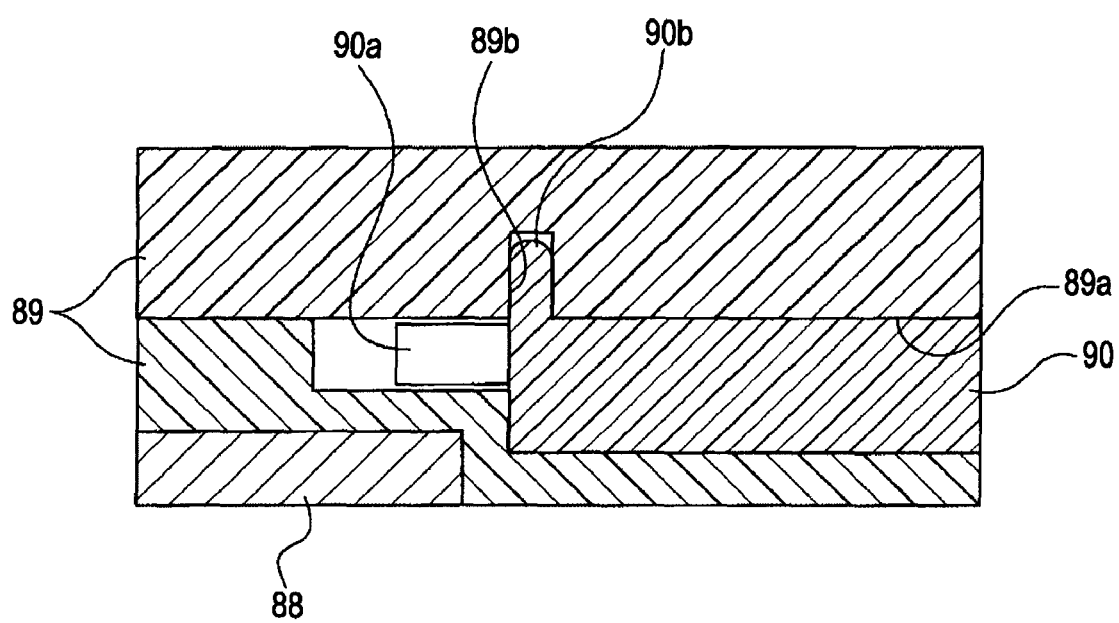
FIG. 32 is an enlarged sectional view showing a state with a connecting rack held on a rack holder.

The rack holder 89 is attached to the upper surface of the holder holding plate 88 (see FIGS. 13 and 14). The rack holder 89 is formed in a substantially arcuate shape. The rack holder 89 has a recessed support groove 89a that is opened rearward and in the circumferential direction (see FIG. 32). An arcuate drop-prevention slit 89b that is opened downward and in the left-right direction is formed in the rack holder 89. A gear-arranging recess 89c communicating with the recessed support groove 89a is formed in the rack holder 89. The gear portion 87c of the rotation gear 87 is arranged in the gear-arranging recess 89c.

An unlocking piece 89d that is projected rightward is provided to the right end face of the rack holder 89. The unlocking piece 89d functions as unlocking means for releasing the lock of the locking means 26 with respect to the storage tray 25.

The connecting rack 90 is movably supported on the rack holder 89. The connecting rack 90 is formed in a substantially arcuate shape having the same curvature as the storage tray 25, and has a rack portion 90a formed in its outer circumferential surface. An upwardly projected drop-prevention projection 90b is provided to the outer circumferential portion of the connecting rack 90.

The connecting rack 90 is inserted and supported in the recessed support groove 89a of the rack holder 89, and is circumferentially movable. The drop-prevention projection 90b of the connecting rack 90 is inserted into the drop-prevention slit 89b, thereby preventing the connecting rack 90 from dropping to the rear from the rack holder 89. The connecting rack 90 is meshed with the gear portion 87c of the rotation gear 87, and is moved circumferentially in accordance with the rotation of the rotation of the gear portion 87c.

As mentioned above, when the rotating cam gear 65 is rotated due to rotation of the drive motor 51, the motor holding plate 83 is moved in the front-rear direction. At this time, the other components of the tray rotating mechanism 82, that is, the rotation motor 84, the worm member 85, the connecting gear group 86, the rotation gear 87, the holder holding plate 88, the rack holder 89, and the connecting rack 90 are also rotated in the front-rear direction integrally with the motor holding plate 83.

In the state described above with reference to the operation of the disk holding mechanism 78, the movement of respective components such as the rack holder 89 in the front-rear direction is performed when the drive motor 51 is rotated and the cam pin 66a of the insertion shaft portion 66 is relatively moved in the start end portion 61a of the drive cam groove 61, and when the cam pin 66a of the insertion shaft portion 66 is relatively moved in the terminal end portion 61e of the drive cam groove 61. The rack holder 89 and the like are moved rearward when the cam pin 66a of the insertion shaft portion 66 is relatively moved in the start end portion 61a, and the rack holder 89 and the like are moved forward when the cam pin 66a of the insertion shaft portion 66 is relatively moved in the terminal end portion 61e.

Figure 33:
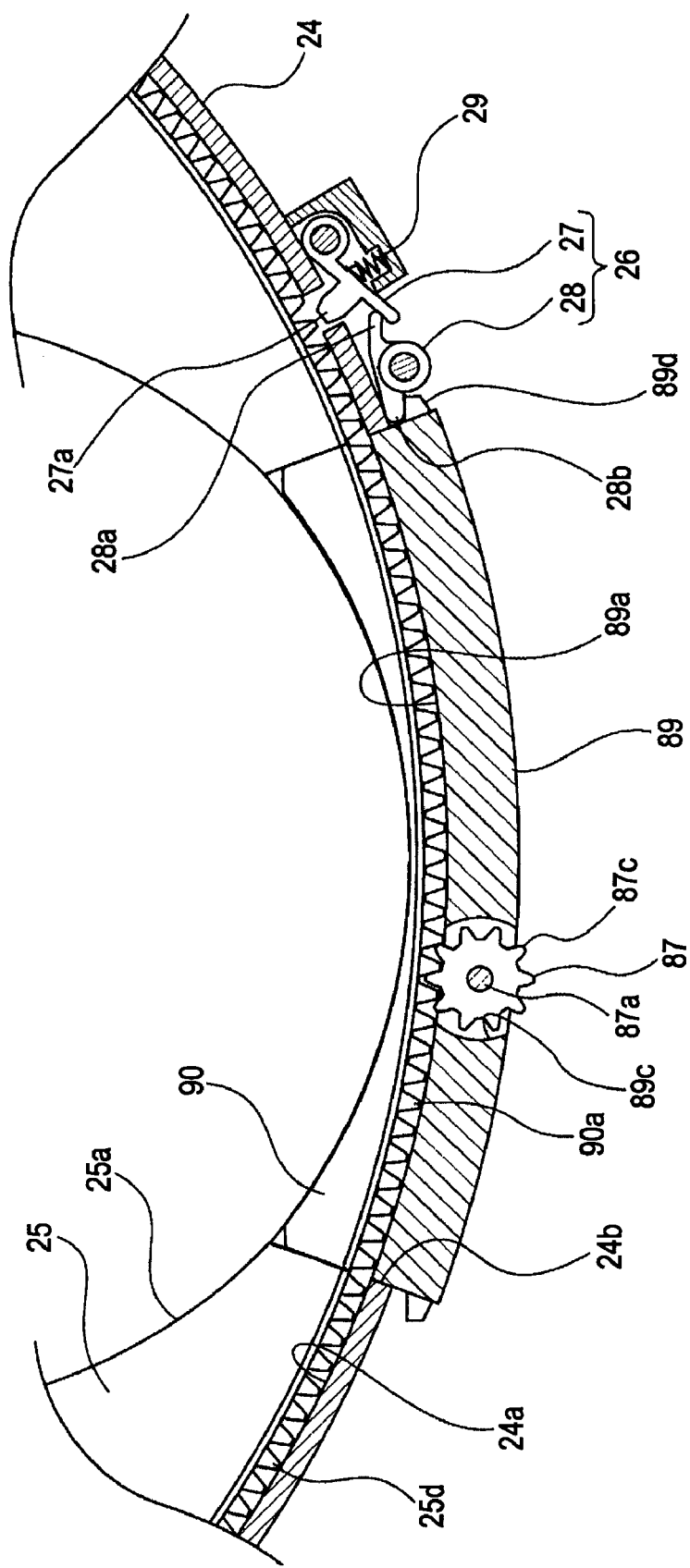
FIG. 33 is a plan view showing a state with lock by locking means with respect to a storage tray released.

When the rotating mechanism 82 is moved rearward, as shown in FIG. 33, the pivotal lever 28 supported on the tray housing 24 is pressed rearward by the unlocking piece 89d of the rack holder 89, and the pivotal lever 28 is pivoted to cause the locking member 27 to rotate against the urging force of the spring 29. The lock with respect to the storage tray 25 by the locking member 27 is thus released, so the storage tray 25 becomes rotatable.

Figure 34:
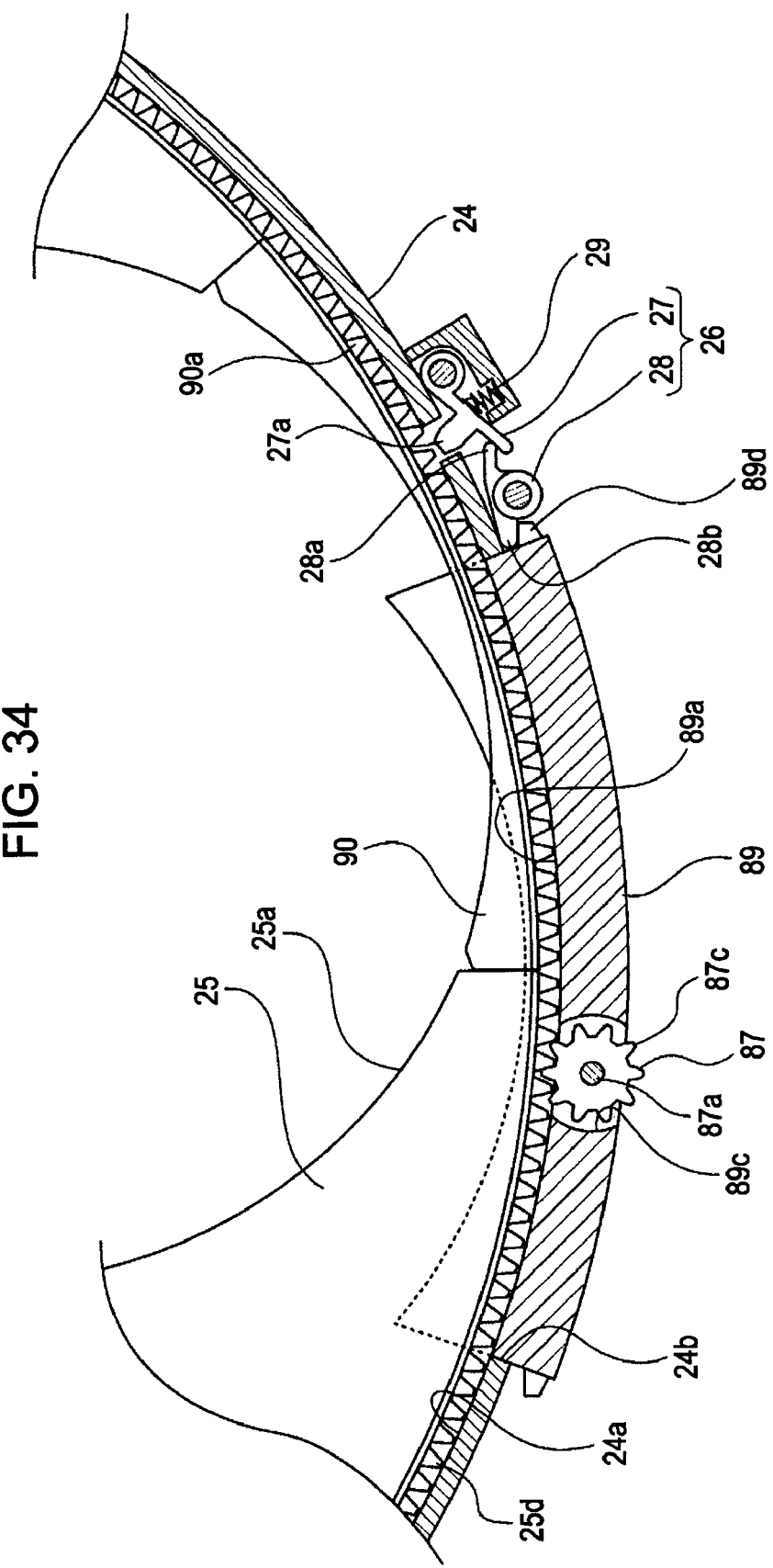
FIG. 34 is a plan view showing a state with the storage tray rotated together with the connecting rack.

In this case, both circumferential end faces of the connecting rack 90 are aligned and connected with both circumferential end faces of the storage tray 25. Accordingly, when the rotation gear 87 is rotated due to rotation of the drive motor 51, the connecting rack 90 is moved circumferentially, and the storage tray 25 is rotated (see FIG. 34). The storage tray 25 is meshed with the gear portion 87c of the rotation gear 87 and rotated.

As mentioned above, even in the case where the movement cutouts 25a, 25a, . . . serving as the movement space for the moving block 32 are formed in the storage trays 25, 25, . . . to achieve a reduction in the size of the recording medium changer 1, the provision of the connecting rack 90 makes it possible to rotate the storage trays 25, 25, . . . by an arbitrary angle.

Further, the locking means 26, 26, . . . for locking the storage trays 25, 25, . . . in a conveyance position that allows movement of the moving block 32 through the movement space are provided. It is thus possible to ensure smooth movement of the conveying mechanism 33 without the storage trays 25, 25, 25 . . . being rotated due to vibration or the like.

Furthermore, the rack holder 89 includes the unlocking piece 89d for releasing the lock of the locking means 26 when connecting the connecting rack 90 to the storage tray 25. The lock of the locking means 26 can be thus released with reliability at the time of connection of the connecting rack 90 to the storage tray 25, so the storage tray 25 can be reliably rotated.

Hereinbelow, description will be given of a delivery operation of the disk-shaped recording medium 200 in the recording medium changer 1 (see FIGS. 35 to 46).

Figure 35:
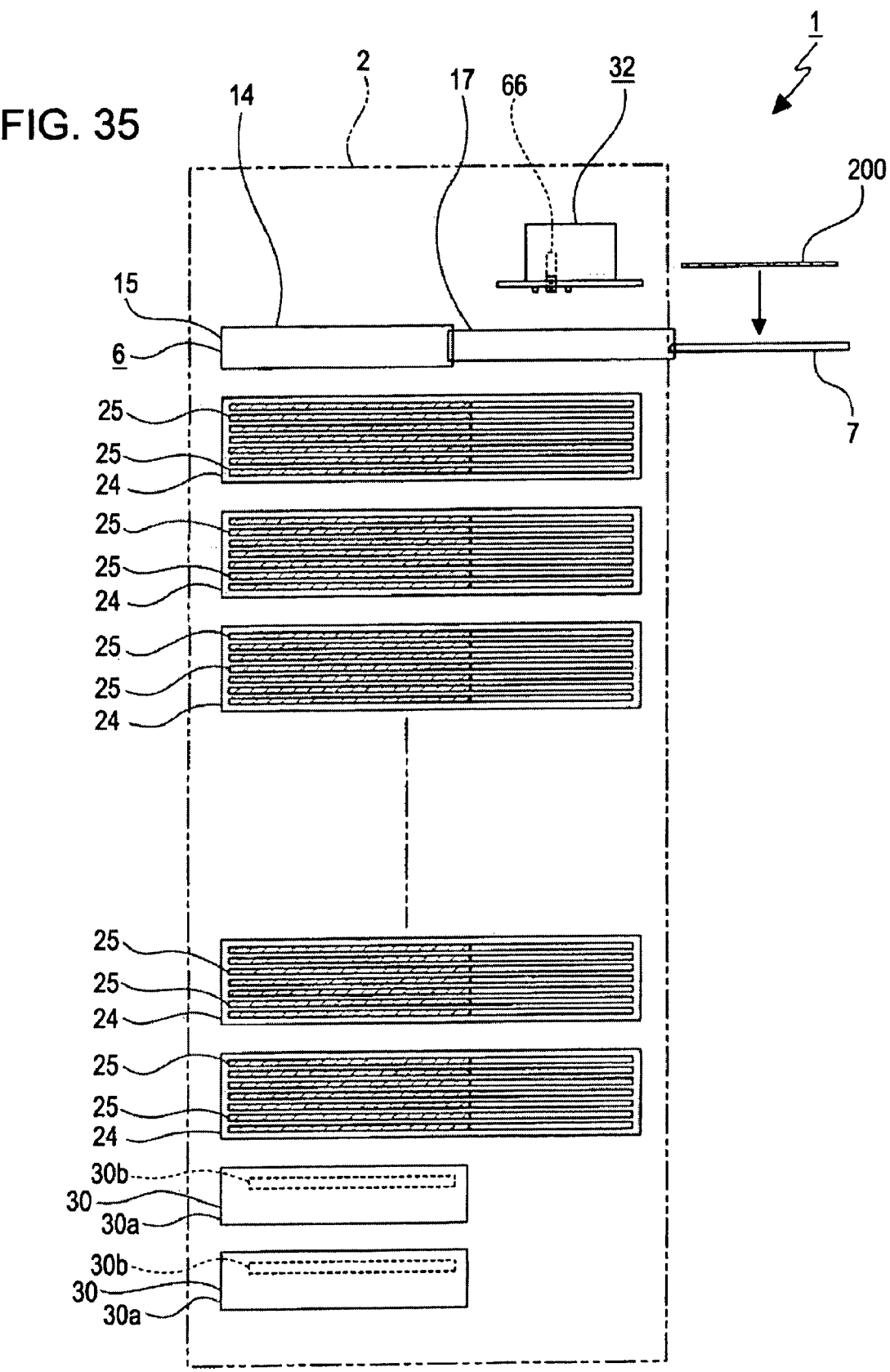
FIG. 35 is a schematic side view showing a state with the delivery tray moved to the eject position to load a recording medium on the delivery tray, illustrating the operation when the recording medium is conveyed together with FIGS. 36 to 44.
Figure 36:
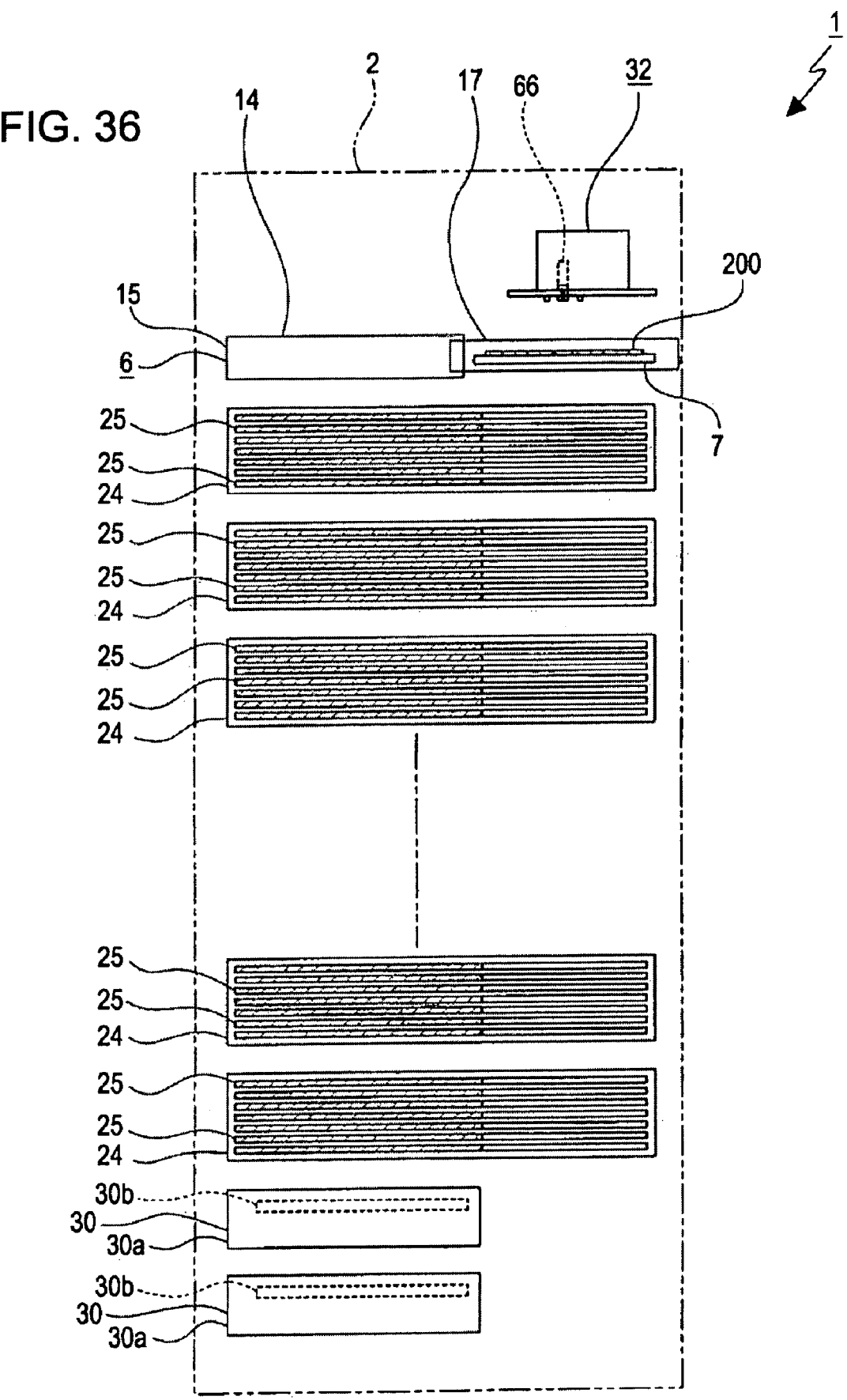
FIG. 36 is a schematic side view, continuing from FIG. 35, showing a state with the delivery tray moved to the delivery position and located below the moving block.

When, due to operation of the moving mechanism 14, the delivery tray 7 is moved forward and projected from an insertion/removal slot (not shown) formed in the outer housing 2, the delivery tray 7 reaches the eject position (see FIG. 35). The user loads the disk-shaped recording medium 200 onto the recording medium loading portion 9 of the delivery tray 7 located in the eject position. At this time, the moving block 32 is held at the upper movable end.

When a disk insertion button (not shown) is operated by the user, the delivery tray 7 is moved rearward to reach a delivery position. When the delivery tray 7 is stopped upon reaching the delivery position, the moving block 32 is lowered and moved to a position immediately above the delivery tray 7 (see FIG. 36).

Figure 37:
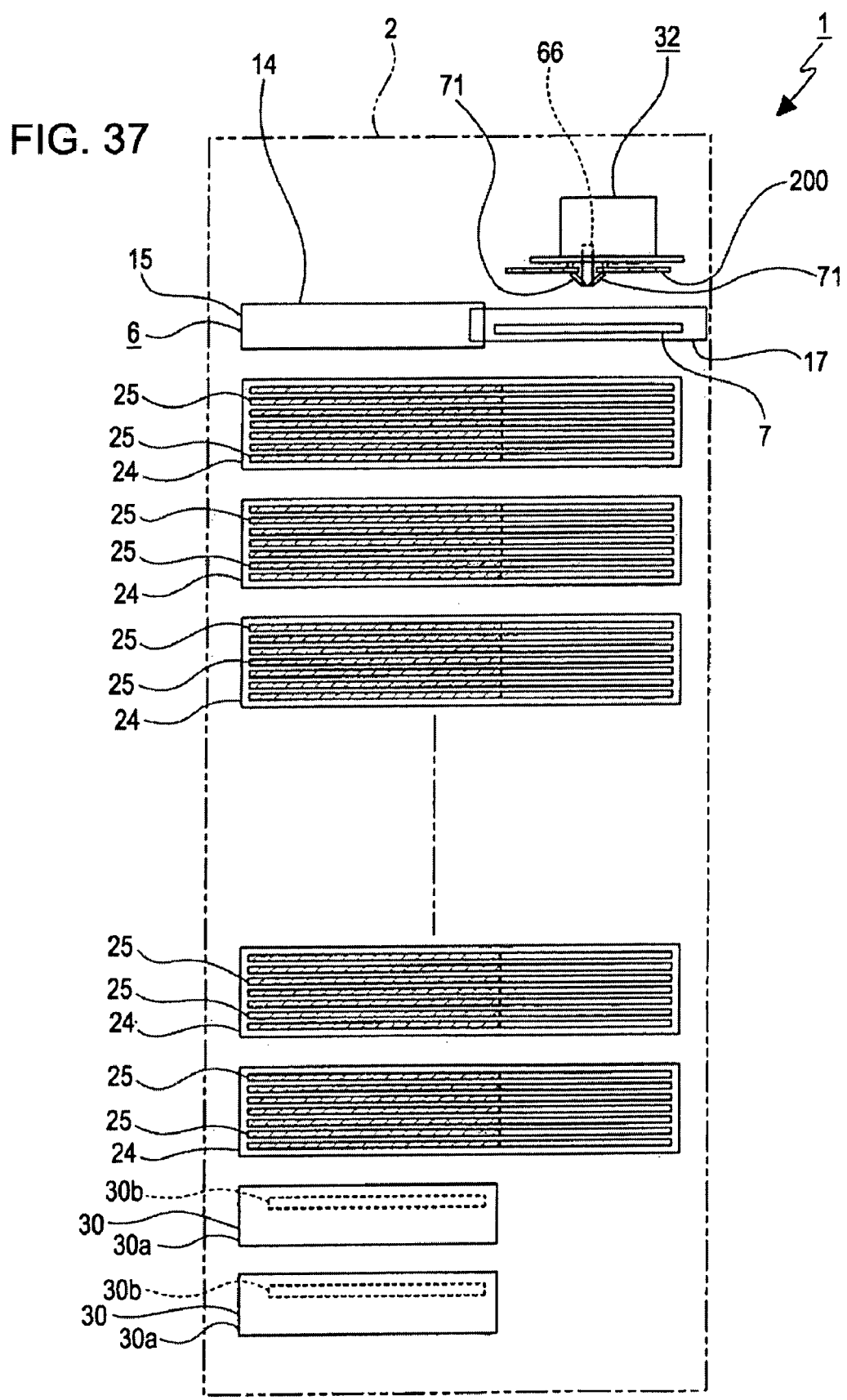
FIG. 37 is a schematic side view, continuing from FIG. 36, showing a state with a recording medium unloaded from the delivery tray by the disk holding mechanism.

Next, the disk-shaped recording medium 200 loaded on the recording medium loading portion 9 is held by the disk holding mechanism 78 provided in the moving block 32, and the disk-shaped recording medium 200 is moved upward (see FIG. 37).

Figure 38:
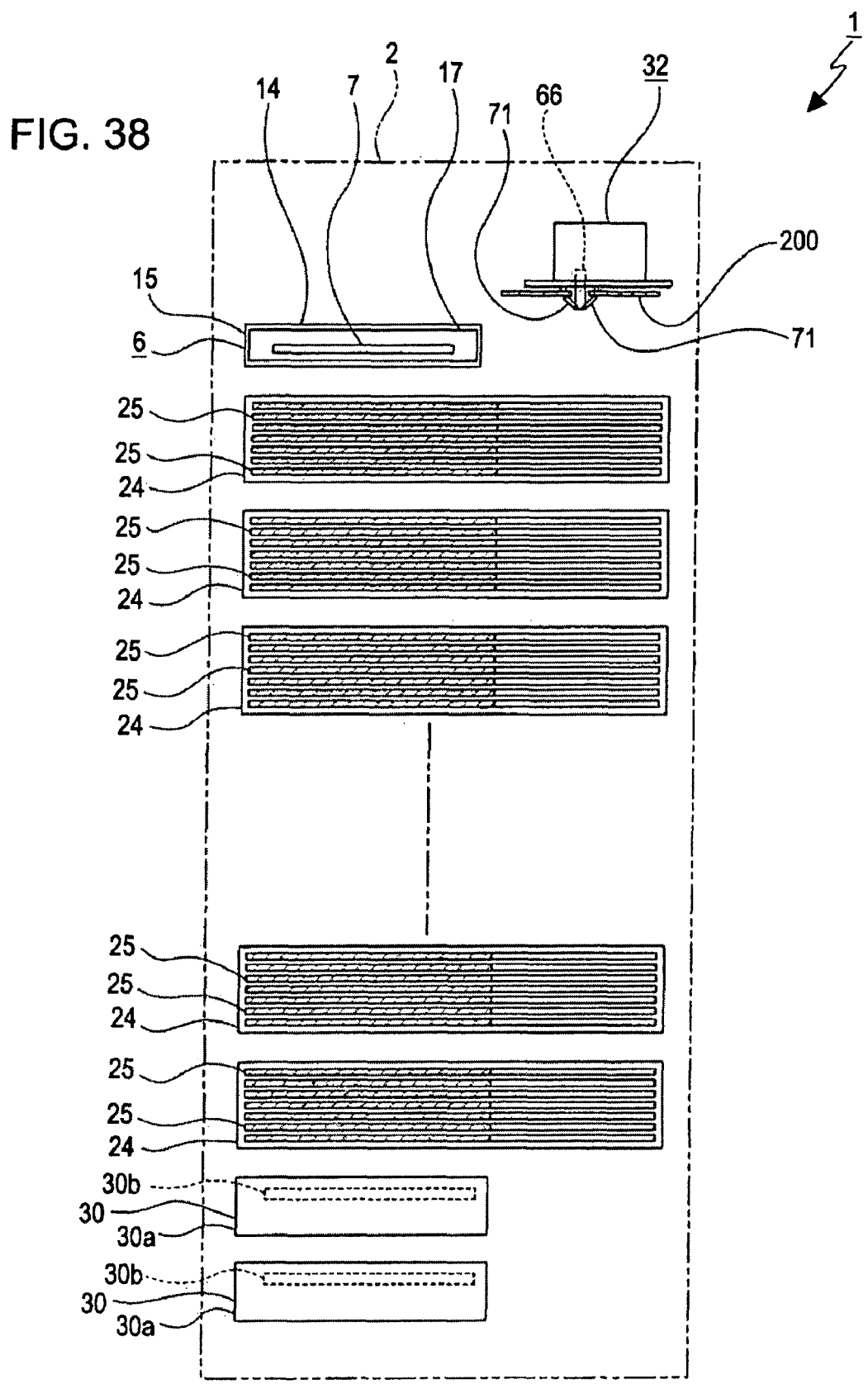
FIG. 38 is a schematic side view, continuing from FIG. 37, showing a state with the delivery tray moved to the retracted position.
Figure 39:
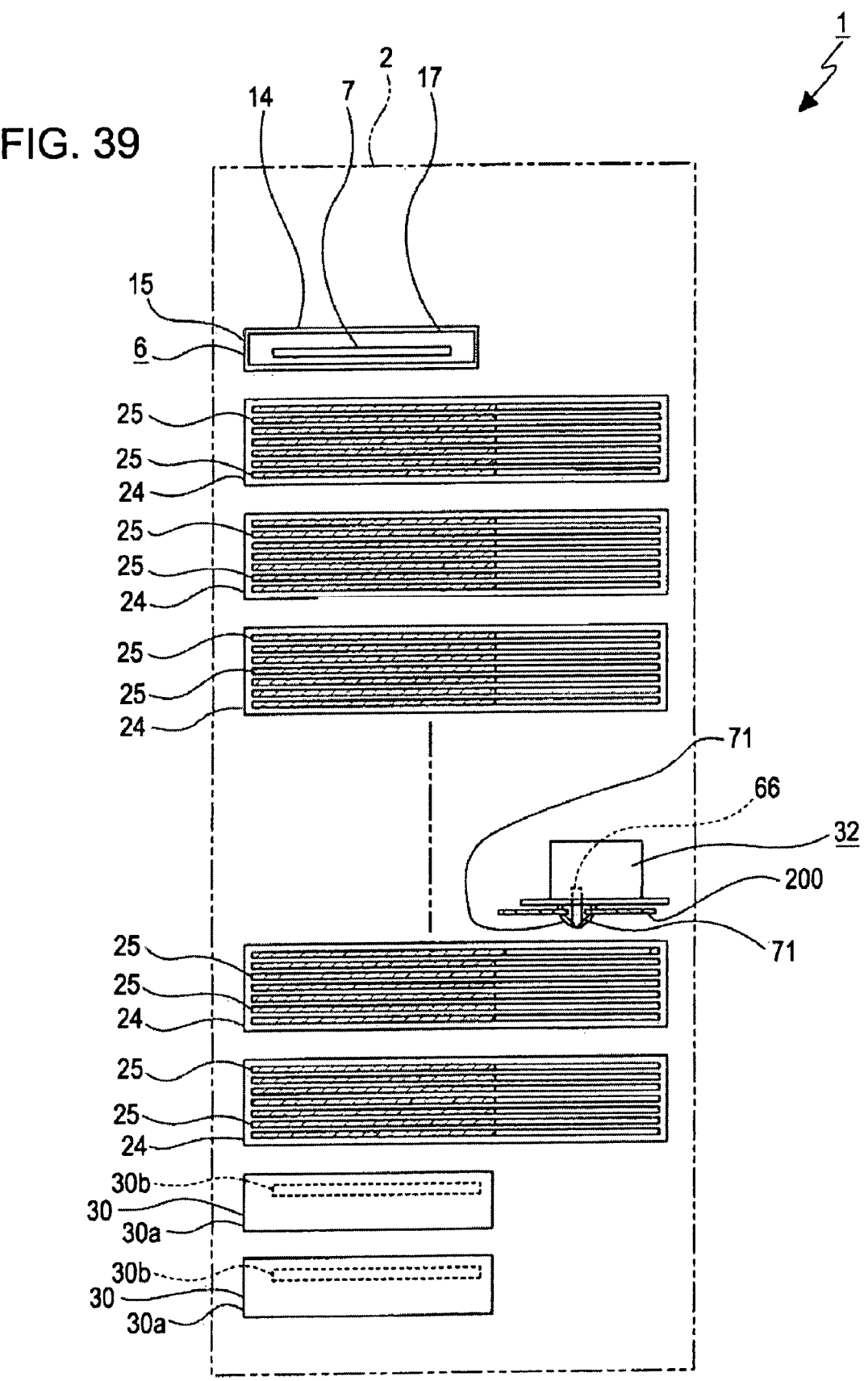
FIG. 39 is a schematic side view, continuing from FIG. 38, showing a state with the moving block lowered.
Figure 40:
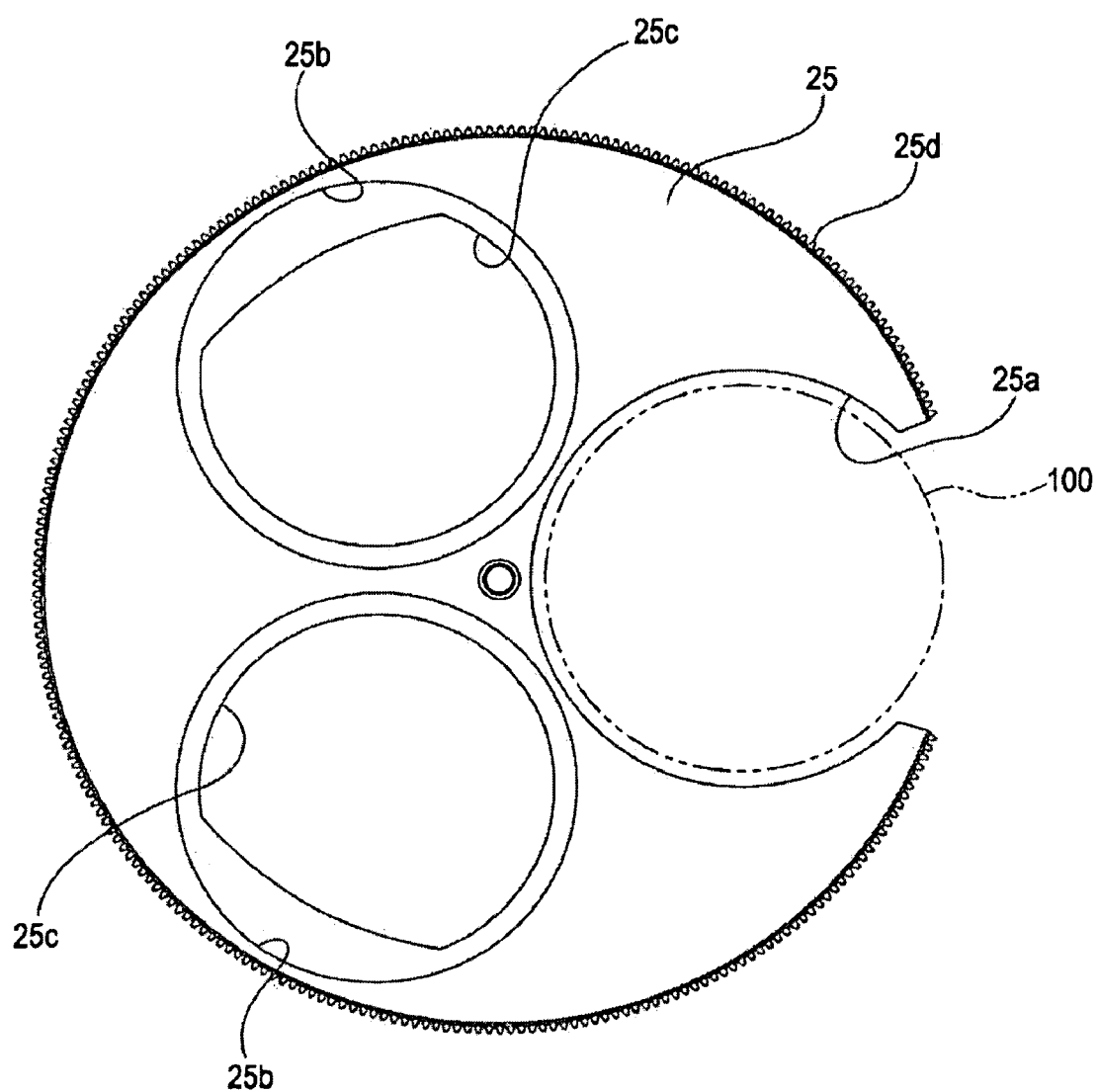
FIG. 40 is a schematic plan view, continuing from FIG. 39, showing a state with the storage tray rotated so that a storage recess is located below a recording medium.

When the disk-shaped recording medium 200 is moved to a position above the delivery tray 7, the moving mechanism 14 is operated again, and the delivery tray 7 is moved rearward to reach a retracted position (see FIG. 38).

In the state with the delivery tray 7 located in the retracted position, the relief cutout 9*e* of the delivery tray 7 is located directly above the movement cutouts 25*a*, 25*a*, ... of the storage trays 25, 25, ... in the alignment direction of the storage trays 25, 25, 25 . . . . It is thus possible to secure a movement space for the moving block 32 in the alignment direction of the storage trays 25, 25, ... by means of the relief cutout 9*e* of the delivery tray 7 and the movement cutouts 25*a*, 25*a*, ... of the storage trays 25, 25, 25 . . . , thereby allowing a reduction in the size of the recording medium changer 1.

When the delivery tray 7 reaches the retracted position, the moving block 32 is lowered again and moved to a predetermined position. At this time, when the disk-shaped recording medium 200 is to be stored into the storage tray 25, the moving block 32 is lowered until the connecting rack 90 becomes positioned directly to the right of the storage tray 25 into which the disk-shaped recording medium 200 is to be stored (see FIG. 39).

When the moving block 32 is lowered and stopped, as mentioned above, the rack holder 89 is moved rearward, and the lock of the locking means 26 with respect to the storage tray 25 is released. When the lock with respect to the storage tray 25 is released, the storage tray 25 is rotated until the storage recess 25*b* becomes positioned directly below the disk-shaped recording medium 200 (see FIG. 40).

Figure 41:
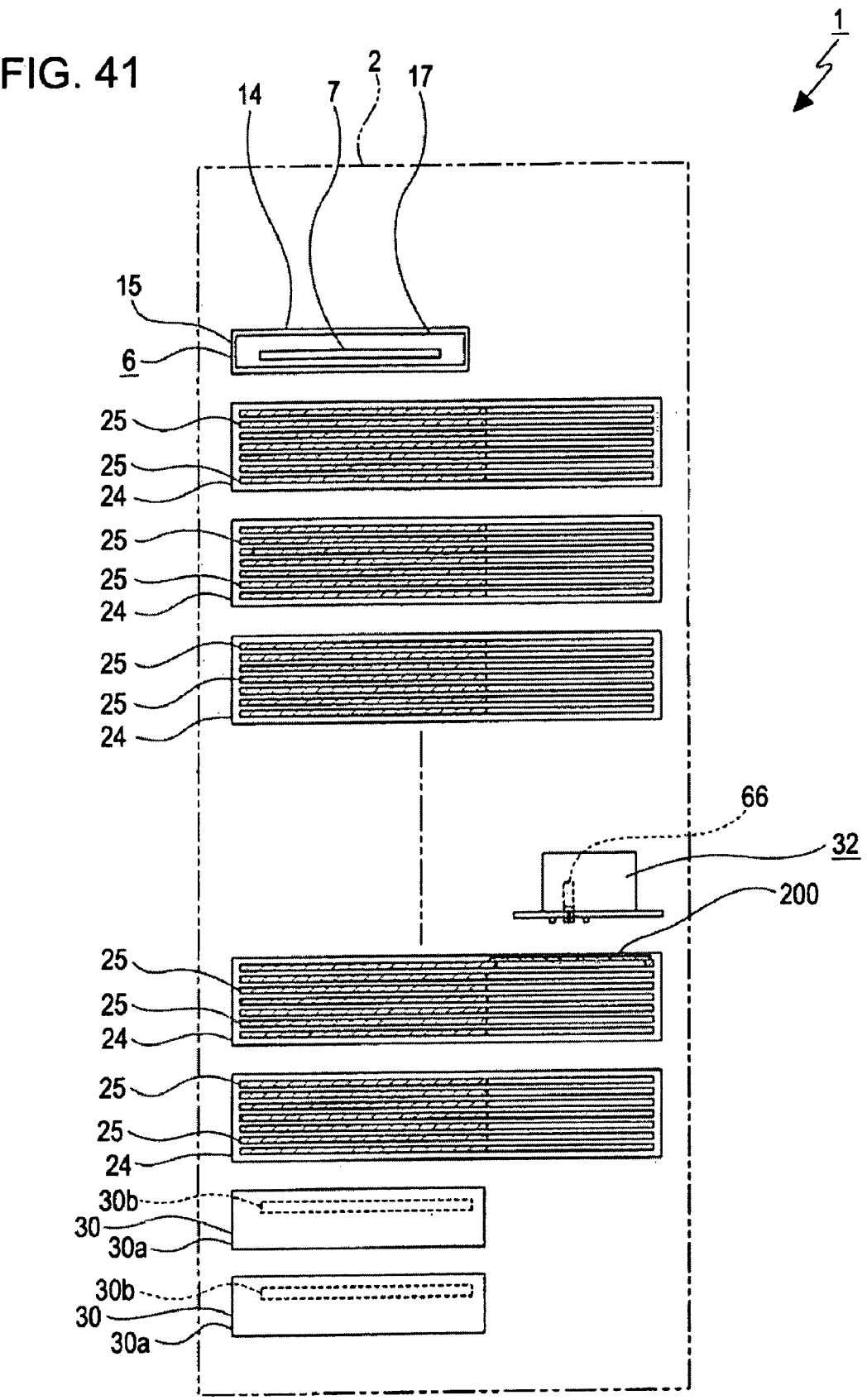
FIG. 41 is a schematic side view, continuing from FIG. 40, showing a state with a recording medium stored into the storage tray.
Figure 42:
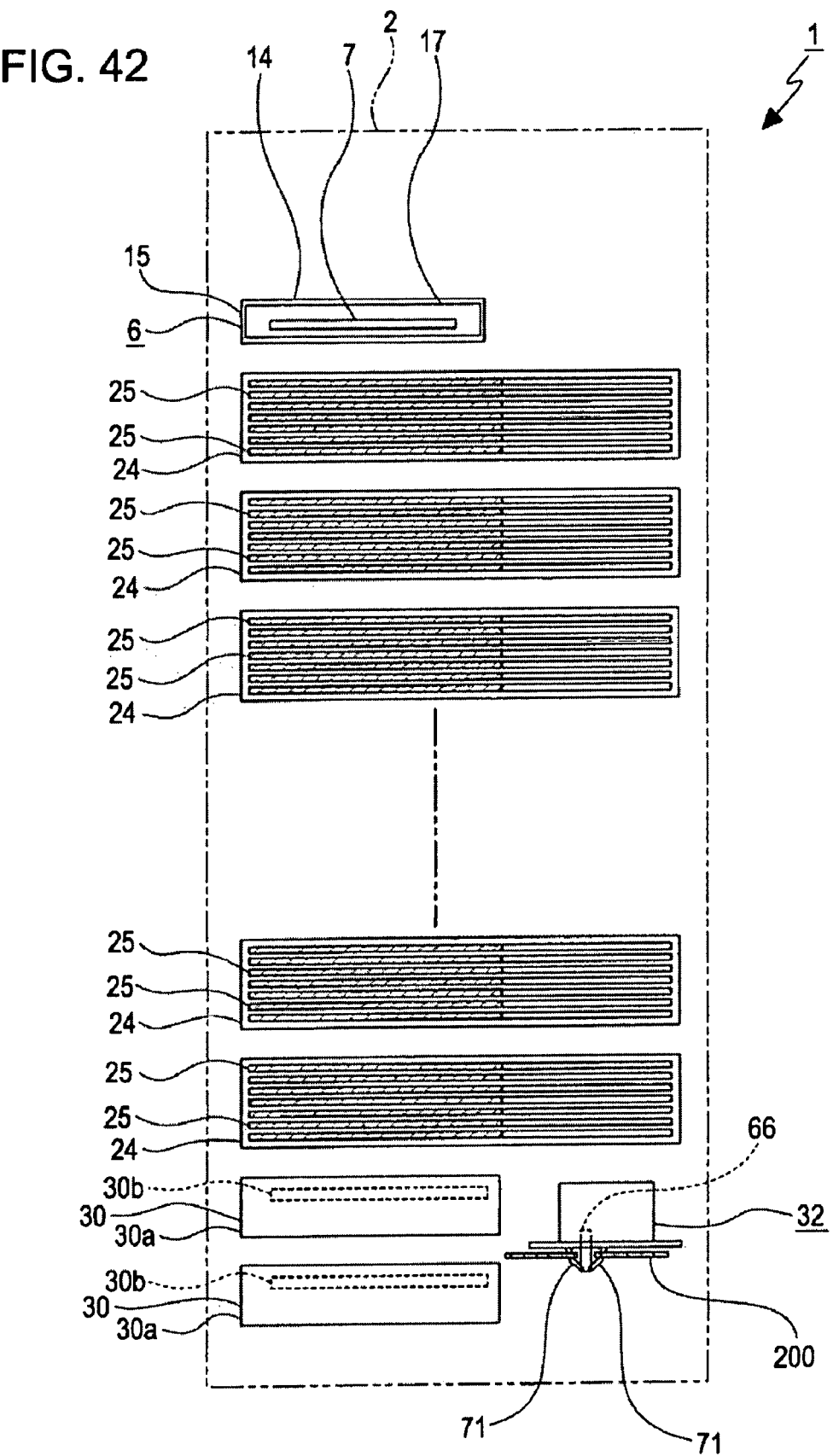
FIG. 42 is a schematic side view, continuing from FIG. 38, showing a state with the moving block lowered to a position in front of a drive device.

When the rotation of the storage tray 25 is stopped, the disk holding mechanism 78 is operated and the holding of the disk-shaped recording medium 200 is released, and the disk-shaped recording medium 200 is placed onto the storage recess 25*b* for storage (see FIG. 41). At this time, the insertion shaft portion 66 and the disk holding arms 71, 71, 71 are inserted in the shaft-portion insertion hole 25*c* of the storage tray 25.

When the disk-shaped recording medium 200 is stored into the storage recess 25*b*, the storage tray 25 is rotated and stored into the tray housing 24, and also the entire connecting rack 90 is held by the rack holder 89.

Subsequently, the rack holder 89 is moved forward, and a lock is applied again to the storage tray 25 by the locking means 26. When a lock is applied to the storage tray 25, the moving block 32 is moved vertically.

At this time, when delivery of the disk-shaped recording medium 200 between the moving block 32 and the storage tray 25 is finished, the moving block 32 is moved to the upper movable end. On the other hand, when delivery of another disk-shaped recording medium 200 is to be subsequently performed between the moving block 32 and the storage tray 25, the moving block 32 is moved to a position corresponding to a desired storage tray 25.

As mentioned above, the recording medium changer 1 includes the moving mechanism 14 for moving the delivery tray 7, and the conveying mechanism 33 for conveying the disk-shaped recording medium 200 unloaded from the delivery tray 7. Therefore, it is possible to realize a simplified mechanism as compared with a configuration in which a plurality of delivery trays and moving mechanisms corresponding to the delivery trays are provided, the disk-shaped recording mediums 200, 200, ... are loaded onto respective delivery trays, and the respective delivery trays are conveyed by the respective moving mechanisms.

Further, when exchanging the disk-shaped recording medium 200 between the storage trays 25, 25, ..., it is not necessary to temporarily unload the disk-shaped recording medium 200 to be exchanged from the recording medium changer 1, allowing for an easy exchange operation.

Further, since the moving mechanism 14 includes the intermediate movable member 17 that movably supports the support base 15 and the delivery tray 7, the amount of movement of the delivery tray 7 can be made large, and the connecting portion of the delivery tray 7 with the moving mechanism 14 can be enlarged to thereby prevent rattling or the like of the delivery tray 7 with respect to the moving mechanism 14.

Furthermore, since the delivery position for the delivery tray 7 is set as a position directly above the movement cutouts 25*a*, 25*a*, ... of the storage trays 25, 25, ..., it is possible to minimize the movement path of the moving block 32 to achieve a reduction in the size of the recording medium changer 1.

The above description is directed to a case where the disk-shaped recording medium 200 is stored into the storage tray 25 after the delivery tray 7 reaches the retracted position. However, in a case where an information signal is to be recorded onto or reproduced from the disk-shaped recording medium 200 after the delivery tray 7 reaches the retracted position, the moving block 32 is lowered to a position corresponding to one drive device 30 (see FIG. 42).

Figure 43:
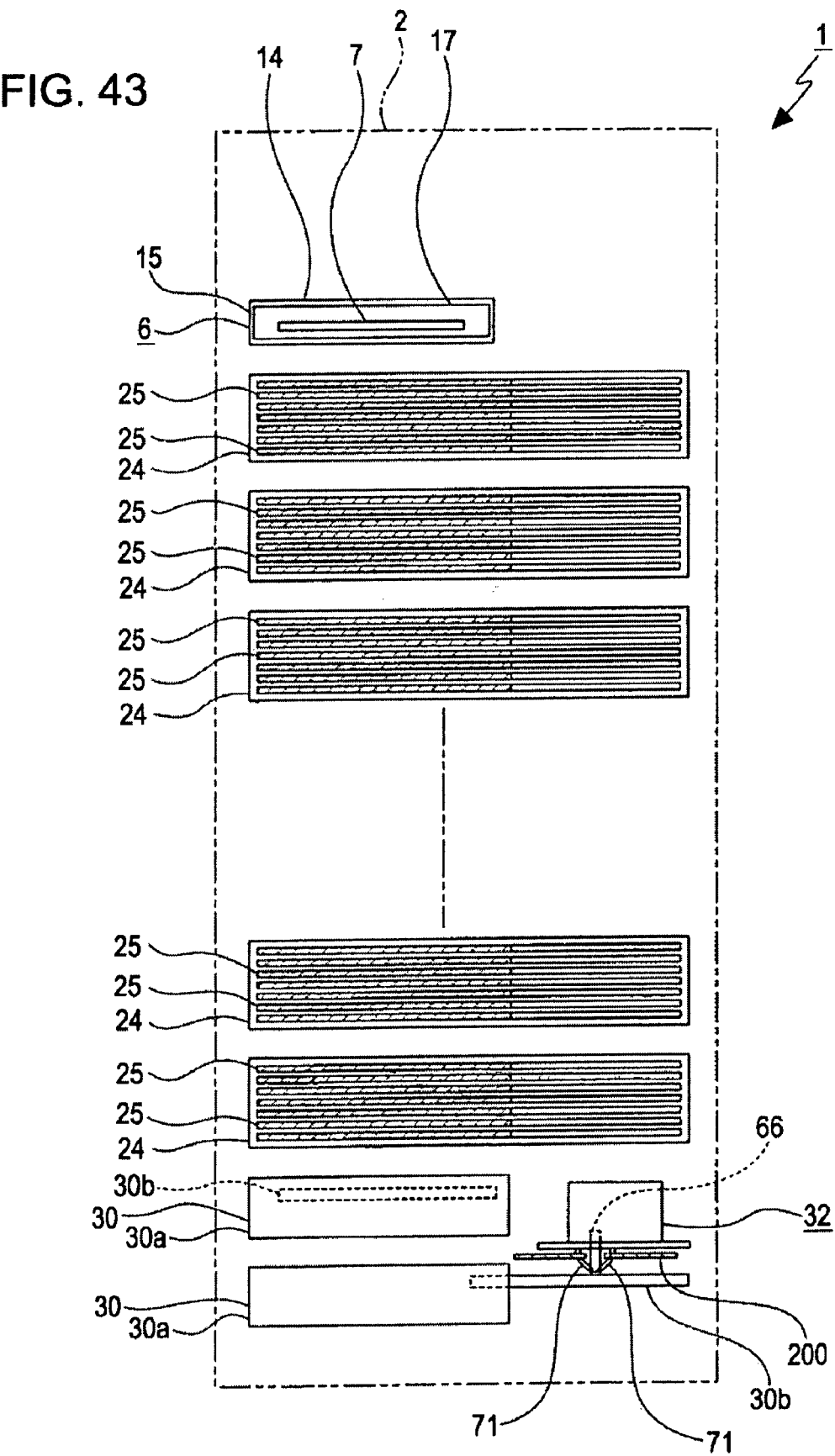
FIG. 43 is a schematic side view, continuing from FIG. 42, showing a state with a tray projected from the drive device.

When the moving block 32 is lowered to a position corresponding to the drive device 30 and stopped, the tray 30*b* is projected forward from the main body portion 30*a* of the drive device 30 (see FIG. 43).

Figure 44:
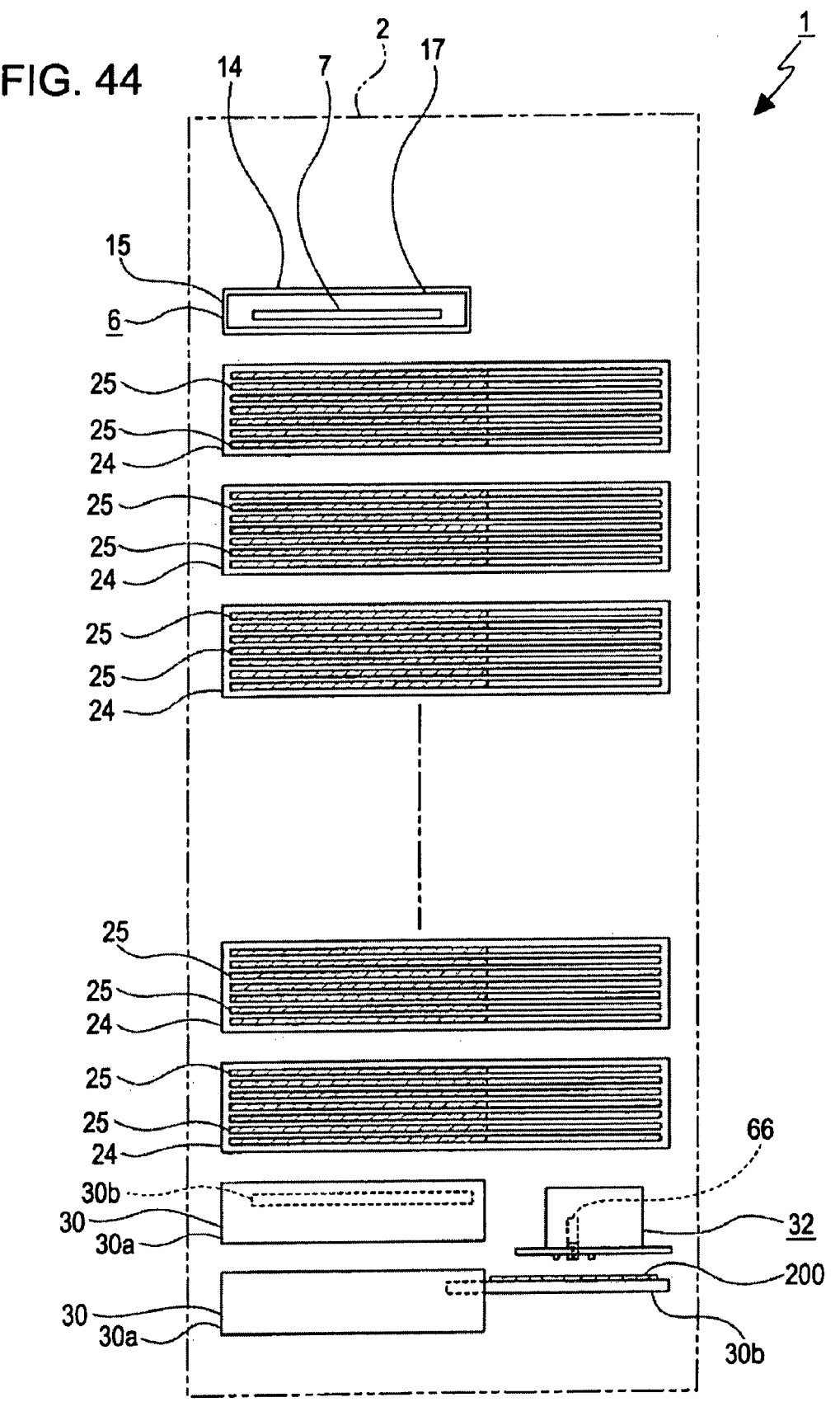
FIG. 44 is a schematic side view, continuing from FIG. 43, showing a state with a recording medium loaded on the tray of the drive device.

When the tray 30*b* of the drive device 30 is projected forward, the disk holding mechanism 78 is operated and the holding of the disk-shaped recording medium 200 is released, and the disk-shaped recording medium 200 is loaded onto the tray 30*b* (see FIG. 44). When the disk-shaped recording medium 200 is loaded onto the tray 30*b*, the tray 30*b* is drawn into the main body portion 30*a*, and recording or reproduction of an information signal to/from the disk-shaped recording medium 200 is started.

When recording or reproduction of an information signal to/from the disk-shaped recording medium 200 is finished, the tray 30*b* is projected forward from the main body portion 30*a* of the drive device 30 again, the disk-shaped recording medium 200 is held by the disk holding mechanism 78, and the moving block 32 is raised so that the disk-shaped recording medium 200 is stored into a predetermined storage tray 25, or loaded onto the delivery tray 7 to be discharged to the outside.

Figure 47:
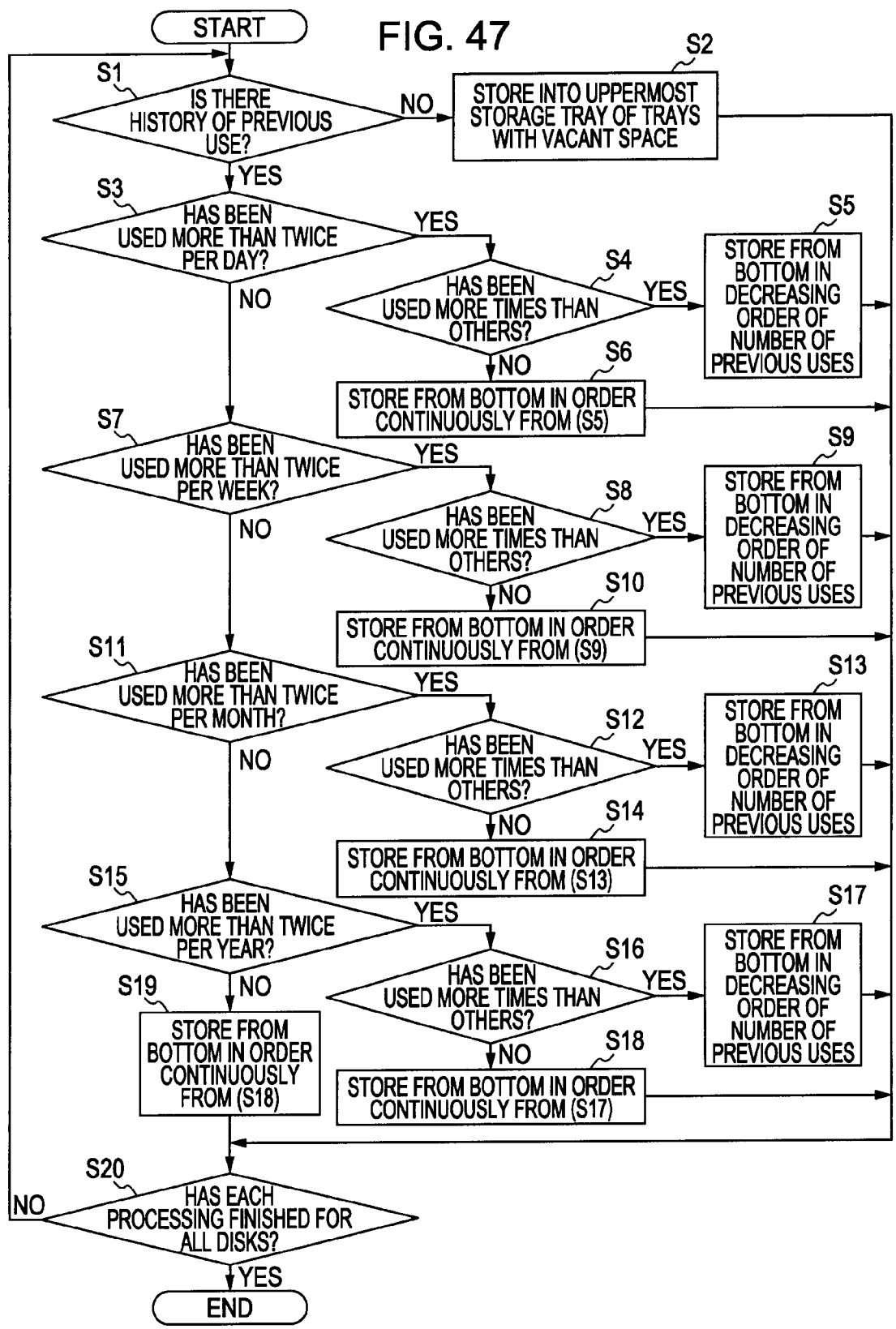
FIG. 47 is a flow chart showing a rearranging operation.

Next, description will be given of an operation of rearranging the disk-shaped recording media 200, 200, ... set on the recording medium changer 1 (see FIGS. 45 to 47).

The recording medium changer 1 is set such that on the basis of fixed conditions, the disk-shaped recording medium 200 with higher frequency of use is stored on the bottom side.

Figure 45:
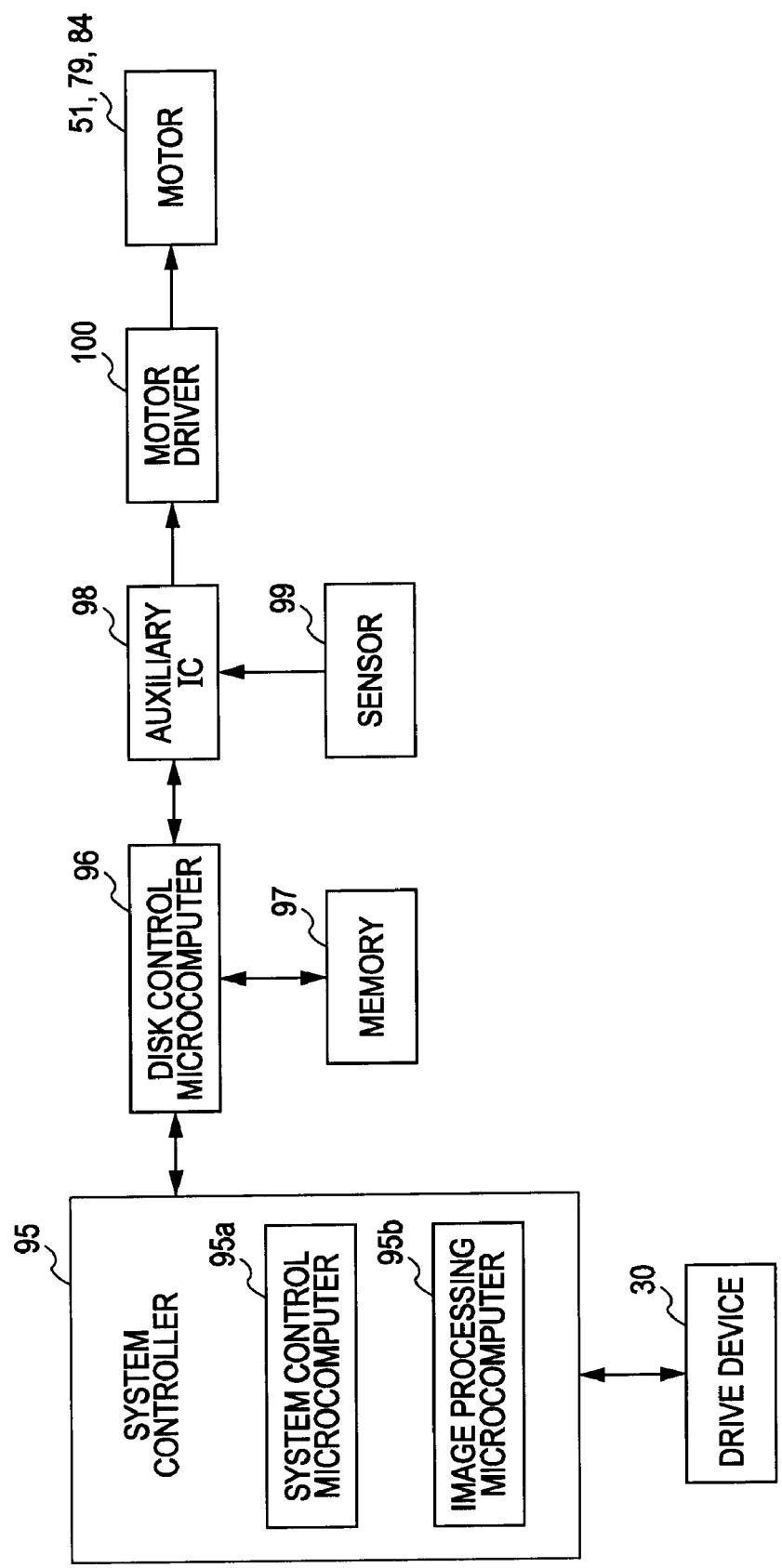
FIG. 45 is a block diagram showing a control system.

FIG. 45 is a block diagram showing a control system provided in the recording medium changer 1.

The recording medium changer 1 includes a system controller 95 that is in charge of overall control. The system controller 95 has a system control microcomputer 95*a* that performs control of the control system, and an image processing microcomputer 95*b* that performs image processing with respect to a display portion (not shown) provided in the recording medium changer 1. The current operation status, and various kinds of information on the disk-shaped recording media 200, 200, . . . and the like are displayed on the display portion.

The system controller 95 sends out drive signals to the drive devices 30, 30 to control the operation of the drive devices 30, 30.

The system controller 95 is connected to a disk control microcomputer 96. The disk control microcomputer 96 performs operation control related to delivery of the disk-shaped recording media 200, 200, . . . between respective components, for example, operation control with respect to the moving mechanism 14, the storage trays 25, 25, . . . , the moving block 32, the tray rotating mechanism 82, and the like.

The disk control microcomputer 96 performs storage of information related to the disk-shaped recording media 200, 200, . . . or the like into a memory 97, and reads information stored in the memory 97 and sends out operation signals to respective components. Therefore, the memory 97 functions as storage means for storing information related to the disk-shaped recording media 200, 200, . . . .

The disk control microcomputer 96 performs transmission/reception of signals to/from an auxiliary IC (Integrated Circuit) 98. Detection signals from various sensors 99, 99, . . . , for example, the sensors 99 for detecting the presence/absence of loaded disk-shaped recording media 200, 200, . . . on the delivery tray 7 or the storage trays 25, 25, . . . , or the sensor 99 for detecting the holding state of the disk-shaped recording media 200, 200, . . . with respect to the disk holding mechanism 78, and the like are inputted to the auxiliary IC 98. Further, control signals are sent out from the disk control microcomputer 96 to respective motors, for example, the drive motor 51, the elevation motor 79, and the rotation motor 84 via the auxiliary IC 98 and motor drivers 100, 100, . . . , causing these motors to rotate.

The following rearranging operation of the disk-shaped recording media 200, 200, . . . is performed by the control system described above.

The rearranging operation is performed on the basis of information related to the individual disk-shaped recording media 200, 200, . . . stored in the memory 97 (see FIG. 46). Detection of information related to the disk-shaped recording media 200, 200, . . . is performed by one of the above-mentioned sensors 99, 99, . . . that function as detection means.

Examples of information related to the disk-shaped recording media 200, 200 include storage position on the storage trays 25, 25, . . . , presence/absence of storage, kind, title, and use date and time. Use date and time is stored for every one of the stored disk-shaped recording media 200, 200, . . . for every time it is used. On the basis of this use date and time, the frequency of use is calculated with respect to each one of the disk-shaped recording media 200, 200, . . . by the disk control microcomputer 96. The disk control microcomputer 96 thus also functions as calculating means for calculating the use frequencies of the disk-shaped recording media 200, 200. The use frequency is calculated on the basis of the number of times of use in a fixed period, for example, the number of times of use per day, the number of times of use per week, the number of times of use per month, or the number of times of use per year.

Hereinbelow, a specific example of rearranging operation will be described with reference to the flow chart of FIG. 47.

(S1) A rearranging operation is started, and it is determined whether or not the disk-shaped recording medium to be stored has a history of previous use. If it is determined that there is no history of previous use, the process transfers to (S2), and if it is determined that there is a history of previous use, the process transfers to (S3).

(S2) Of storage trays with a vacant space in the storage recess, the disk-shaped recording medium is stored into the uppermost storage tray. When the processing is finished, the process transfers to (S20).

(S3) It is determined whether or not a disk-shaped recording medium has been used more than twice per day. If it is determined that the disk-shaped recording medium has been used more than twice, the process transfers to (S4). If it is determined that the disk-shaped recording medium has not been used more than twice, the process transfers to (S7).

(S4) With respect to every disk-shaped recording medium determined to have been used more than twice per day, it is determined whether or not the disk-shaped recording medium has been used more times than other disk-shaped recording media. If it is determined that the disk-shaped recording medium has been used more times than other disk-shaped recording media, the process transfers to (S5). If it is determined that the disk-shaped recording medium has not been used more times than other disk-shaped recording media, the process transfers to (S6).

(S5) Disk-shaped recording media are stored into storage trays located on the bottom side in decreasing order of the number of previous uses. If the number of previous uses is the same, then, for example, the used time is compared. Disk-shaped recording media with longer used times are preferentially stored into storage trays located on the bottom side. When the processing is finished, the process transfers to (S20).

(S6) Continuously from the storage trays into which disk-shaped recording media have been stored in (S5), disk-shaped recording media are stored into storage trays in order from the bottom side. If a plurality of disk-shaped recording media are present, then, for example, their used times are compared, and disk-shaped recording media with longer used times are preferentially stored into storage trays in order from the bottom side. When the processing is finished, the process transfers to (S20).

(S7) It is determined whether or not a disk-shaped recording medium has been used more than twice per week. If it is determined that the disk-shaped recording medium has been used more than twice, the process transfers to (S8). If it is determined that the disk-shaped recording medium has not been used more than twice, the process transfers to (S11).

(S8) With respect to every disk-shaped recording medium determined to have been used more than twice per week, it is determined whether or not the disk-shaped recording medium has been used more times than other disk-shaped recording media. If it is determined that the disk-shaped recording medium has been used more times than other disk-shaped recording media, the process transfers to (S9). If it is determined that the disk-shaped recording medium has not been used more times than other disk-shaped recording media, the process transfers to (S10).

(S9) Disk-shaped recording media are stored into storage trays located on the bottom side in decreasing order of the number of previous uses. If the number of previous uses is the same, then, for example, the used time is compared. Disk-shaped recording media with longer used times are preferentially stored into storage trays located on the bottom side. When the processing is finished, the process transfers to (S20).

(S10) Continuously from the storage trays into which disk-shaped recording media have been stored in (S9), disk-shaped recording media are stored into storage trays in order from the bottom side. If a plurality of disk-shaped recording media are present, then, for example, their used times are compared, and disk-shaped recording media with longer used times are preferentially stored into storage trays in order from the bottom side. When the processing is finished, the process transfers to (S20).

(S11) It is determined whether or not a disk-shaped recording medium has been used more than twice per month.

If it is determined that the disk-shaped recording medium has been used more than twice, the process transfers to (S12). If it is not determined that the disk-shaped recording medium has been used more than twice, the process transfers to (S15).

(S12) With respect to every disk-shaped recording medium determined to have been used more than twice per month, it is determined whether or not the disk-shaped recording medium has been used more times than other disk-shaped recording media. If it is determined that the disk-shaped recording medium has been used more times than other disk-shaped recording media, the process transfers to (S13). If it is determined that the disk-shaped recording medium has not been used more times than other disk-shaped recording media, the process transfers to (S14).

(S13) Disk-shaped recording media are stored into storage trays located on the bottom side in decreasing order of the number of previous uses. If the number of previous uses is the same, then, for example, the used time is compared. Disk-shaped recording media with longer used times are preferentially stored into storage trays located on the bottom side. When the processing is finished, the process transfers to (S20).

(S14) Continuously from the storage trays into which disk-shaped recording media have been stored in (S13), disk-shaped recording media are stored into storage trays in order from the bottom side. If a plurality of disk-shaped recording media are present, then, for example, their used times are compared, and disk-shaped recording media with longer used times are preferentially stored into storage trays in order from the bottom side. When the processing is finished, the process transfers to (S20).

(S15) It is determined whether or not a disk-shaped recording medium has been used more than twice per year. If it is determined that the disk-shaped recording medium has been used more than twice, the process transfers to (S16). If it is not determined that the disk-shaped recording medium has been used more than twice, the process transfers to (S19).

(S16) With respect to every disk-shaped recording medium determined to have been used more than twice per month, it is determined whether or not the disk-shaped recording medium has been used more times than other disk-shaped recording media. If it is determined that the disk-shaped recording medium has been used more times than other disk-shaped recording media, the process transfers to (S17). If it is determined that the disk-shaped recording medium has not been used more times than other disk-shaped recording media, the process transfers to (S18).

(S17) Disk-shaped recording media are stored into storage trays located on the bottom side in decreasing order of the number of previous uses. If the number of previous uses is the same, then, for example, the used time is compared. Disk-shaped recording media with longer used times are preferentially stored into storage trays located on the bottom side. When the processing is finished, the process transfers to (S20).

(S18) Continuously from the storage trays into which disk-shaped recording media have been stored in (S17), disk-shaped recording media are stored into storage trays in order from the bottom side. If a plurality of disk-shaped recording media are present, then, for example, their used times are compared, and disk-shaped recording media with longer used times are preferentially stored into storage trays in order from the bottom side. When the processing is finished, the process transfers to (S20).

(S19) Continuously from the storage trays into which disk-shaped recording media have been stored in (S18), disk-shaped recording media are stored into storage trays in order from the bottom side. If a plurality of disk-shaped recording media are present, then, for example, their used times are compared, and disk-shaped recording media with longer used times are preferentially stored into storage trays in order from the bottom side.

(S20) It is determined whether or not processing with respect to all the stored disk-shaped recording media has been finished. If it is determined that processing has not been finished, the process transfers to (S1). If it is determined that processing has been finished, the rearranging operation ends.

As mentioned above, in the recording medium changer 1, on the basis of the frequencies of use of the disk-shaped recording media 200, 200, . . . , the disk-shaped recording media 200, 200, . . . are stored into the storage trays 25, 25, . . . on the bottom side in decreasing order of frequency of use. Therefore, it is possible to reduce the amount of deposition of dust such as chipping powder, which can be generated during unloading or storage of the disk-shaped recording medium 200 from/to the storage tray 25 or during drive of respective components provided in the recording medium changer 1, on each of the disk-shaped recording media 200, 200 . . . , thereby improving the reliability of an information signal recording/reproducing operation with respect to the disk-shaped recording media 200, 200 . . . .

Further, the number of times of use per day, the number of times of use per week, the number of times of use per month, and the number of times of use per year are calculated in order, and the disk-shaped recording media 200, 200, . . . are stored into the storage trays 25, 25, . . . in decreasing order of frequency of use. Therefore, the rearranging operation can be performed with ease and reliability.

Further, in the recording medium changer 1, the drive devices 30, 30 are arranged in proximity to (directly below) the storage tray 25 arranged on the lowermost side. This means that the drive devices 30, 30 are located in proximity to the disk-shaped recording media 200, 200, . . . whose frequencies of use are assumed to be high, which makes it possible to reduce the time required for the conveyance of the disk-shaped recording media 200, 200, . . . to the drive devices 30, 30.

A configuration may be adopted in which, for example, an operation button for rearranging operation is provided, and the above-mentioned rearranging operation is executed when a user's operation with respect to the operation button is performed, or in which an idle time during which the recording medium changer 1 is not used is detected, and the above-mentioned rearranging operation is executed during this idle time. Further, a configuration may be adopted in which the timing and period for performing a rearranging operation are set in advance, and the rearranging operation is performed on the basis of these settings. In this case, it is also possible to adopt a configuration in which the user can change the settings regarding the timing and period for performing the rearranging operation.

Next, another moving mechanism 14A different from the above-mentioned moving mechanism 14 will be described (see FIGS. 48 to 70).

Figure 48:
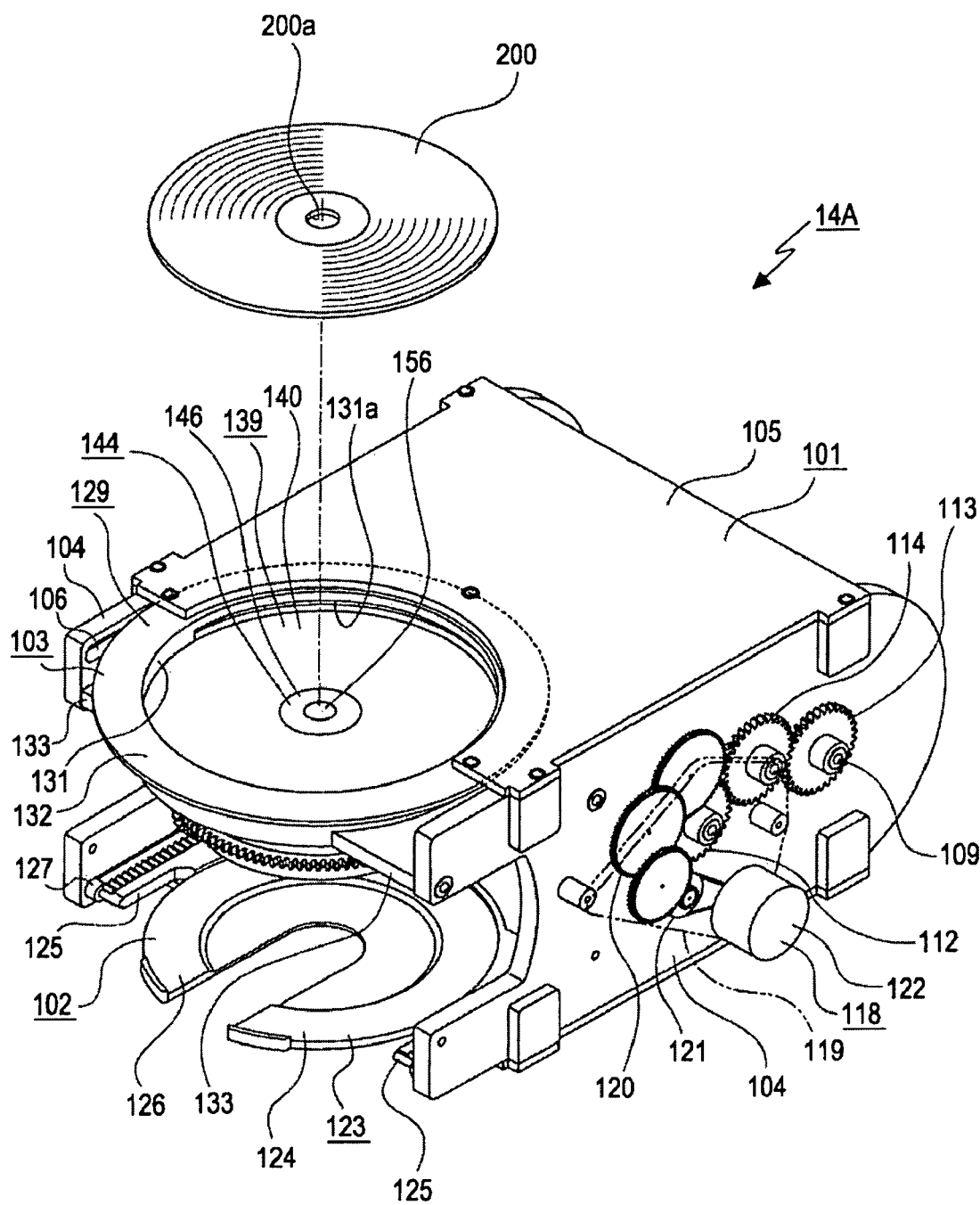
FIG. 48 is a perspective view, illustrating another moving mechanism together with FIGS. 49 to 70.
Figure 49:
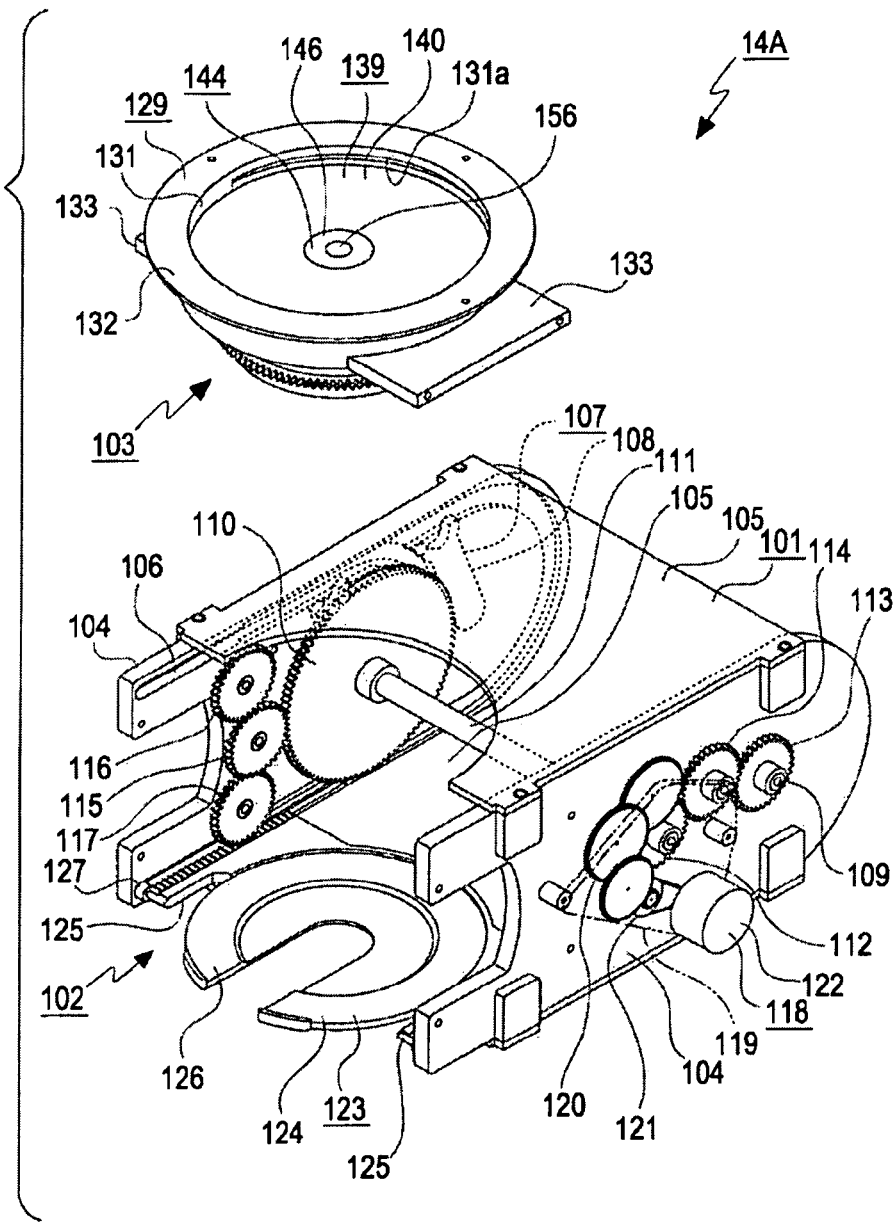
FIG. 49 is a perspective view showing a transport mechanism and a holding mechanism as separated from each other.

The moving mechanism 14A includes a supporting frame 101, a transport mechanism 102, and a holding mechanism 103 (see FIGS. 48 and 49).

The supporting frame 101 includes a pair of side plates 104, 104 and a pair of connecting plates 105, 105 connecting between the side plates 104, 104. The connecting plates 105, 105 are vertically spaced apart. The connecting plates 105, 105 respectively connect between the upper and lower ends of the side plates 104, 104.

Figure 50:
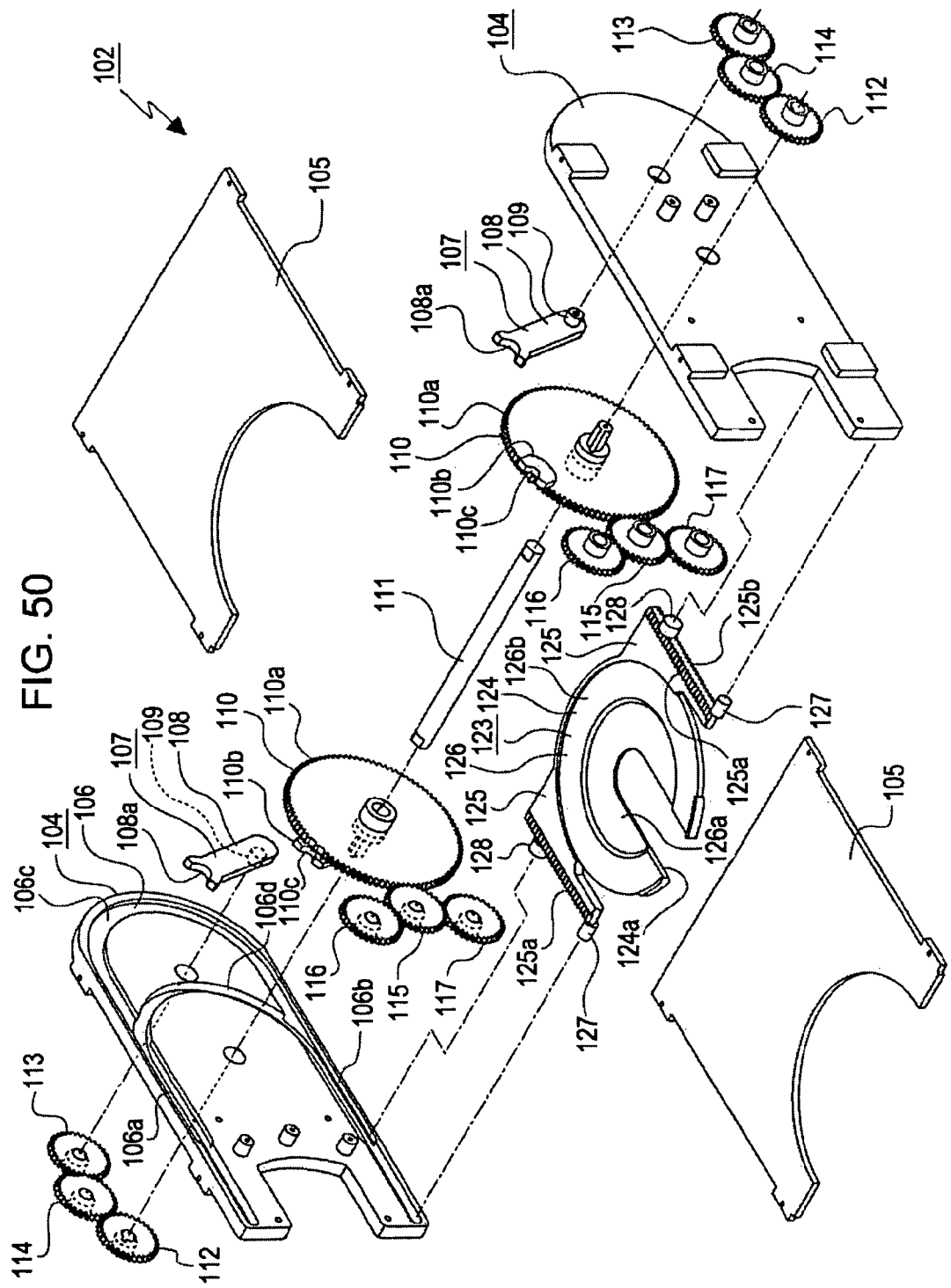
FIG. 50 is an exploded perspective view of the transport mechanism.

Guide grooves 106, 106 are respectively formed in the inner surfaces of the side plates 104, 104 (see FIG. 50). The guide groove 106 includes linear portions 106a, 106b that extend in the front-rear direction and located so as to be vertically spaced apart, a rear-side arcuate portion 106c continuous to the rear end of each of the linear portions 106a, 106b, and a front-side arcuate portion 106d continuous to a portion near the rear end of each of the linear portions 106a, 106b. The rear-side arcuate portion 106c and the front-side arcuate portion 106d are formed at the same curvature.

The side plates 104, 104 respectively have guide arms 107, 107 rotatably supported at positions immediately in rear of the front-side arcuate portions 106d, 106d of the guide grooves 106, 106. The guide arm 107 includes an arm portion 108 located along the inner surface of the side plate 104, and a shaft portion 109 projected from an end portion of the arm portion 108. A holding recess 108a is formed at the other end portion of the arm portion 108. In the guide arm 107, the shaft portion 109 is rotatably supported on the side plate 104, and the distal end portion of the shaft portion 109 is projected outward from the side plate 104. In the guide plate 107, the shaft portion 109 is supported at a position that is the center of the rear-side arcuate portion 106c to serve as a rotation axis, and the holding recess 107a is rotated in accordance with the rear-side arcuate portion 106c.

A synchronizing shaft 111 is connected between gear members 110, 110.

The gear members 110, 110 are rotatably supported on the inner surface sides of the side plates 104, 104. The gear members 110, 110 are supported at positions that are the centers of the front-side arcuate portions 106b, 106b.

The gear member 110 has a flat gear portion 110a, and a guide arm portion 110b and a rotary shaft portion 110c provided on the outer surface of the flat gear portion 110a. One end portion of the guide arm portion 110b is projected radially from the outer circumference of the flat gear portion 110a. The holding recess 110c is formed at one end portion of the guide arm portion 110b. In the gear member 110, the rotary shaft portion 110c is projected outward from the side plate 104, and its outer circumferential portion is located along the front-side arcuate portion 106d.

Interlocking gears 112, 112 are fixed to the respective distal end portions of the holding recesses 110c, 110c of the gear members 110, 110. The interlocking gears 112, 112 are arranged on the outer surface sides of the side plates 104, 104.

Driven gears 113, 113 are respectively fixed to the distal end portions of the shaft portions 109, 109 of the guide arms 107, 107. The driven gears 113, 113 are arranged on the outer surface sides of the side plates 104, 104.

The interlocking gears 112, 112 and the driven gears 113, 113 are respectively meshed with each other via intermediate gears 114, 114.

Middle gears 115, 115 are respectively meshed with the gear members 110, 110. The middle gears 115, 115 are respectively supported at positions near the front end of the inner surfaces of the side plates 104, 104. The middle gears 115, 115 are meshed with upper gears 116, 116 and lower gears 117, 117 respectively located above and below the middle gears 115, 115.

A driving block 118 is attached to the outer surface of one side plate 104. The driving block 118 has a reduction gear group 120, a pulley 121, and a motor 122 that are supported on a support plate 119. The reduction gear group 120 is meshed with one interlocking gear 112.

When the motor 122 is rotated in the driving block 118, the resulting driving force is transmitted to the synchronizing shaft 111 via the reduction gear group 120, the gear member 110, and the interlocking gear 112, causing the synchronizing shaft 111 to rotate integrally with the gear members 110, 110. The other interlocking gear 112 is also rotated due to the rotation of the gear member 110, and the guide arms 107, 107 are rotated synchronously due to rotation of the driven gears 113, 113 following the rotation of the interlocking gears 112, 112. At the same time, the middle gears 115, 115, the upper gears 116, 116, and the lower gears 117, 117 are rotated synchronously in accordance with the rotation of the gear members 110, 110.

A disk transport portion 123 is supported on the side plates 104, 104 so as to be movable in a predetermined direction (see FIGS. 49 and 50). The disk transport portion 123 is integrally formed by a tray portion 124 and rack-forming projections 125, 125 projected to the sides from the tray portion 124.

The tray portion 124 is formed in a substantially disk-like shape, and has an insertion cutout 124a that is forwardly open. The insertion cutout 124a is formed so as to extend from the front end of the tray portion 124 to the center portion thereof.

In the tray portion 124, a recording medium loading portion 126 is formed as a shallow recess. The recording medium loading portion 126 has a small-diameter loading portion 126a located on the center side and a large-diameter loading portion 126b located on the outside of the small-diameter loading portion 126a. The disk-shaped recording medium 200 with a diameter of about 8 cm, for example, is loaded onto the small-diameter loading portion 126a, and the disk-shaped recording medium 200 with a diameter of about 12 cm, for example, is loaded onto the large-diameter loading portion 126b. The small-diameter loading portion 126a is formed slightly deeper than the large-diameter loading portion 126b.

The rack-forming projections 125, 125 are respectively projected to the left and right from the tray portion 124, and have upper rack portions 125a, 125a and lower rack portions 125b, 125b, which extend in the front-rear direction, in upper and lower surfaces at the left and right end portions, respectively. In the rack-forming projection 125, a front-side sliding pin 127 and a rear-side sliding pin 128 that are projected outward are respectively provided at the front and the rear so as to be spaced apart from each other.

The front-side sliding pins 127, 127 and rear-side sliding pins 128, 128 of the disk transport portion 123 are respectively slidably engaged with the guide grooves 106, 106 formed in the side plates 104, 104.

The holding mechanism 103 has respective required components supported on a holding base 129 (see FIGS. 48 and 49).

Figure 51:
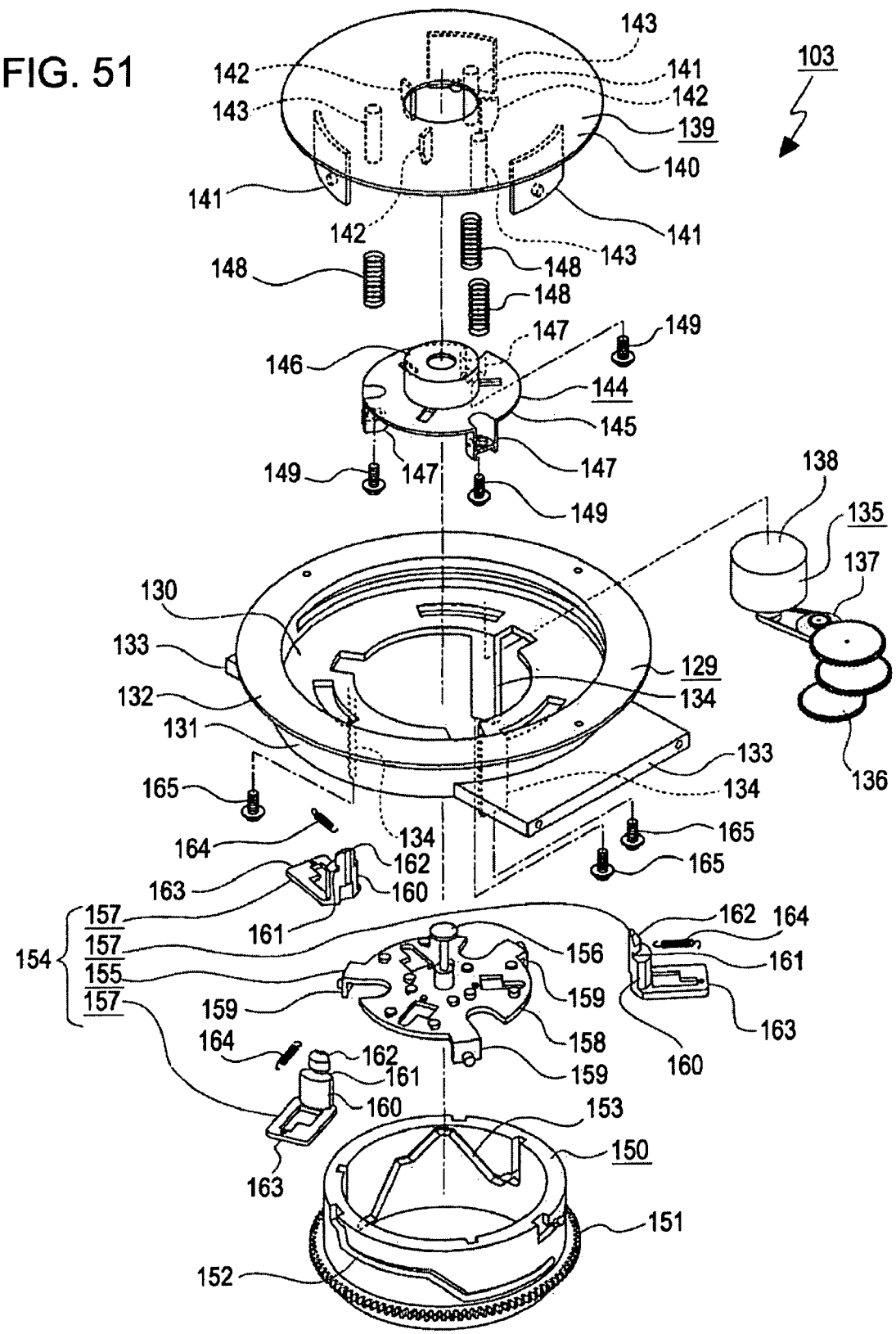
FIG. 51 is an exploded perspective view of the holding mechanism.
Figure 52:
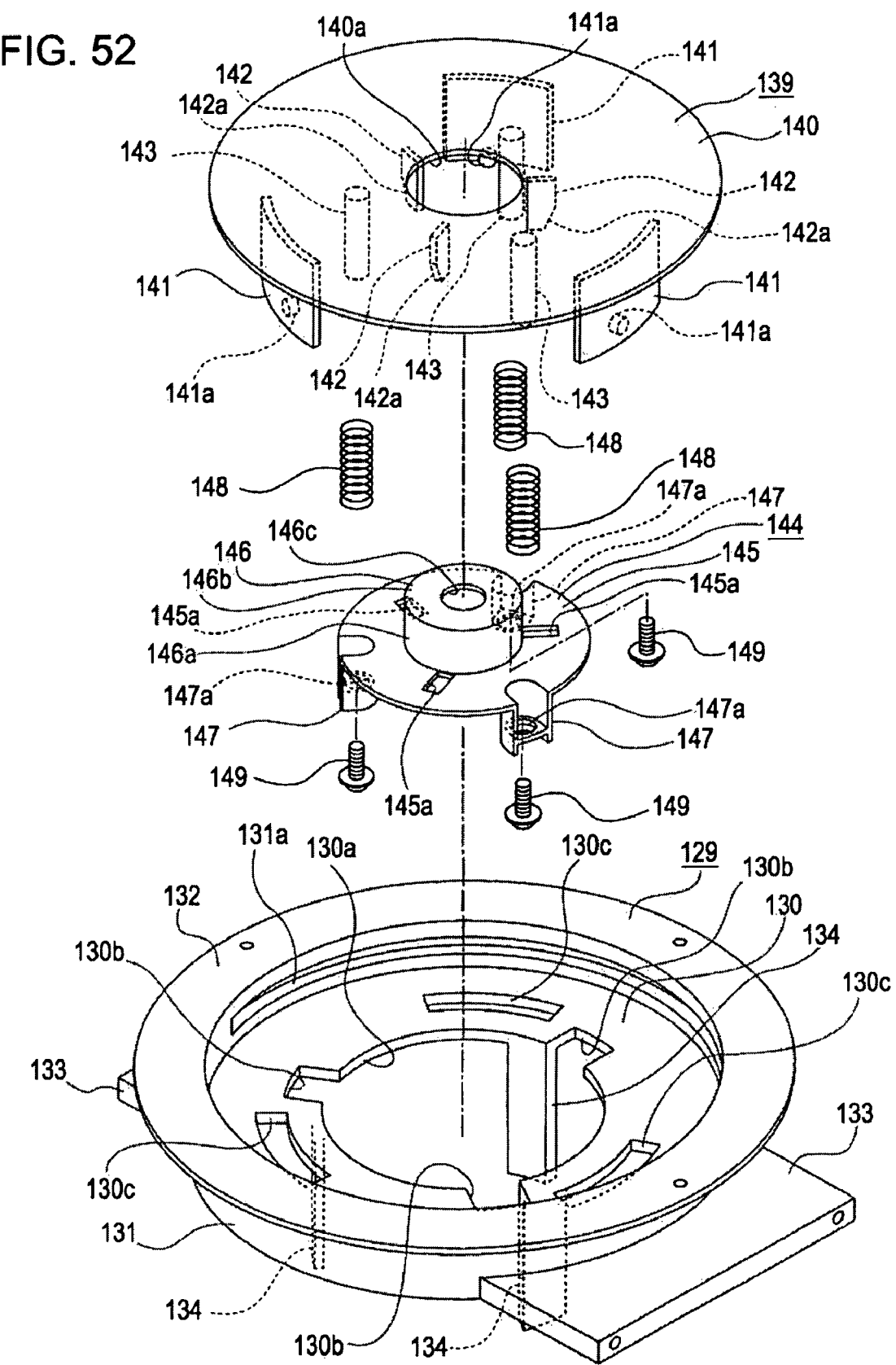
FIG. 52 is an exploded perspective view showing a holding base, an elevating base, and an elevating member in the holding mechanism.
Figure 53:
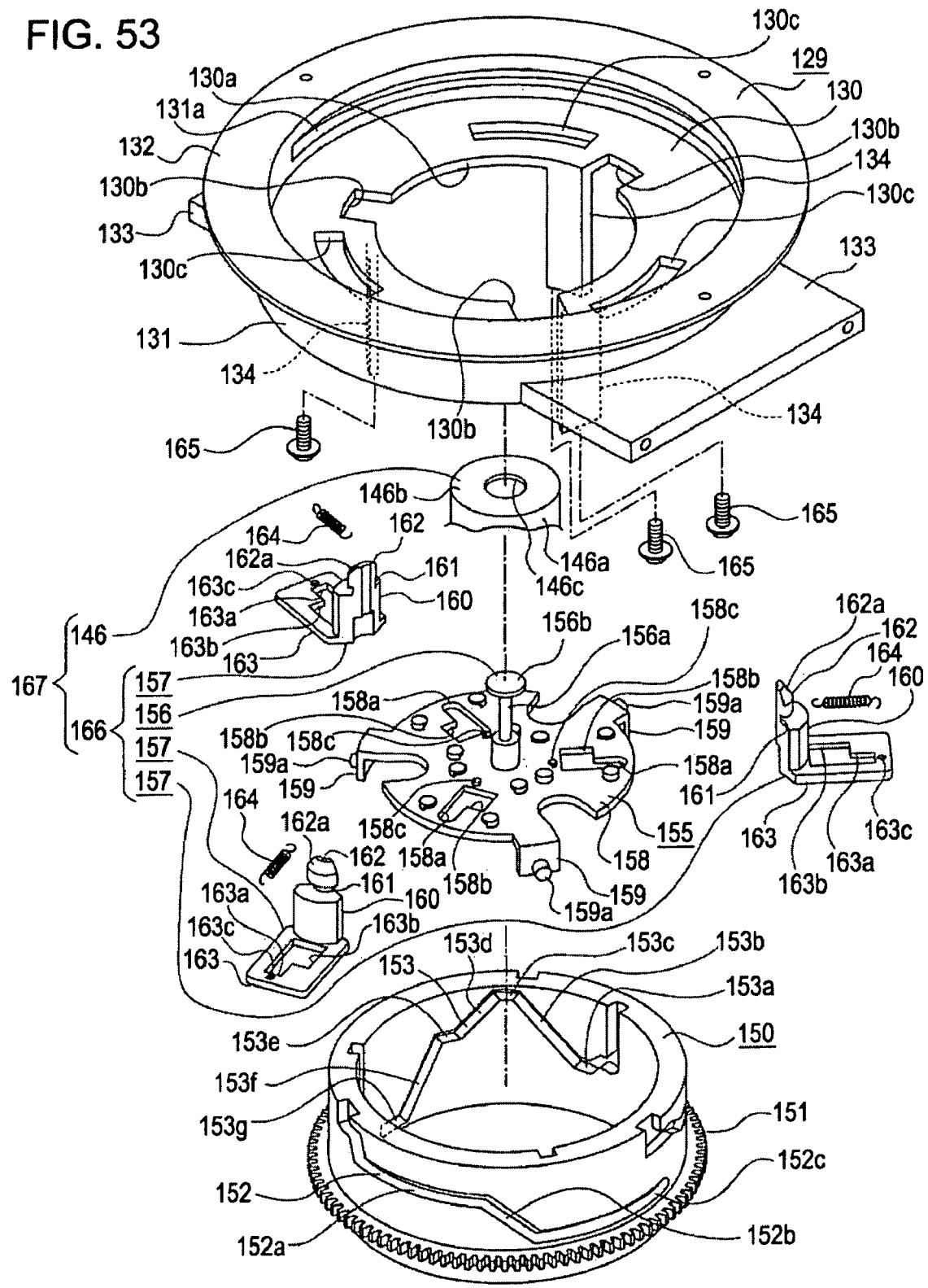
FIG. 53 is an exploded perspective view showing the holding base, a rotating cam, and a holding member in the holding mechanism.

As shown in FIGS. 51 to 53, the holding base 129 includes a bottom plate portion 130 whose outer shape is circular, a circumferential surface portion 131 projected upward from the outer circumferential portion of the bottom plate portion 130, a flange portion 132 jutted outward from the upper end portion of the circumferential surface portion 131, attachment portions 133, 133 that are jutted outward from the lower end portion of the bottom plate portion 130, and holding leg portions 134, 134, 134 projected downward from the bottom plate portion 130.

The attachment portions 133, 133 of the holding base 129 are respectively attached to the upper end portions at the front end portions of the side plates 104, 104 by screw-fastening, for example.

A circular arranging hole 130a is formed at the central portion of the bottom plate portion of the holding base 129. Projection holes 130b, 130b, 130b are formed in the bottom plate portion 130. The projection holes 130b, 130b, 130b are continuous to the outer side of the arranging hole 130a and located so as to be spaced apart at equal circumferential intervals. In the bottom plate portion 130, arcuate projection-inserting holes 130c, 130c, 130c are formed on the outer side of the arranging hole 130a. The projection-inserting holes 130c, 130c, 130c are located so as to be spaced apart at equal circumferential intervals.

An insertion slit 131a is formed in the circumferential surface portion 131 of the holding base 129. The insertion slit 131a is formed in the rear half part of the circumferential surface portion 131 such that its opening height is larger than the thickness of the disk transport portion 123 and its opening width is larger than the lateral width of the disk transport portion 123.

A driving unit 135 is arranged in the attachment portions 133, 133 (see FIG. 51). The driving unit 135 has a power transmission gear group 136, a pulley 137, and an actuation motor 138. In the driving unit 135, the driving force of the actuation motor 138 is transmitted to the power transmission gear group 136 via the pulley 137.

An elevating base 139 is supported on the holding base 129 so as to be vertically movable (see FIGS. 51 and 53). The elevating base 139 is integrally formed by a disk-shaped base portion 140, insertion projections 141, 141, 141 projected downward from positions near the outer circumference of the base portion 140, cam projections 142, 142, 142 projected downward from positions near the center of the base portion 140, and supporting shafts 143, 143, 143 provided between the insertion projections 141, 141, 141 and the cam projections 142, 142, 142.

An insertion hole 140a is formed at the center of the base portion 140. A disk sensor (not shown) for detecting the presence/absence of the disk-shaped recording medium 200 is provided to the base portion 140.

The insertion projections 141, 141, 141 are of an arcuate shape and provided so as to be spaced apart at equal circumferential intervals. The insertion projections 141, 141, 141 have inwardly projected cam engaging pins 141a, 141a, 141a respectively formed at the lower end portions.

The cam projections 142, 142, 142 are provided so as to be spaced apart at equal circumferential intervals, and respectively have inclined cam edges 142a, 142a, 142a at the lower end portions. The inclined cam edges 142a, 142a, 142a are inclined so as to be displaced toward the center of the base portion 140 as they extend downward.

The supporting shafts 143, 143, 143 are provided so as to be spaced apart at equal circumferential intervals.

In the elevating base 139, the insertion projections 141, 141, 141 are respectively inserted into the projection-inserting holes 130c, 130c, 130c of the bottom plate portion 130 from above, the cam projections 142, 142, 142 are inserted into the arranging hole 130a of the bottom plate portion 130 from above, and the supporting shafts 143, 143, 143 are respectively inserted into the projection holes 130b, 130b, 130b of the bottom plate portion 130 from above. The elevating base 139 is thus supported on the holding base 129 so as to be vertically movable.

An elevating member 144 is supported on the elevating base 139 so as to be vertically movable. The elevating member 144 is integrally formed by a base 145 formed in an annular shape, a disk-placing portion 146 projected upward from the inner circumferential edge of the base 145, and support projections 147, 147, 147 provided so as to project downward from the outer circumferential portion of the base 145.

Insertion holes 145a, 145a, 145a are formed in the base 145 so as to be spaced apart at equal circumferential intervals.

The disk-placing portion 146 includes a cylindrical tube portion 146a erected from the base 145, and a placing surface portion 146b that closes the top opening of the tube portion 146a. The disk-placing portion 146 has a shaft-portion insertion hole 146c formed at the center of the placing surface portion 146b.

Support holes 147a, 147a, 147a are respectively formed in the support projections 147, 147, 147 so as to vertically extend through the support projections 147, 147, 147.

The elevating member 144 is supported on the elevating base 139 so as to be vertically movable, with the supporting shafts 143, 143, 143 respectively inserted in the support holes 147a, 147a, 147a. In the state with the elevating member 144 supported on the elevating base 139, the cam projections 142, 142, 142 are respectively inserted into the insertion holes 145a, 145a, 145a of the base 145 from above, compression coil springs 148, 148, 148 are respectively supported on the supporting shafts 143, 143, 143, and the disk-placing portion 146 is inserted through the insertion hole 140a of the base portion 140 from below. Drop-prevention members 149, 149, 149 are respectively attached to the lower surfaces of the supporting shafts 143, 143, 143 to prevent dropping of the elevating member 144 from the elevating base 139.

The elevating member 144 is urged downward by the compression coil springs 148, 148, 148. At the lower movable end of the elevating member 144, the upper surface of the disk-placing portion 146 and the upper surface of the base portion 140 of the elevating base 139 are located flush with each other, and as the elevating member 144 is raised relative to the elevating base 139, the disk-placing portion 146 is projected upward from the insertion hole 140a.

The holding mechanism 103 has a rotating cam 150 (see FIGS. 51 and 53).

The rotating cam 150 is formed in a substantially cylindrical shape, and has a gear 151 at a position near the lower end of its outer circumferential surface. The gear 151 is provided along the entire outer circumferential surface of the rotating cam 150. Outer cam grooves 152, 152, 152 are formed in the outer circumferential surface of the rotating cam 150 above the gear 151 so as to be spaced apart at equal circumferential intervals. The outer cam groove 152 has an upper horizontal portion 152a, an inclined portion 152b, and a lower horizontal portion 152c that are formed continuously in the stated order. The upper horizontal portion 152a and the lower horizontal portion 152c extend horizontally, and the inclined portion 152b is inclined so as to be displaced downward with increasing distance from the upper horizontal portion 152a.

Inner cam grooves 153, 153, 153 are formed in the inner circumferential surface of the rotating cam 150 so as to be spaced apart at equal circumferential intervals. The inner cam groove 153 has a first horizontal portion 153a, a first inclined portion 153b, a second horizontal portion 153c, a second inclined portion 153d, a third horizontal portion 153e, a third inclined portion 153f, and a fourth horizontal portion 153g that are continuously formed in the stated order. The inner cam groove 153 is formed such that the second horizontal portion 153c is located uppermost, the fourth horizontal portion 153g is located lowermost, the first horizontal portion 153a and the third horizontal portion 153e are located between the second horizontal portion 153c and the fourth horizontal portion 153g with respect to the vertical direction, and the first horizontal portion 153a is located lower than the third horizontal portion 153e. The first inclined portion 153b is inclined so as to be displaced upward with increasing distance from the first horizontal portion 153a, the second inclined portion 153b is inclined so as to be displaced downward with increasing distance from the second horizontal portion 153b, and the third inclined portion 153f is inclined so as to be displaced downward with increasing distance from the third horizontal portion 153e.

The rotating cam 150 is rotatably supported on the holding base 129 so as to cover the holding leg portions 134, 134, 134 from the outside. In the state with the rotating cam 150 supported on the holding base 129, the cam engaging pins 141a, 141a, 141a of the elevating base 139 are respectively slidably engaged with the outer cam grooves 152, 152, 152.

A holding member 154 is supported on the rotating cam 150. The holding member 154 has a cam base 155, a center shaft 156, and positioning members 157, 157, 157.

The cam base 155 has a vertically directed base surface portion 158 formed in a substantially disk-like shape, and projecting piece portions 159, 159, 159 projected downward from the outer circumferential edge of the base surface portion 158. The projecting piece portions 159, 159, 159 are provided so as to be spaced apart at equal circumferential intervals. Spring-arranging holes 158a, 158a, 158a are formed in the base surface portion 158 so as to be spaced apart at equal circumferential intervals. In the base surface portion 158, cam insertion holes 158b, 158b, 158b are respectively formed continuous to the spring-arranging holes 158a, 158a, 158a. In the base surface portion 158, spring-hooking projections 158c, 158c, 158c are respectively provided at positions on the inner side of the spring-arranging holes 158a, 158a, 158a. Outwardly projected cam pins 159a, 159a, 159a are respectively provided at the lower end portions of the projecting piece portions 159, 159, 159.

The center shaft 156 includes a shaft portion 156a and a head portion 156b provided at the upper end of the shaft portion 156a. The head portion 156b is formed in a disk shape. The center shaft 156 is attached to the center portion of the base surface portion 158 of the cam base 155 so as to project upward.

The positioning members 157, 157, 157 are arranged at equal intervals on the outer side of the center shaft 156, and are supported on the cam base 155 so as to be movable in the radial direction of the base surface portion 158.

The positioning member 157 is integrally formed by an arcuate large-diameter portion 160, an arcuate small-diameter portion 161 projected upward from the inner circumferential portion of the large-diameter portion 160, an arcuate positioning portion 162 projected upward from the small-diameter portion 161, and a support plate portion 163 projected to the side from the lower end portion of the large-diameter portion 160. The positioning member 157 is formed such that the positioning portion 162 has an outer diameter that is intermediate between the outer diameters of the large-diameter portion 160 and small-diameter portion 161.

An inclined surface 162a that is displaced inward as it extends upward is formed at the upper end portion of the positioning member 162.

A spring-arranging hole 163a is formed in the support plate portion 163. A cam insertion hole 163b is formed in the support plate portion 163 so as to be continuous to the spring-arranging hole 163a. In the support plate portion 163, a spring-hooking hole 163c is formed on the outer side of the spring-arranging hole 163a.

In the state with the positioning members 157, 157, 157 supported on the cam base 155, the spring-arranging holes 163a, 163a, 163a of the positioning members 157, 157, 157 and the spring-arranging holes 158a, 158a, 158a of the cam base 155 are located at vertically corresponding positions, and the cam insertion holes 163b, 163b, 163b of the positioning members 157, 157, 157 and the cam insertion holes 158b, 158b, 158b of the cam base 155 are located at vertically corresponding positions.

In the state with the positioning members 157, 157, 157 supported on the cam base 155, tension coil springs 164, 164, 164 are respectively supported between the spring-hooking holes 163c, 163c, 163c of the support plate portions 163, 163, 163 and the spring-hooking projections 158c, 158c, 158c of the cam base 155, and the tension coil springs 164, 164, 164 are respectively arranged in the spring-arranging holes 163a, 163a, 163a, 158a, 158a, 158a. The positioning members 157, 157, 157 are thus urged by the tension oil springs 164, 164, 164 in a direction toward the center shaft 156.

At their closest to the center shaft 156, the positioning members 157, 157, 157 are in contact with each other, and the three large-diameter portions 160, 160, 160, small-diameter portions 161, 161, 161, and positioning portions 162, 162, 162 are respectively formed in a cylindrical shape.

As the cam pins 159a, 159a, 159a are slidably engaged with the inner cam grooves 153, 153, 153, the holding member 154 is supported onto the rotating cam 150 so as to be vertically movable. In the state with the holding member 154 supported on the rotating cam 150, the cam insertion holes 163b, 163b, 163b, 158b, 158b, 158b are located at positions vertically corresponding to the cam projections 142, 142, 142 of the elevating base 139.

In the state with the holding member 154 supported on the rotating cam 150, drop-prevention screws 165, 165, 165 are respectively attached to the lower ends of the holding leg portions 134, 134, 134 of the holding base 129, thereby preventing dropping of the rotating cam 150 from the holding base 129.

The above-mentioned center shaft 156 and the positioning portions 162, 162, 162 of the positioning members 157, 157, 157 constitute a holding shaft portion 166 for holding the disk-shaped recording medium 200. Further, the holding shaft portion 166 and the disk-placing portion 146 of the elevating member 144 constitute a disk holding portion 167 that holds the disk-shaped recording medium 200.

Description will now be given of operation of the moving mechanism 14A (see FIGS. 54 to 70).

First, description will be given of the initial states of respective components before mounting the disk-shaped recording medium 200.

Figure 54:
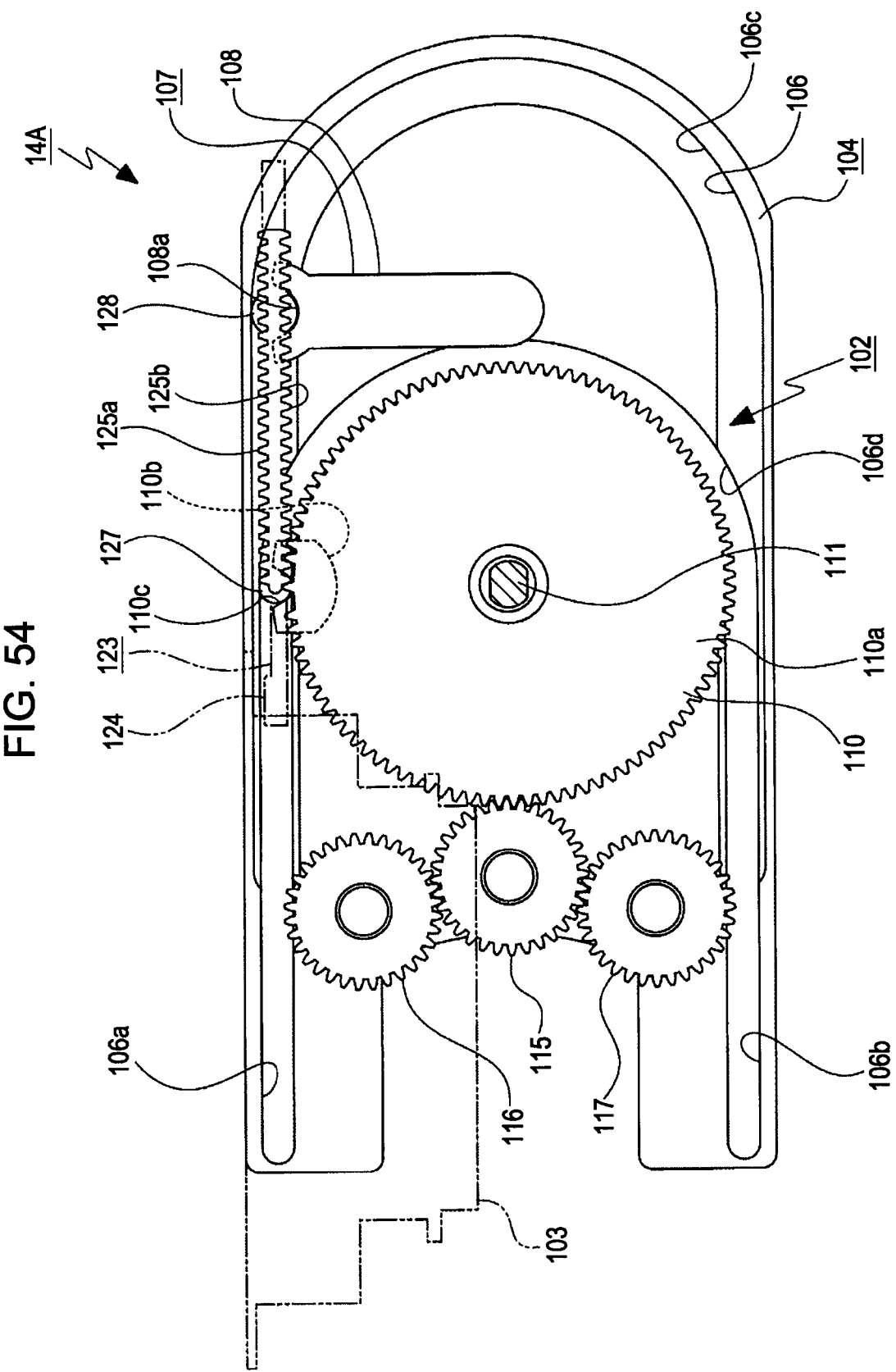
FIG. 54 is a sectional view showing an initial state, illustrating the operation of another moving mechanism together with FIGS. 55 to 70.

The guide arms 107, 107 supported on the side plates 104, 104 are held with their respective arm portions 108, 108 extending substantially vertically (see FIG. 54). At this time, the rear-side sliding pins 128, 128 of the disk transport portion 123 are respectively held in the holding recesses 108a, 108a of the guide arms 107, 107.

The guide arm portions 110b, 110b of the gear members 110, 110 are respectively held in a state in which they extend substantially vertically. At this time, the front-side sliding pins 127, 127 of the disk transport portion 123 are respectively held in the holding recesses 110c, 110c of the guide arm portions 110b, 110b.

The disk transport portion 123 is held in a horizontal state immediately in rear of the transport mechanism 102. This position of the disk transport portion 123 is set as a standby position. The lower rack portions 125b, 125b of the disk transport portion 123 are respectively meshed with the flat gear portions 110a, 110a of the gear members 110, 110 supported on the side plates 104, 104.

Figure 55:
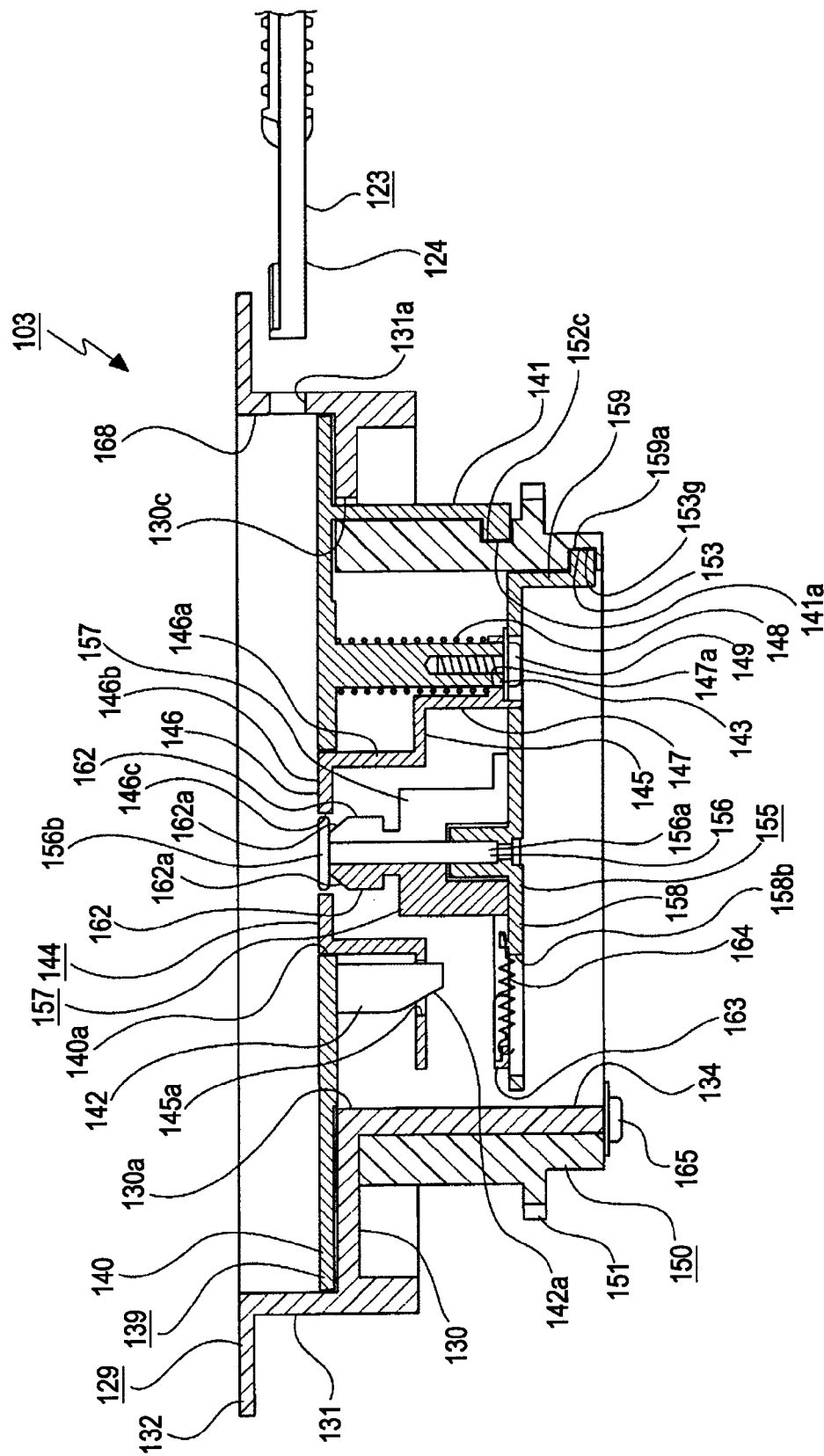
FIG. 55 is an enlarged sectional view showing the initial state of the holding mechanism.

The elevating base 139 is located at the lower movable end, and as shown in FIG. 55, the cam engaging pins 141a, 141a, 141a of the insertion projections 141, 141, 141 are respectively engaged with the lower horizontal portions 152c, 152c, 152c in the outer cam grooves 152, 152, 152 of the rotating cam 150. At this time, an upwardly open disk insertion recess 168 is formed by the base portion 140 of the elevating base 139 and the circumferential surface portion 131 of the holding base 129. The disk insertion recess 168 is opened and closed by a shutter (not shown) located above the disk insertion recess 168.

The elevating member 144 is urged by the compression coil springs 148, 148, 148 to be held at the lower movable end, and the upper surface of the disk-placing surface 146 and the upper surface of the base portion 140 of the elevating base 139 are located flush with each other.

The holding member 154 is held at the lower movable end, and the cam pins 159a, 159a, 159a of the cam base 155 are respectively engaged with the fourth horizontal portions 153g, 153g, 153g in the inner cam grooves 153, 153, 153 of the rotating cam 150. At this time, the support plate portions 163, 163, 163 of the positioning members 157, 157, 157 are respectively located below the cam projections 142, 142, 142 of the elevating base 139. The upper surface of the head portion 156b of the center shaft 156 is located flush with the upper surface of the disk-placing portion 146 and the upper surface of the base portion 140 of the elevating base 139.

The support plate portions 163, 163, 163 of the holding member 154 are located at a spacing below the base 145 of the elevating member 144.

In the initial state mentioned above, the user can open the shutter and loads the disk-shaped recording medium 200 into the disk insertion recess 168.

In the initial state, the operation of the moving mechanism 14A is started, and the driving force of the actuation motor 138 of the driving unit 135 causes the rotating cam 150 to rotate in one direction.

Figure 56:
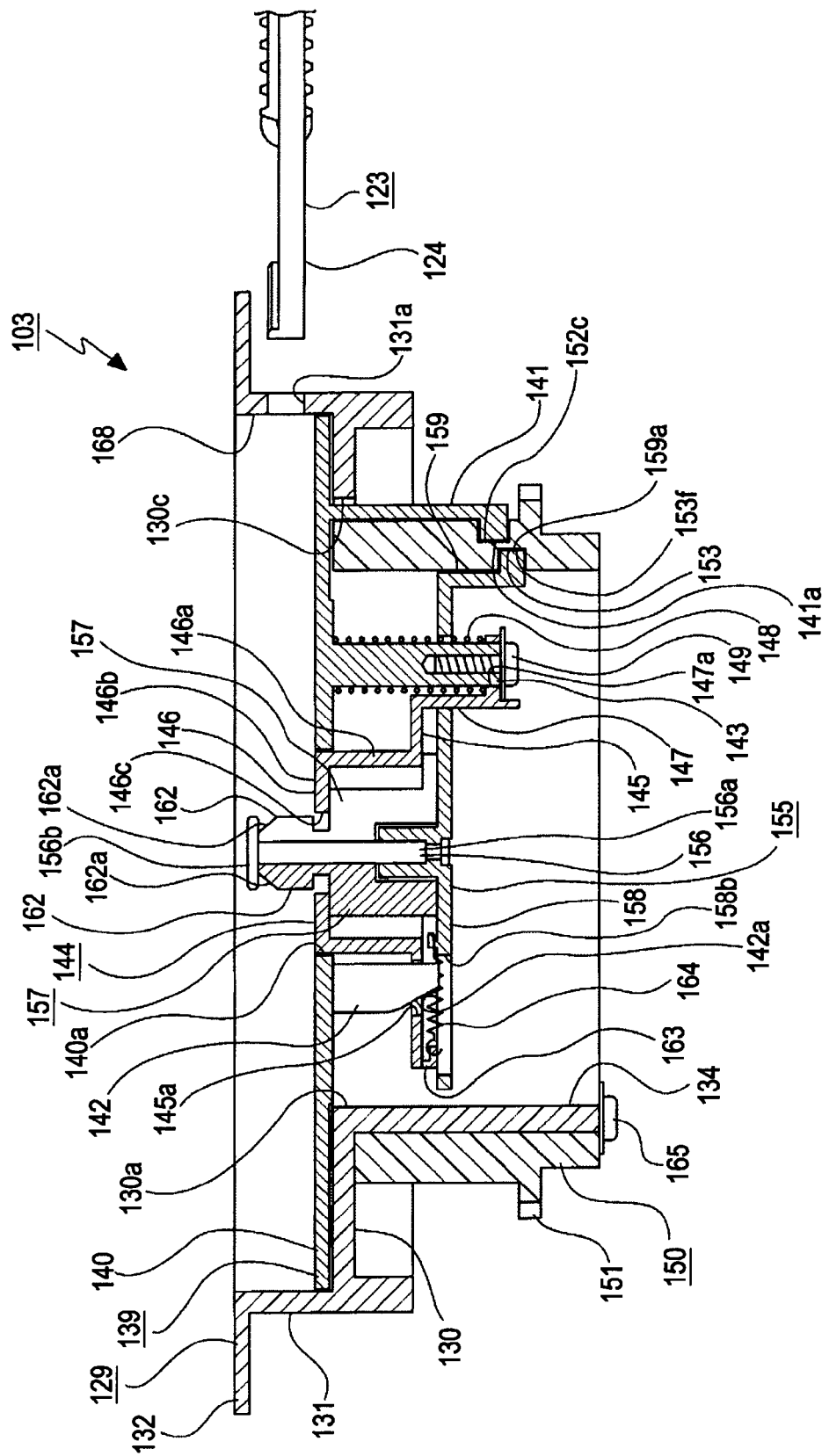
FIG. 56 is an enlarged sectional view showing a state with a center shaft projected upward from the elevating base.

When the rotating cam 150 is rotated, as shown in FIG. 56, in the elevating base 139, the cam engaging pins 141a, 141a, 141a of the insertion projections 141, 141, 141 are respectively moved relatively in the lower horizontal portions 152c, 152c, 152c in the outer cam grooves 152, 152, 152 of the rotating cam 150. The elevating base 139 is thus not moved vertically.

Due to the rotation of the rotating cam 150, in the holding member 154, the cam pins 159a, 159a, 159a of the cam base 155 are moved relative to the rotating cam 150 so as to be brought into engagement with the third inclined portions 153f, 153f, 153f from the fourth horizontal portions 153g, 153g, 153g in the inner cam grooves 153, 153, 153 of the rotating cam 150. The holding member 154 is thus raised, so the center shaft 156 and the positioning portions 162, 162, 162 are projected upward with respect to the disk-placing portion 146 of the elevating member 144. If the disk-shaped recording medium 200 has been loaded into the disk insertion recess 168 at this time, the upper end portion of the center shaft 156 and the positioning portions 162, 162, 162 are inserted into the center hole 200a of the disk-shaped recording medium 200 from below.

At the time when the holding member 154 is raised to a predetermined position due to rotation of the rotating cam 150, the base surface portion 158 of the holding member 154 is brought into contact with the base 145 of the elevating member 144 from below.

Figure 57:
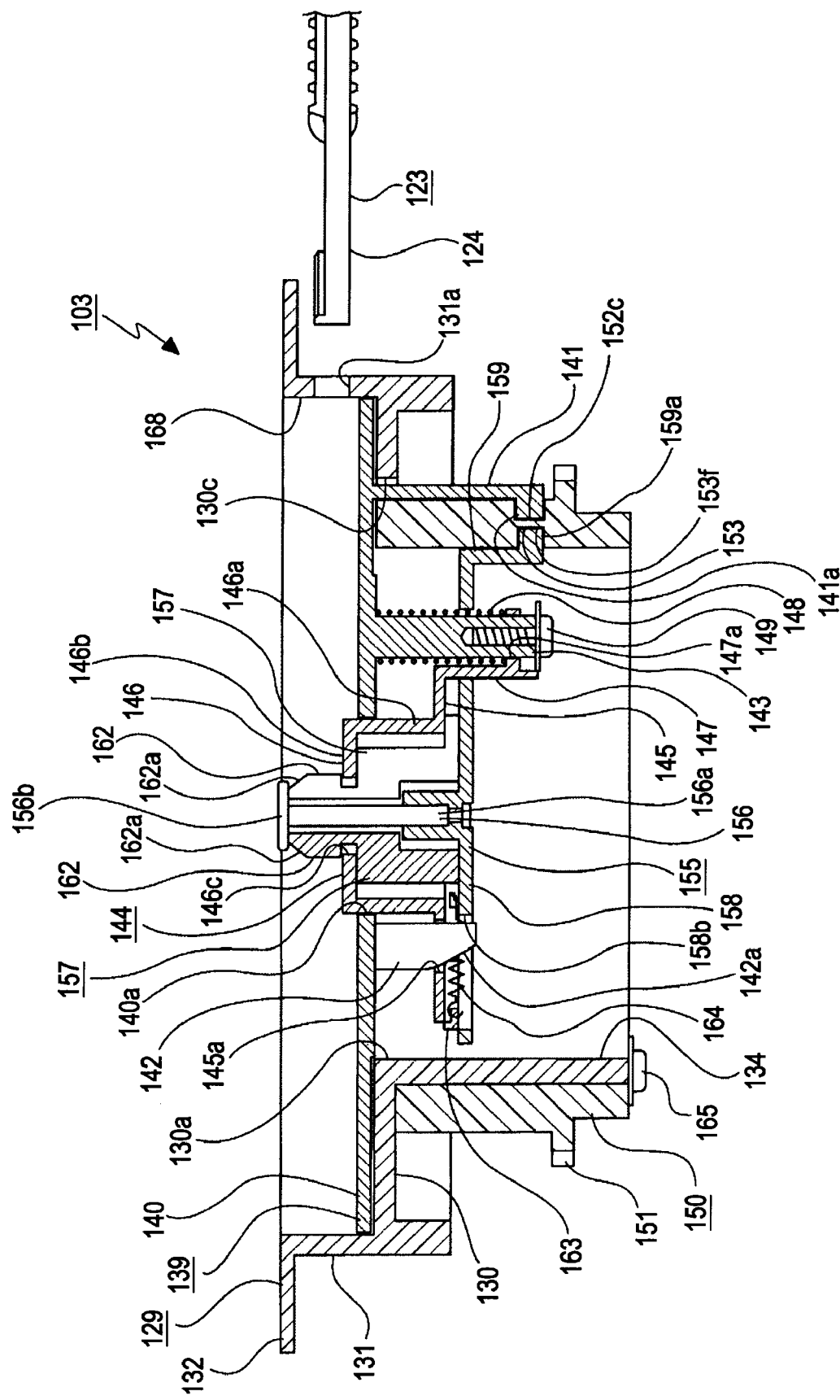
FIG. 57 is an enlarged sectional view showing a state with a cam base being raised integrally with the elevating member.
Figure 58:
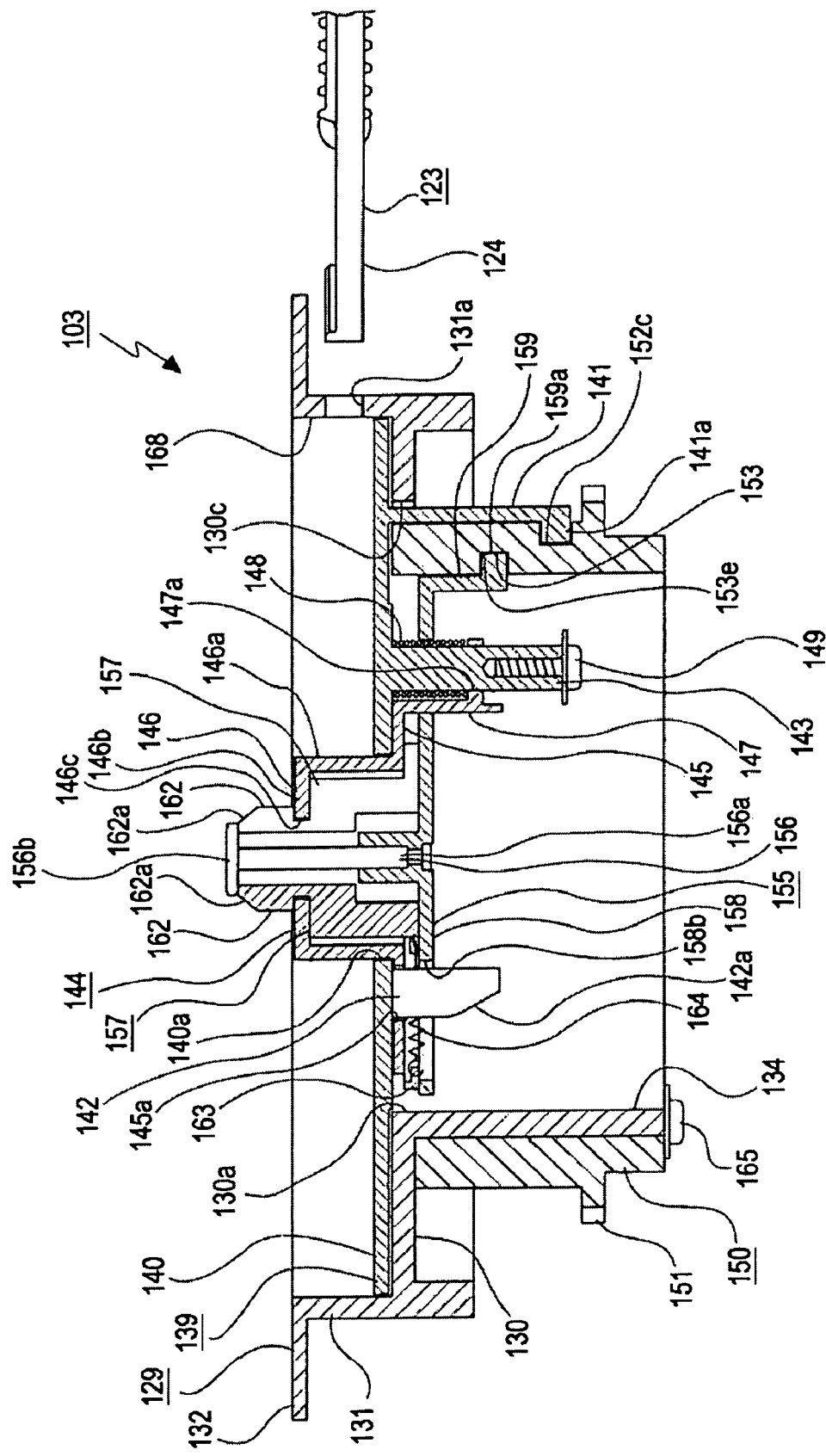
FIG. 58 is an enlarged sectional view showing a state with a positioning member moved so as to open outward.

When the rotating cam 150 is continued to be rotated, as shown in FIG. 57, the cam pins 159a, 159a, 159a of the cam base 155 are moved to the third inclined portions 153f, 153f, 153f of the inner cam grooves 153, 153, 153, and the holding member 154 is raised further. The holding member 154 is raised against the urging force of the compression coil springs 148, 148, 148 while pressing the elevating member 144 from below, so the holding member 154 and the elevating member 144 are raised integrally. The disk-placing portion 146 of the elevating member 144 is thus projected upward with respect to the base portion 140 of the elevating base 139. If the disk-shaped recording medium 200 has been loaded into the disk insertion recess 168 at this time, the inner circumferential portion of the disk-shaped recording medium 200 is pressed by the disk-placing portion 146 from below so that the disk-shaped recording medium 200 is lifted.

At the same time, the cam projections 142, 142, 142 of the elevating base 139 are respectively inserted into the cam insertion holes 158b, 158b, 158b, 163b, 163b, 163b of the holding member 154 from above, so the inclined cam edges 142a, 142a, 142a are brought into sliding contact with the opening edges of the cam insertion holes 158b, 158b, 158b in the positioning members 157, 157, 157. The positioning members 157, 157, 157 are thus moved in a direction away from the center shaft 156 against the urging force of the tension coil springs 164, 164, 164, and the positioning portions 162, 162, 162 are moved on the upper side of the disk-placing portion 146 so as to open outward with reference to the center shaft 156 (see FIG. 58). If the disk-shaped recording medium 200 has been loaded into the disk insertion recess 168 at this time, the positioning portions 162, 162, 162 are moved in the center hole 200a of the disk-shaped recording medium 200, and positioning is effected on the disk-shaped recording medium 200 by the positioning members 162, 162, 162.

Due to rotation of the rotating cam 150, the cam pins 159a, 159a, 159a of the holding member 154 are moved relatively to the third horizontal portions 153e, 153e, 153e in the inner cam grooves 153, 153, 153.

When the rotating cam 150 is further rotated, the cam engaging pins 141a, 141a, 141a of the elevating base 139 are respectively moved relatively from the lower horizontal portions 152c, 152c, 152c to the inclined portions 152b, 152b, 152b in the outer cam grooves 152, 152, 152. The elevating base 139 is thus moved upward.

At the same time, due to rotation of the rotating cam 150, the cam pins 159a, 159a, 159a of the holding member 154 are brought into engagement with the second inclined portions 153d, 153d, 153d from the third horizontal portions 153e, 153e, 153e in the inner cam grooves 153, 153, 153. The holding member 154 is thus moved upward simultaneously with the elevating base 139.

Figure 59:
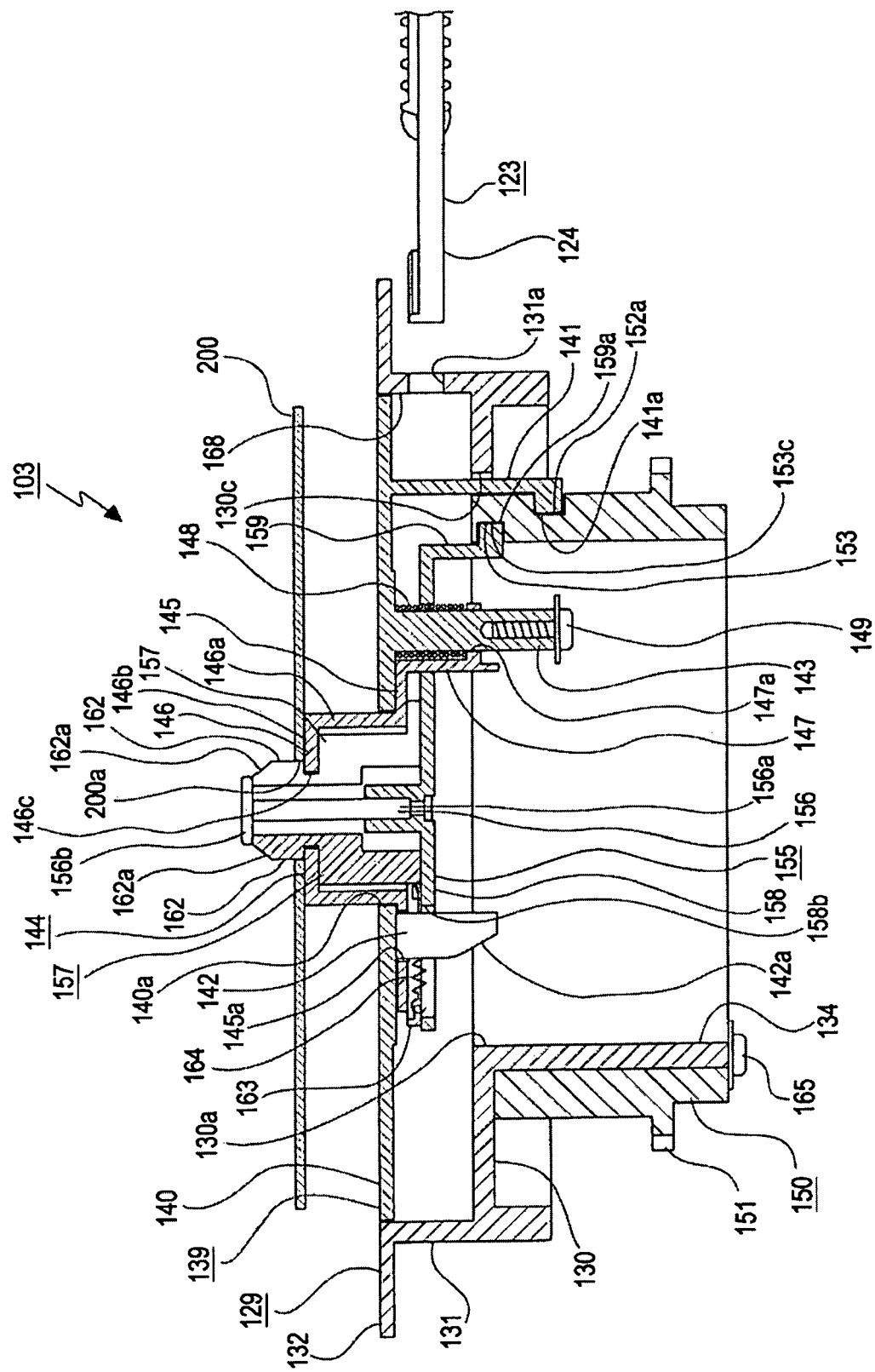
FIG. 59 is an enlarged sectional view showing a state with the holding member moved to an upper movable end.

As shown in FIG. 59, the rotating cam 150 is stopped at the time when, after the cam engaging pins 141a, 141a, 141a of the elevating base 139 are respectively engaged with the upper horizontal portions 152a, 152a, 152a in the outer cam grooves 152, 152, 152, the cam pins 159a, 159a, 159a of the holding member 154 are engaged with the second horizontal portions 153c, 153c, 153c in the inner cam groves 153, 153, 153. At this time, the elevating base 139, the elevating member 144, and the holding member 154 are all located at their upper movable ends.

At the upper movable end of the elevating base 139 as well, the user can mount the disk-shaped recording medium 200 onto the disk-placing portion 146. This position of the disk-placing portion is set as a mounting position.

Since the positioning members 157, 157, 157 have the inclined surfaces 162a, 162a, 162a formed in the positioning portions 162, 162, 162, when the disk-shaped recording medium 200 is mounted onto the disk-placing portion 146 by the user, the inner circumferential edge of the disk-shaped recording medium 200 is brought into sliding contact with the inclined surfaces 162a, 162a, 162a, allowing for easy and reliable mounting and positioning of the disk-shaped recording medium 200 with respect to the disk-placing surface 146.

When the disk-shaped recording medium 200 is mounted on the disk-placing portion 146, the presence/absence of the disk-shaped recording medium 200 is detected by the disk sensor provided to the base portion 140 of the elevating base 139.

Figure 60:
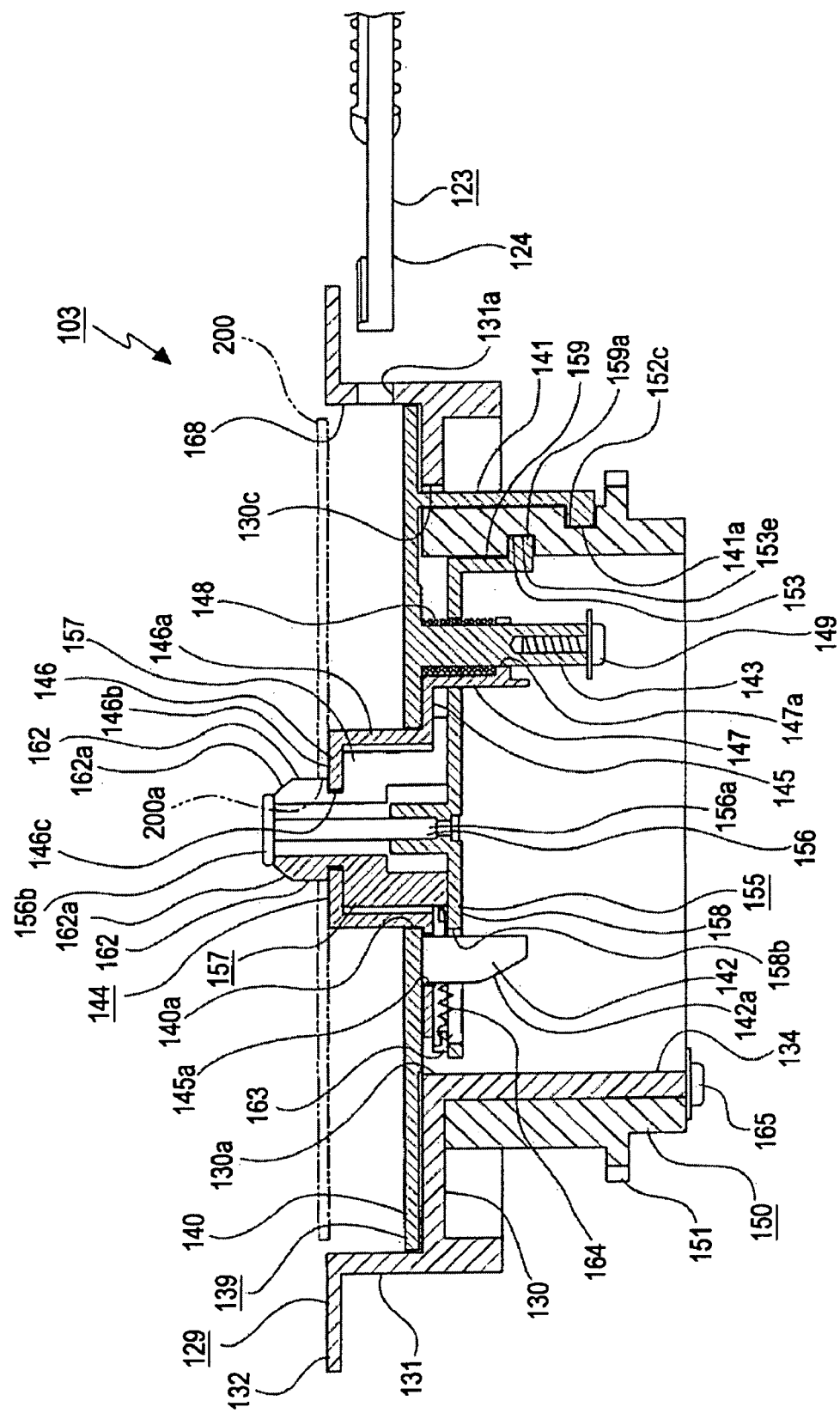
FIG. 60 is an enlarged sectional view showing a state with the elevating base moved to a lower movable end.

When the presence/absence of the disk-shaped recording medium 200 is detected, the rotating cam 150 is rotated in a direction opposite to the direction mentioned above, the elevating base 139, the elevating member 144, and the holding member 154 are lowered by an operation reverse to the above-mentioned operation, and the rotation of the rotating cam 154 is temporarily stopped when the elevating base 139 has been moved to the lower movable end (see FIG. 60). At this time, the cam engaging pins 141a, 141a, 141a of the elevating base 139 are respectively moved relatively from the upper horizontal portions 152a, 152a, 152a to the lower horizontal portions 152c, 152c, 152c in the outer cam grooves 152, 152, 152, and the cam pins 159a, 159a, 159a of the holding member 154 are moved relatively from the second horizontal portions 153c, 153c, 153c to the third horizontal portions 153e, 153e, 153e in the inner cam grooves 153, 153, 153. The disk-placing portion 146 of the elevating member 144 is thus projected upward from the base portion 140 of the elevating base 139 located at the lower movable end, and the positioning portions 162, 162, 162 of the holding member 154 are projected upward from the disk-placing portion 146.

Subsequently, the transport mechanism 102 is operated, and respecting components supported on the side plates 104, 104, such as the synchronizing shaft 111 and the gear members 110, 110, are rotated simultaneously by the driving force of the motor 122 of the driving block 118.

Figure 61:
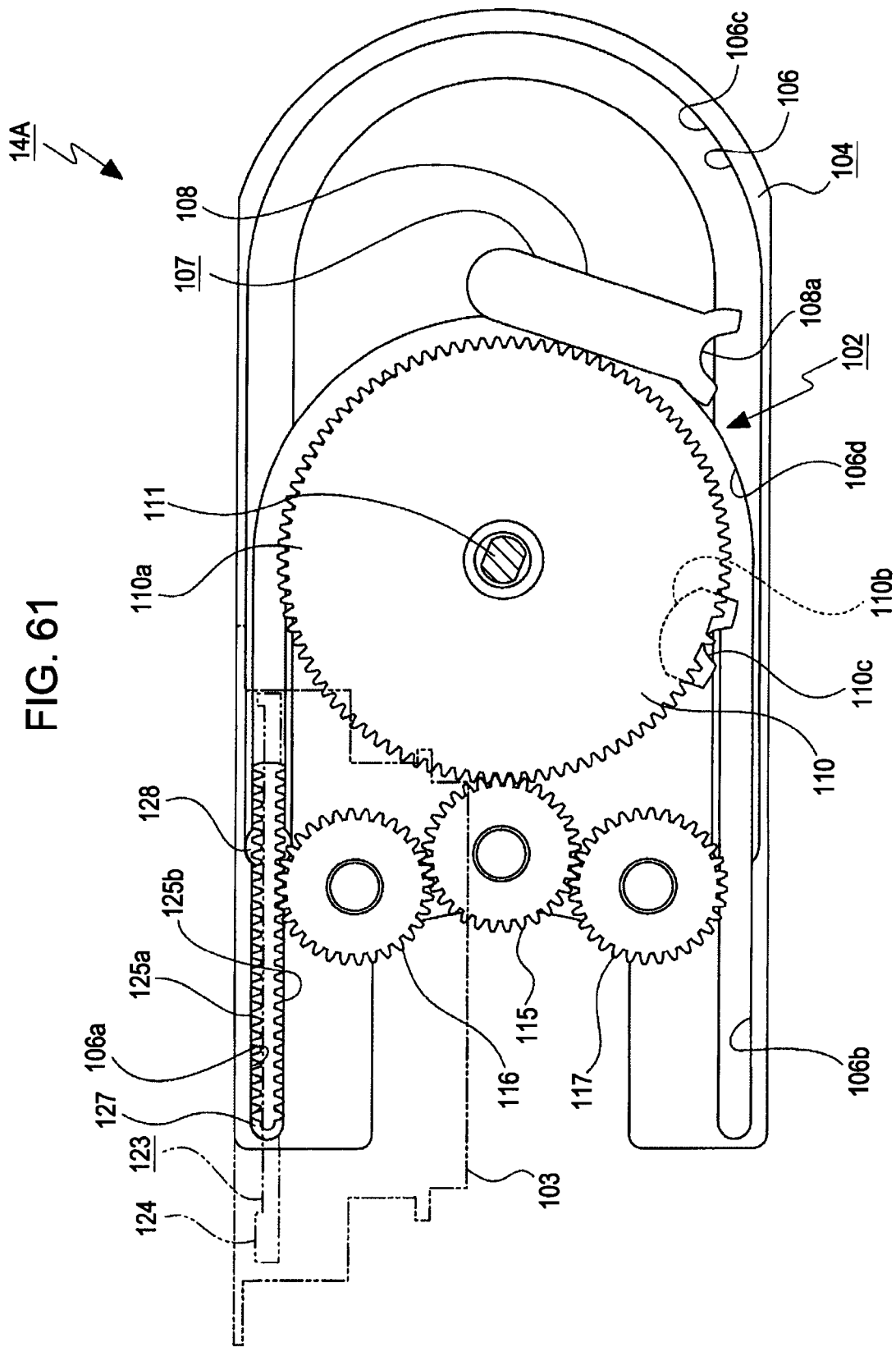
FIG. 61 is a sectional view showing a state with a disk transport portion being moved forward.

The gear members 110, 110 supported on the side plates 104, 104 are rotated by the driving force of the motor 122, and the lower rack portions 125b, 125b respectively meshed with the flat gear portions 110a, 110a of the gear members 110, 110 are driven so that the disk transport portion 123 is moved forward through the insertion slit 131 of the holding base 129 (see FIG. 61). The lower rack portions 125b, 125b are further brought into meshing engagement with the upper gears 116, 116 continuously from the flat gears 110a, 110a, and the lower rack portions 125b, 125b are driven by the upper gears 116, 116, so the disk transport portion 123 is moved further forward.

The disk transport portion 123 is moved above the base portion 140 of the elevating base 139 to the disk insertion recess 168. At this time, the disk-placing portion 146 of the elevating member 144 is relatively inserted into the insertion cutout 124a of the disk transport portion 123.

Subsequently, the rotating cam 150 that has been temporarily stopped is rotated again, and the elevating member 144 and the holding member 154 are moved to their lower movable ends (see FIG. 62). The lower movable end of the holding member 154 is set as a transport-enabled state. The cam pins 159a, 159a, 159a of the holding member 154 are relatively moved from the second horizontal portions 153c, 153c, 153c to the fourth horizontal portions 153g, 153g, 153g in the inner cam grooves 153, 153, 153. In the holding member 154, since the engagement between the cam projections 142, 142, 142 of the elevating base 139 and the positioning members 157 is released, the positioning members 157, 157, 157 are moved in a direction toward the center shaft 156 by the urging force of the tension coil springs 164, 164, 164. At this time, the cam engaging pins 141a, 141a, 141a of the elevating base 139 are respectively moved relatively in the lower horizontal portions 152c, 152c, 152c in the outer cam grooves 152, 152, 152.

Figure 62:
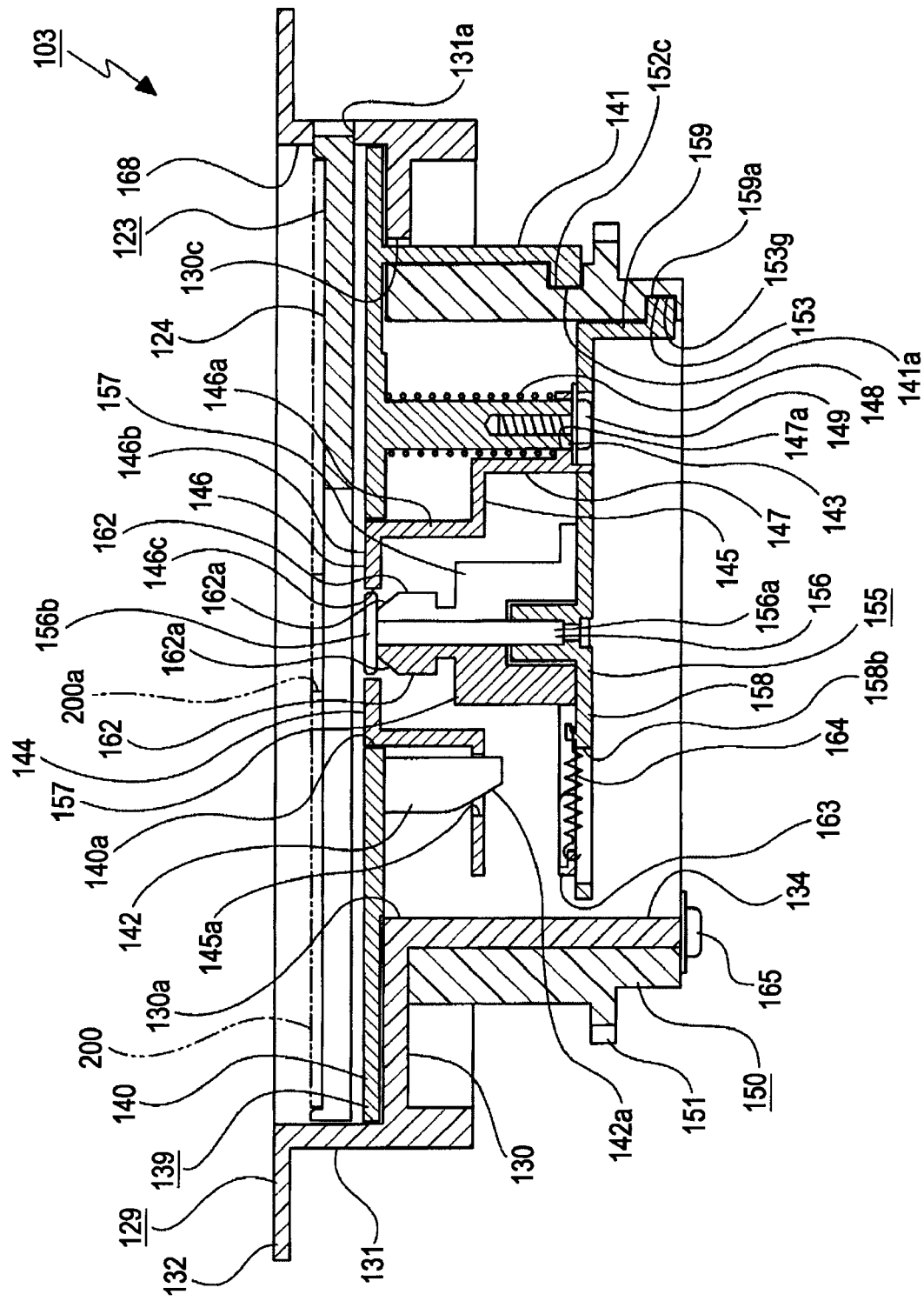
FIG. 62 is an enlarged sectional view showing a state with the elevating member and the like lowered and a disk-shaped recording medium placed on the disk transport portion.

When the elevating member 144 is lowered, in the course of the lowering process, the disk-shaped recording medium 200 is placed onto the disk transport portion 123 waiting in the disk insertion recess 168 (see FIG. 62).

Subsequently, the transport mechanism 102 is operated again, and the motor 122 of the driving block 118 is rotated in a direction opposite to the previous direction so that respective components such as the synchronizing shaft 111 and the gear members 110, 110 are simultaneously rotated in a direction opposite to the previous direction. At this time, the moving block 32 is located directly below the disk transport portion 123.

Figure 63:
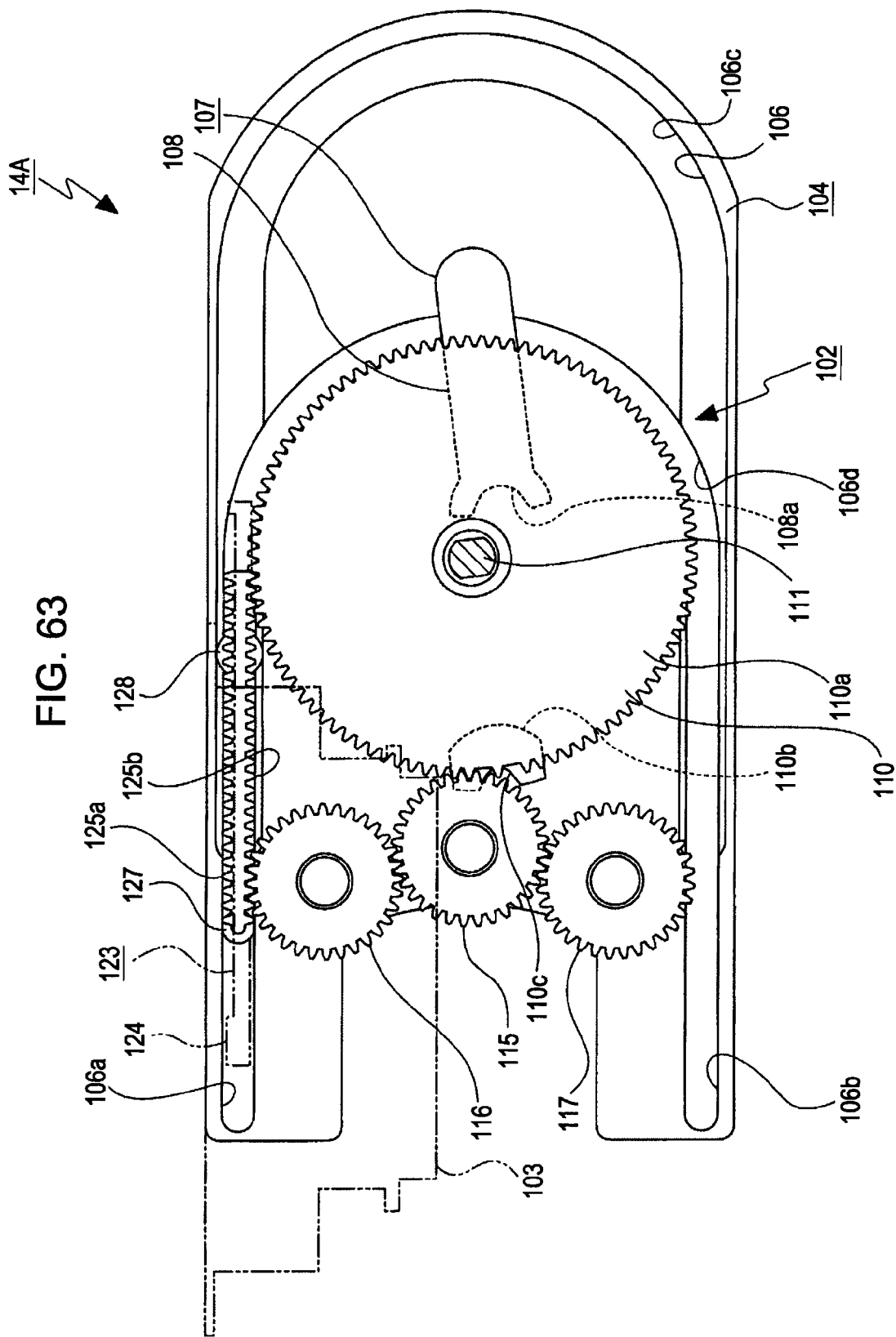
FIG. 63 is a sectional view showing a state with the disk transport portion being moved rearward.

The upper gears 116, 116 are rotated by the driving force of the motor 122, and the lower rack portions 125b, 125b respectively meshed with the upper gears 116, 116 are driven, so the disk transport portion 123 is moved rearward through the insertion slit 131a of the holding base 129 (see FIG. 63).

The lower rack portions 125b, 125b are brought into meshing engagement with the flat gear portions 110a, 110a of the gear members 110, 110 continuously from the upper gears 116, 116, and the lower rack portions 125b, 125b are driven by the flat gear portions 110a, 110a, so the disk transport portion 123 is moved further rearward.

When the disk transport portion 123 is moved rearward from the disk insertion recess 168, the holding mechanism 103 is operated, and the elevating base 139, the elevating member 144, and the holding member 154 are moved to their upper movable ends again due to rotation of the rotating cam 150. Accordingly, the user can, during transport of the disk-shaped recording medium 200 by the disk transport portion 123, load another disk-shaped recording medium 200 onto the disk holding portion 167 for placement on the disk-placing portion 146.

Subsequently, in the transport mechanism 102, the meshing engagement between the lower rack portions 125b, 125b of the disk transport portion 123 and the flat gear portions 110a, 110a is released. At the same time, the front-side sliding pins 127, 127 are respectively held in the holding recesses 110c, 110c of the guide arm portions 110b, 110b in the gear members 110, 110, and the rear-side sliding pins 128, 128 are respectively held in the holding recesses 108a, 108a of the arm portions 108, 108 in the guide arms 107, 107.

Figure 64:
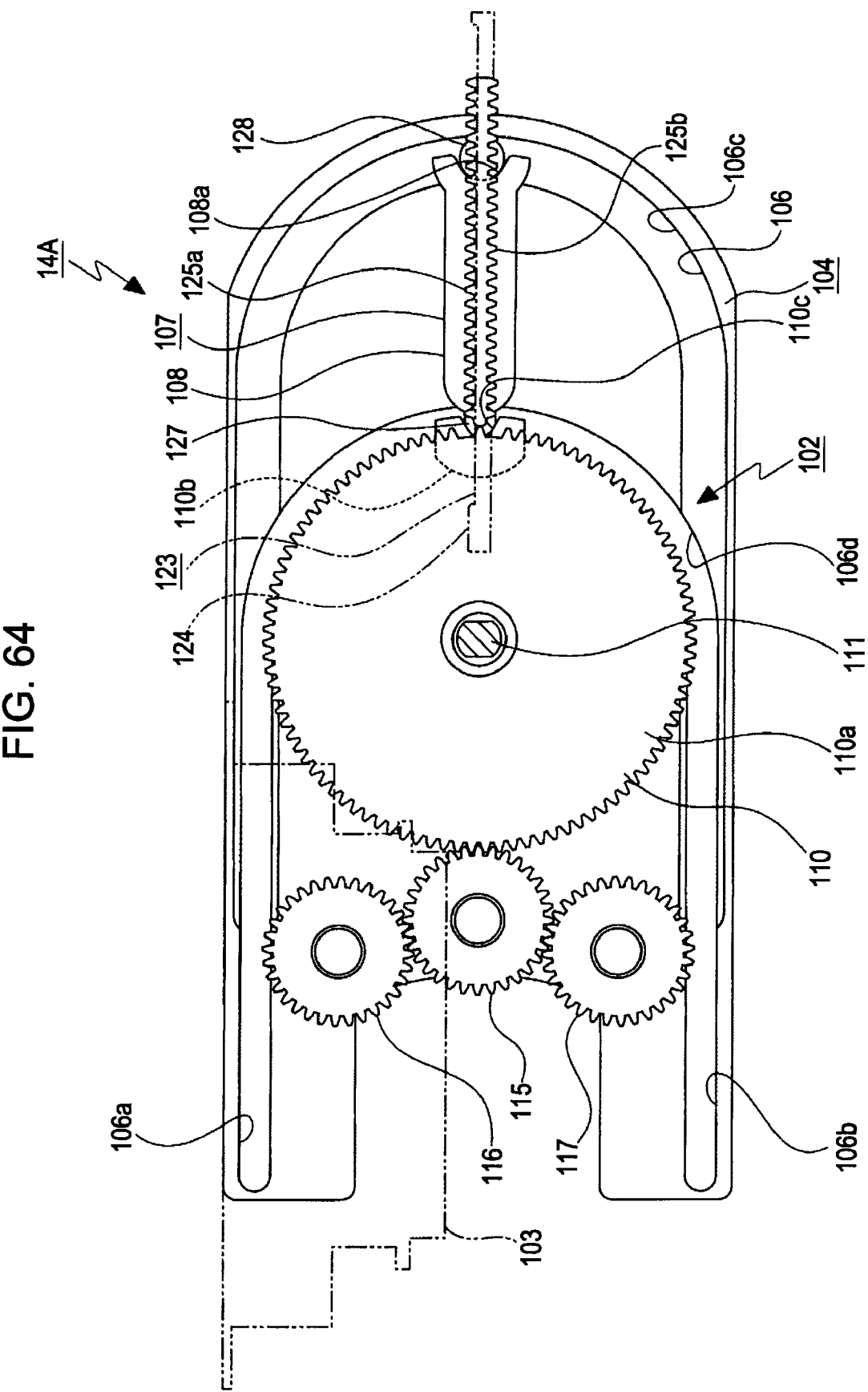
FIG. 64 is a sectional view showing a state with the disk transport portion being lowered.

The disk transport portion 123 is moved downward in a horizontal state in accordance with the rotations of the gear members 110, 110 and guide arms 107, 107 (see FIG. 64). At this time, the front-side sliding pins 127, 127 held by the guide arm portions 110b, 110b of the gear members 110, 110 are respectively slid on the front arcuate portions 106d, 106d in the guide grooves 106, 106 of the side plates 104, 104, and the rear-side sliding pins 128, 128 held by the guide arms 107, 107 are respectively slid on the rear arcuate portions 106c, 106c in the guide grooves 106, 106 of the side plates 104, 104.

When the disk transport portion 123 is moved to the lower movable end, the holding of the front-side sliding pins 127, 127 by the guide arm portions 110b, 110b of the guide members 110, 110, and the holding of the rear-side sliding pins 128, 128 by the guide arms 107, 107 are released. At the same time, the upper rack portions 125a, 125a and the flat gear portions 110a, 110a are meshed with each other.

Figure 65:
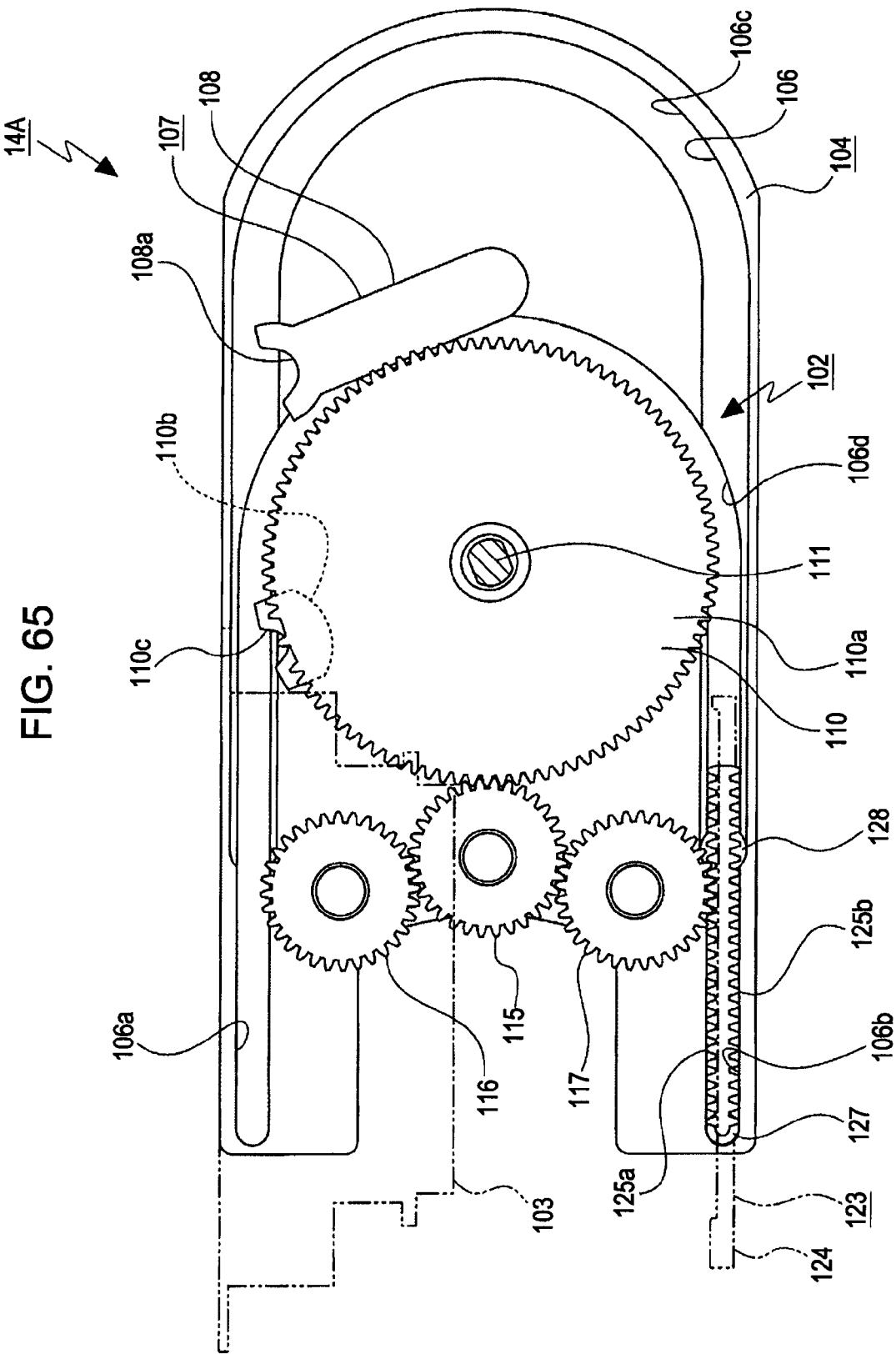
FIG. 65 is a sectional view showing a state with the disk transport portion lowered and moved to a front movable end.
Figure 66:
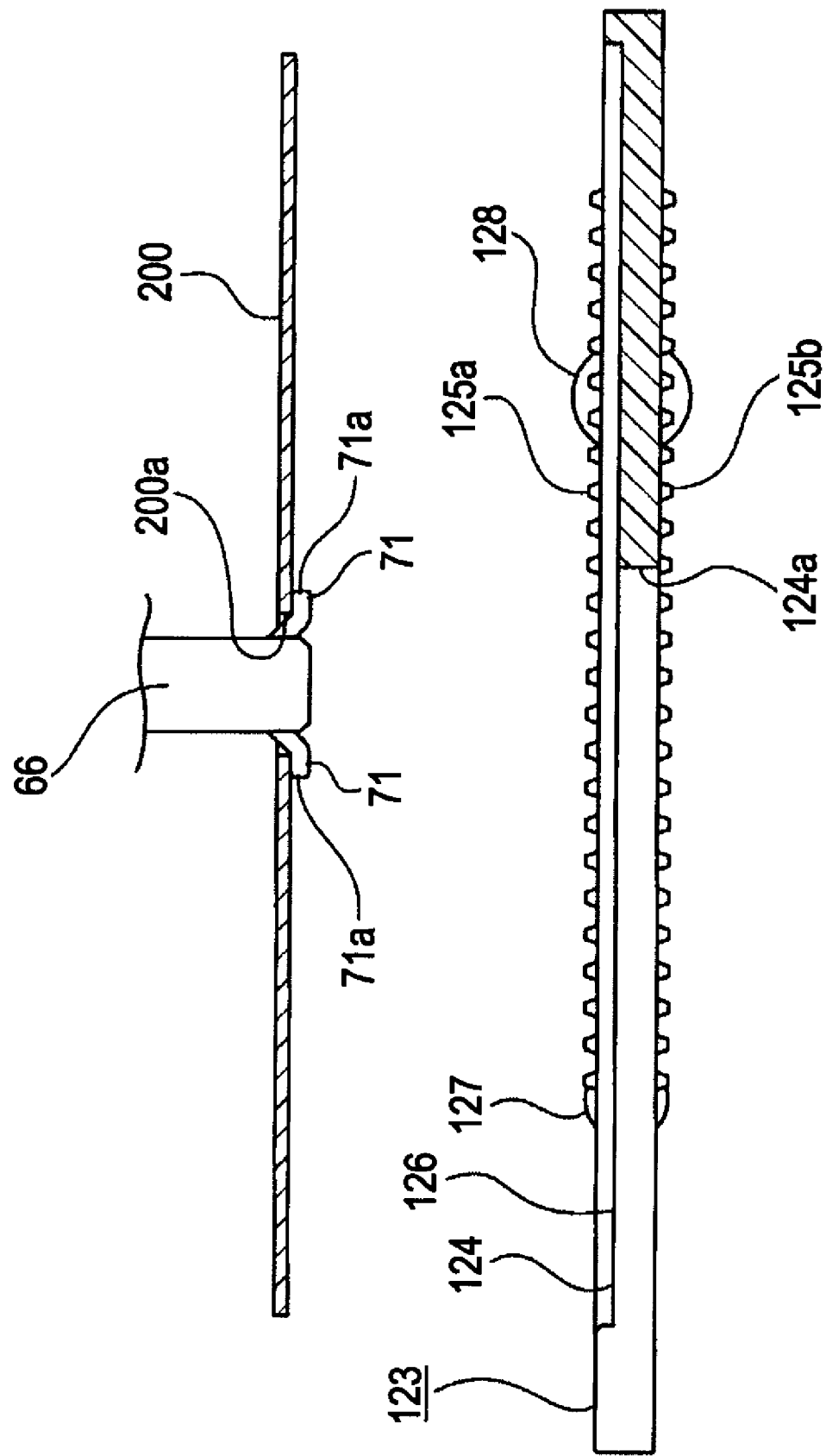
FIG. 66 is a conceptual view showing a state with a disk-shaped recording medium unloaded from the disk transport portion by the disk holding mechanism.

When the upper rack portions 125a, 125a and the flat gear portions 110a, 110a are meshed with each other, the upper rack portions 125a, 125a are brought into meshing engagement with the lower gears 117, 117 continuously from the flat gear portions 110a, 110a due to rotation of the gear members 110, 110, so the disk transport portion 123 is moved to its forward movable end (see FIG. 65). At this time, the center hole 200a of the disk-shaped recording medium 200 held by the disk transport portion 123 is located directly below the insertion shaft portion 66 of the disk holding mechanism 78 of the moving block 32.

When the disk transport portion 123 is moved downward to the front movable end as mentioned above, the operation of the transport mechanism 102 is stopped. Then, the disk holding mechanism 78 is operated, and the disk-shaped recording medium 200 is unloaded from the recording medium loading portion 127 of the disk transport portion 123 by the disk holding mechanism 78 and held by the disk holding mechanism 78 (see FIG. 66). The operation of the disk holding mechanism 78 is the same as the operation mentioned above.

When the disk-shaped recording medium 200 is unloaded from the disk transport portion 123 by the disk holding mechanism 78, the transport mechanism 102 is operated again, and the disk transport portion 123 is moved to a standby position through an operation reverse to that mentioned above.

When the disk transport portion 123 is moved to the standby position, a movement space for the moving block 32 is formed below the disk holding mechanism 78, and the moving block 32 is lowered so that the disk-shaped recording medium 200 is conveyed to a predetermined storage tray 25 or a predetermined drive device 30.

The delivery of the disk-shaped recording medium 200 from the disk holding mechanism 78 of the moving block 32 to the disk transport portion 123 is performed when, in a state with the disk transport portion 123 located in the standby position, the moving block 32 is moved to a position directly below the disk transport portion 123, and then the disk transport portion 123 is moved to a position directly below the moving block 32.

The above description is directed to the operation in a case where, after the elevating base 139, the elevating member 144, and the holding member 154 are raised to the upper movable ends (see FIG. 59), the rotating cam 150 is rotated in reverse so that the elevating base 139, the elevating member 144, and the holding member 154 are lowered. However, it is also possible to perform an operation such that as described below, after the elevating base 139, the elevating member 144, and the holding member 154 are raised to the upper movable ends, the rotating cam 150 is continued to be rotated in the same direction.

After the elevating base 139, the elevating member 144, and the holding member 154 are raised to the upper movable ends (see FIG. 59), the rotating cam 150 is continued to be rotated in the same direction. At this time, the upper surface of the base portion 140 of the elevating base 139 is located flush with the upper surface of the flange portion 132 of the holding base 129.

Figure 67:
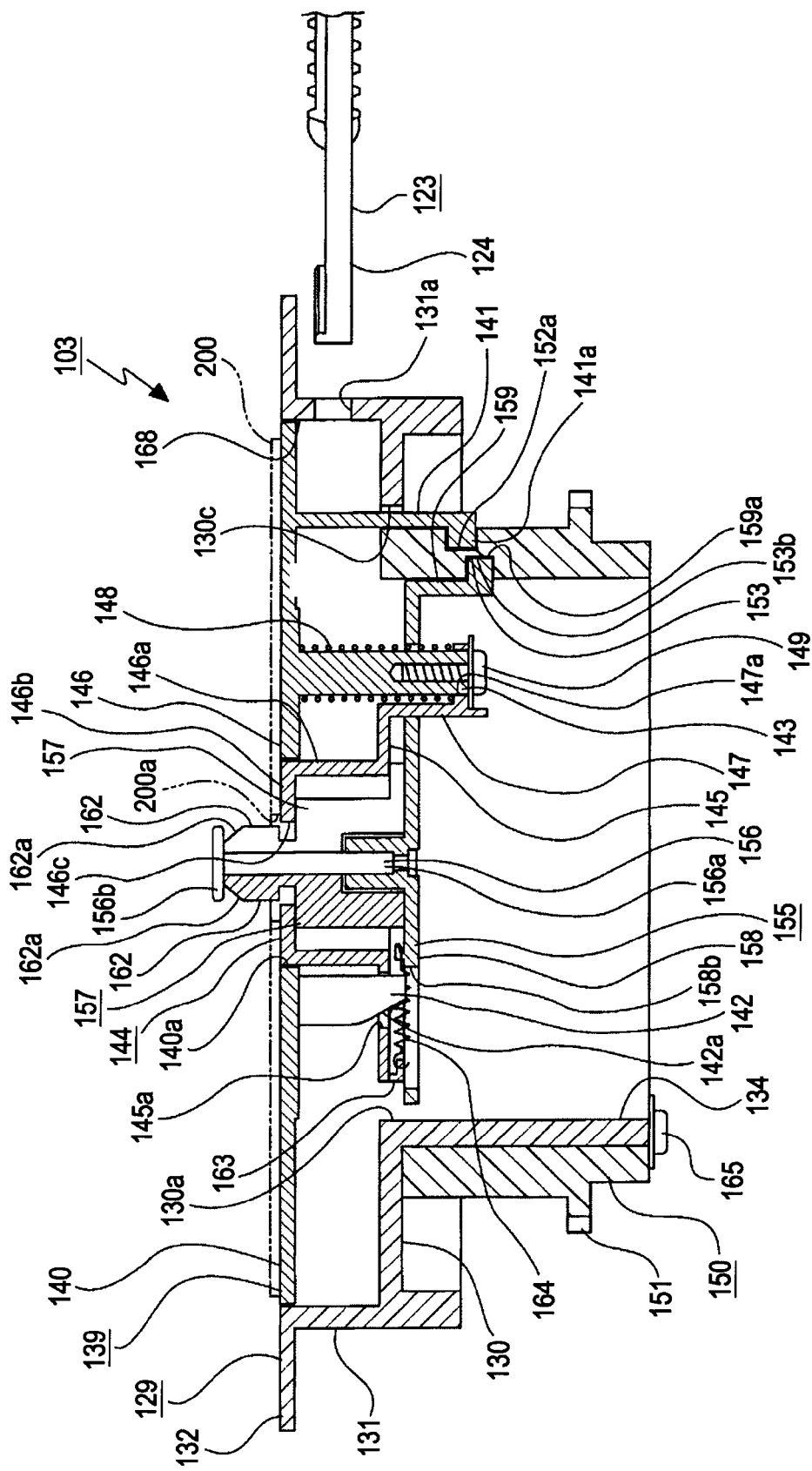
FIG. 67 is an enlarged sectional view, continuing from FIG. 57, showing a state with the rotating cam continued to be rotated in the same direction and the elevating member lowered.

When the rotating cam 150 is rotated, as shown in FIG. 67, the cam engaging pins 141a, 141a, 141a of the elevating base 139 are respectively moved relatively in the upper horizontal portions 152a, 152a, 152a in the outer cam grooves 152, 152, 152. The elevating base 139 is thus not moved vertically.

At the same time, due to the rotation of the rotating cam 150, the cam pins 159a, 159a, 159a of the holding member 154 are brought into engagement with the first inclined portions 153b, 153b, 153b from the second horizontal portions 153c, 153c, 153c in the inner cam grooves 153, 153, 153. The holding member 154 is thus moved downward. At this time, the sliding contact between the inclined cam edges 142a, 142a, 142a of the cam projections 142, 142, 142 of the elevating base 139 and the opening edges of the cam insertion holes 158b, 158b, 158b of the positioning members 157, 157, 157 is released, so the positioning members 157, 157, 157 are respectively moved into contact with the center shaft 156 by the urging force of the tension coil springs 164, 164, 164.

When the holding member 154 is moved downward, the elevating member 144 is also moved downward by the urging force of the compression coil springs 148, 148, 148, so the upper surface of the disk-placing portion 146 and the upper surface of the base portion 140 of the elevating base 139 are located flush with each other.

Figure 68:
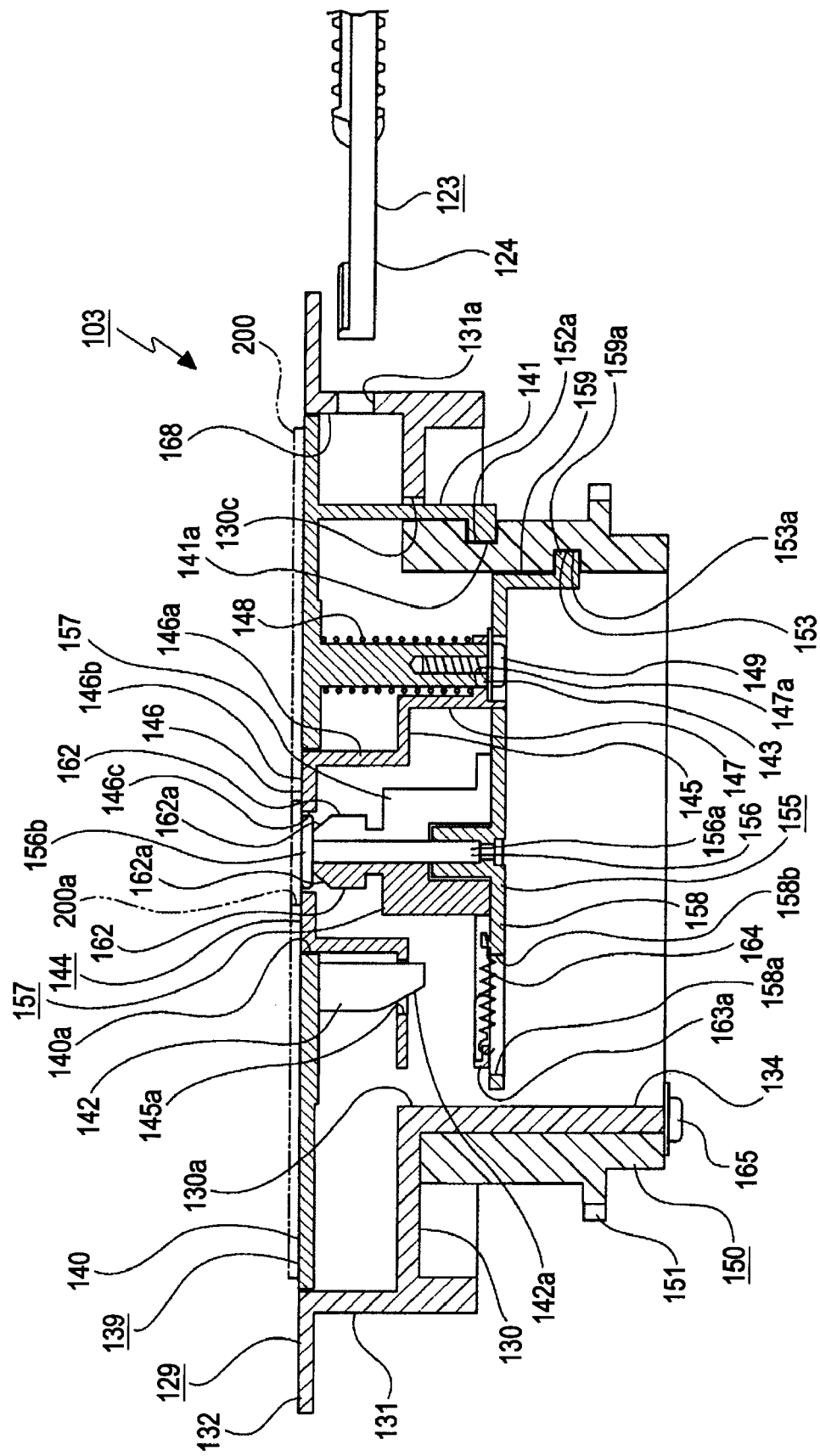
FIG. 68 is an enlarged sectional view, continuing from FIG. 67, showing a state with the upper surface of the center shaft located flush with the upper surface of the disk-placing portion and the upper surface of a base portion.

When the rotating cam 150 is further rotated, as shown in FIG. 68, the cam pins 159a, 159a, 159a of the holding member 154 are moved relatively from the first inclined portions 153b, 153b, 153b to the first horizontal portions 153a, 153a, 153a in the inner cam grooves 153, 153, 153. The holding member 154 is thus moved further downward, so the upper surface of the head portion 156b of the center shaft 156 is located flush with the upper surface of the disk-placing portion 146 and the upper surface of the base portion 140. Since the elevating member 144 has been moved to the lower movable end at this time, the elevating member 144 is not moved further downward.

As mentioned above, in the state with the elevating base 139 moved to the upper movable end, the upper surface of the head portion 156b of the center shaft 156, the upper surface of the disk-placing portion 146, the upper surface of the base portion 140, and the upper surface of the flange portion 132 of the holding base 129 are located flush with each other. The upper surface of the holding mechanism 103 thus becomes a flat surface, thereby making it possible to ensure good design.

Figure 69:
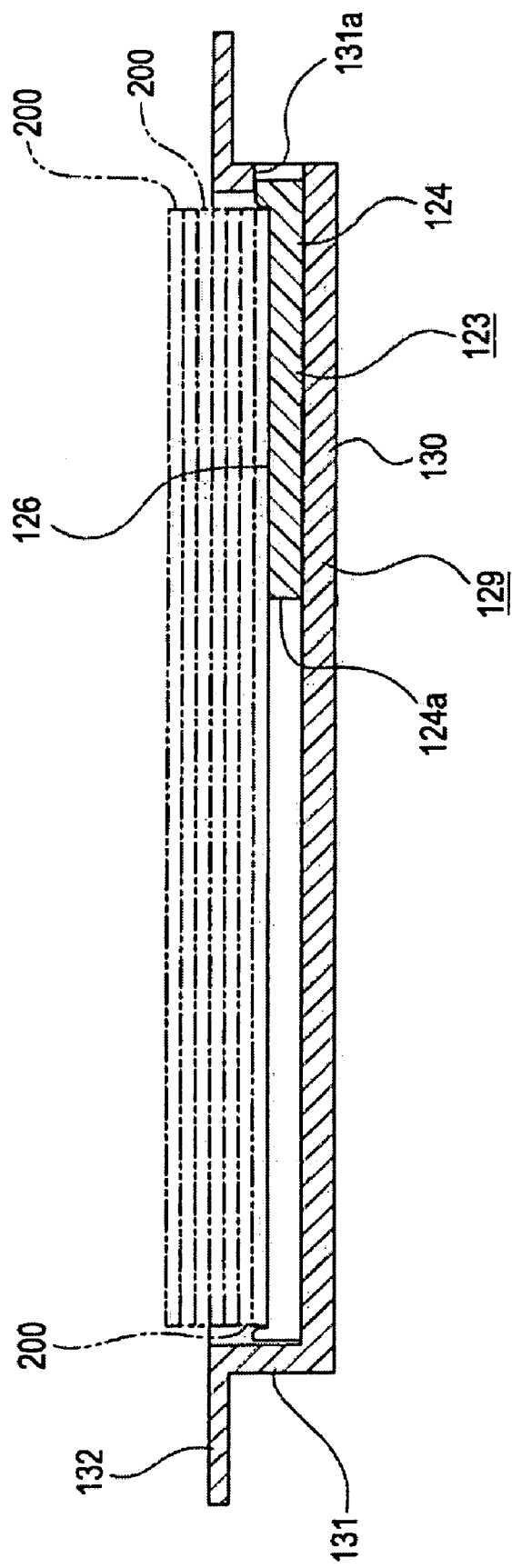
FIG. 69 is a schematic sectional view showing a state with a plurality of disk-shaped recording media laminated and placed on the elevating base.
Figure 70:
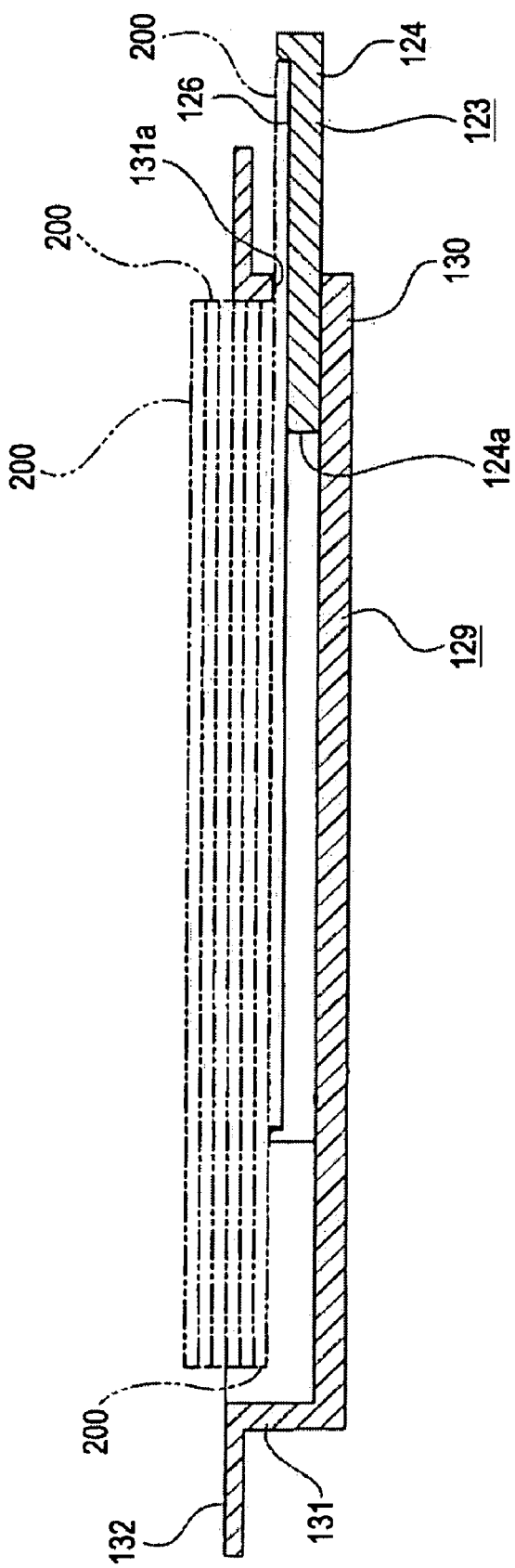
FIG. 70 is a schematic sectional view, continuing from FIG. 69, showing a state with only a single disk-shaped recording medium being transported by the disk transport portion.

While the above description is directed to a case in which one disk-shaped recording medium 200 is placed on the disk-placing portion 146, it is also possible to place a plurality of disk-shaped recording media 200, 200, . . . on the disk-placing portion 146 in a stacked state (see FIG. 69). In this case, as mentioned above, the opening height of the insertion slit 131a formed in the circumferential surface portion 131 of the holding base 129 is only slightly larger than the thickness of the disk transport portion 123. Therefore, in a state with the disk-shaped recording media 200, 200 loaded on the recording medium loading portion 126 of the disk transport portion 123, when the disk transport portion 123 moves rearward through the insertion slit 131a, only one disk-shaped recording medium 200 is transported (see FIG. 70), and the other disk-shaped recording media 200, 200, . . . remain loaded on the recording medium loading portion 126 as they are. The circumferential surface portion 131 thus functions as separating means for separating the disk-shaped recording media 200, 200, . . . one by one.

Therefore, each disk-shaped recording medium 200 is separated one by one for transport by one transport operation, and after the transport of the disk-shaped recording medium 200 by the disk transport portion 123 is finished, transport of the next disk-shaped recording medium 200 by the disk transport portion 123 can be performed successively. It is thus unnecessary to insert the disk-shaped recording medium 200 into the disk insertion recess 168 one by one in synchronization with one transport operation, allowing for improved ease of use.

As mentioned above, in the moving mechanism 14A, the disk holding portion 167, which includes the center shaft 156, the positioning portions 162, 162, 162, and the disk-placing portion 146 and is movable in the thickness direction of the disk-shaped recording medium 200, and the disk transport portion 123 that transports the disk-shaped recording medium 200 along a predetermined path are provided, and the disk holding portion 167 and the disk transport portion 123 are operated individually. Therefore, during transport of the disk-shaped recording medium 200 by the disk transport portion 123, another disk-shaped recording medium 200 can be inserted into the disk insertion recess 168 as a preparatory operation for transport, thereby reducing the time required for transport of the disk-shaped recording media 200, 200, . . . to provide improved ease of use.

Further, since the disk holding portion 167 is moved in the thickness direction of the disk-shaped recording medium 200, the disk holding portion 167 does not project to the sides (to the front/rear and left/right) from the outer housing 2, thereby making it possible to achieve a reduction in the size of the recording medium changer 1.

Further, in the moving mechanism 14A, the disk holding portion 167 includes the disk-placing portion 146 on which the inner circumferential portion of the disk-shaped recording medium 200 is placed and which moves in the thickness direction of the disk-shaped recording medium 200, and the holding shaft portion 166 that is moved in the thickness direction of the disk-shaped recording medium 200 with respect to the disk-placing portion 146 and inserted into the center hole 200a of the disk-shaped recording medium 200. Therefore, loading of the disk-shaped recording medium 200 onto the disk holding portion 167 can be performed with ease and reliability.

In addition, the holding shaft portion 166 includes the center shaft 156, and the positioning portions 162, 162, 162 that are moved in the radial direction of the disk-shaped recording medium 200 with respect to the center shaft 156. Therefore, positioning of the disk-shaped recording medium 200 with respect to the center shaft 156 can be performed with ease and reliability.

While the above-description is directed to the case of the recording medium changer 1 in which the direction of storage of the disks-shaped recording medium 200 is vertical, the direction of the disk-shaped recording medium 200 is not limited to vertical. The storage direction of the disk-shaped recording medium is arbitrary.

Each of the specific shapes and structures of the respective components illustrated in the best mode mentioned above represents only one embodiment for carrying out the present invention, and should not be construed as limiting the technical scope of the present invention in any way.

What is claimed is:

1. A recording medium changer, comprising:
   a plurality of storage trays that are arranged in alignment in a predetermined direction and that each of which is configured to store a recording medium;
   a conveying mechanism that is movable in an alignment direction of the plurality of storage trays and conveys the recording medium; and
   a delivery device that delivers the recording medium in and out of the recording medium changer, said delivery device including a support base that includes a cutout through which the conveying mechanism is moved;
   wherein
   the plurality of storage trays are rotatable about an axis extending in the alignment direction of the storage trays,
   at the time of rotation of each of the storage trays, the conveying mechanism is held in a movement preparing position retracted in the alignment direction from the storage tray that is being rotated, and
   each of the storage trays has a movement cutout for forming at least a part of a movement space through which the conveying mechanism is moved.

2. The recording medium changer according to claim 1, further comprising a drive device that performs recording or reproduction of an information signal with respect to the recording medium, the drive device being arranged within a projected area of a rotation locus of the storage trays in the alignment direction of the storage trays.

3. The recording medium changer according to claim 1, further comprising locking means for locking each of the storage trays in a conveyance position that allows movement of the conveying mechanism through the movement area.

4. A reproducing apparatus comprising:
   a recording medium changer part including,
      a plurality of storage trays that are arranged in alignment in a predetermined direction and that each of which is configured to store a recording medium,
      a conveying mechanism that is movable in an alignment direction of the plurality of storage trays and conveys a recording medium, and
      a delivery device that delivers the recording medium in and out of the recording medium changer, said delivery device including a support base that includes a cutout through which the conveying mechanism is moved; and
   a drive device part configured to perform reproduction of an information signal stored in the recording medium,
   wherein the plurality of storage trays are rotatable about an axis extending in the alignment direction of the storage trays,
   at the time of rotation of each of the storage trays, the conveying mechanism is held in a movement preparing position retracted in the alignment direction from the storage tray that is being rotated, and
   each of the storage trays has a movement cutout for forming at least a part of a movement space through which the conveying mechanism is moved.

5. The recording medium changer according to claim 1, wherein the delivery device includes a tray that caries the recording medium, said tray including a cutout through which the conveying mechanism is moved.

6. The recording medium changer according to claim 5, wherein the tray is configured to move perpendicularly to the alignment direction.

7. The recording medium changer according to claim 6, wherein the tray is moveable to a first position in which the tray is disposed to position the recording medium outside of the recording medium changer, a second position in which the tray is disposed to exchange the recording medium with the conveying mechanism, and a third position in which the tray is disposed so that conveying mechanism moves through the cutout in the delivery device and the cutout in the tray.

8. The recording medium changer according to claim 1, wherein the disc conveying mechanism includes disk holding arms.

9. The reproducing apparatus according to claim 4, wherein the delivery device includes a tray that caries the recording medium, said tray including a cutout through which the conveying mechanism is moved.

10. The reproducing apparatus according to claim 4, wherein the disc conveying mechanism includes disk holding arms.

* * * * *